US005123671A

United States Patent [19]

Driessen et al.

[11] Patent Number: 5,123,671
[45] Date of Patent: Jun. 23, 1992

[54] METHOD AND APPARATUS FOR CONTROLLING SHOCK ABSORBERS

[75] Inventors: Jan Driessen, Hasselt; Bert Vanroye, Borgloon; David Steed, Sint Truiden, all of Belgium

[73] Assignee: Monroe Auto Equipment Company, Monroe, Mich.

[21] Appl. No.: 669,503

[22] Filed: Mar. 14, 1991

Related U.S. Application Data

[63] Continuation-in-part of Ser. No. 322,774, Mar. 13, 1989, Pat. No. 5,016,908.

[51] Int. Cl.$^5$ .............................................. B60G 17/01
[52] U.S. Cl. .................................... 280/707; 280/714; 364/424.05; 188/299
[58] Field of Search ............... 280/840, 703, 707, 714, 280/DIG. 1; 267/64.25; 364/424.05; 188/299

[56] References Cited

U.S. PATENT DOCUMENTS

| 264,525 | 9/1882 | Glenn | 137/625.32 |
|---|---|---|---|
| 294,216 | 2/1884 | Fletcher | 137/625.22 |
| 329,650 | 11/1885 | Jackson | 137/625.32 |
| 505,850 | 10/1898 | Rothchild | 251/58 |
| 616,796 | 12/1898 | Mitchell | 251/310 |
| 631,435 | 8/1899 | Pickles | 173/169 |
| 1,403,003 | 1/1922 | Beatson | 123/586 |
| 1,517,877 | 12/1924 | Wallem | 137/613 |
| 1,544,608 | 7/1925 | Smith et al. | 137/447 |
| 1,819,343 | 9/1928 | Shipley | 137/625.32 |
| 2,061,068 | 11/1936 | Fuchs | 188/299 |
| 3,039,566 | 6/1962 | Rumsey | 188/299 |
| 3,110,322 | 11/1963 | Bozoyan | 137/625.23 |
| 3,124,368 | 3/1964 | Corley et al. | 280/840 |
| 3,471,824 | 10/1969 | Greulich et al. | 439/282 |
| 3,495,625 | 2/1970 | Shuttleworth et al. | 137/637.4 |
| 3,506,239 | 4/1970 | Johnson | 251/310 |
| 3,995,883 | 12/1976 | Glaze | 280/707 |
| 4,031,989 | 6/1977 | Blazquez | 188/299 |
| 4,065,154 | 12/1977 | Glaze | 280/707 |
| 4,113,072 | 9/1978 | Palmer | 188/282 |
| 4,125,238 | 11/1978 | Tanaka | 248/56 |
| 4,313,529 | 2/1982 | Kato et al. | 188/299 |
| 4,325,468 | 4/1982 | Siorek | 188/282 |

(List continued on next page.)

FOREIGN PATENT DOCUMENTS 0115202 8/1984 European Pat. Off. .

OTHER PUBLICATIONS

Burns, Jerry W., "A Dry Air, Electronic-Controlled Leveling System for Passenger Cars and Light Trucks", SAE Paper No. 780051.
Packer, "Active Ride Control-A Logical Step From Static Vehicle Attitude Control", SAE Paper No. 780050.
Yokoya, Y. et al., "Toyota Electronic Modulated Suspension (TEMS:) System for the 1983 Soarer", SAE Paper No. 840341.

Primary Examiner—Kenneth R. Rice
Attorney, Agent, or Firm—Harness, Dickey & Pierce

[57] ABSTRACT

An apparatus for damping the movement of the body of an automobile. The apparatus includes a shock absorber having a pressure cylinder which forms a working chamber and a first and second portion. A first sensor is used to generate an electrical signal in response to whether the shock absorber is in compression or rebound. A second sensor is used for determining the movement of the body on the automobile. An electronic control module is used for generating an electrical control signal in response to the outputs of the first and second sensors. A solenoid is used for regulating the flow of damping fluid between the first and second portions of the working chamber. A piston assembly disposed within the pressure cylinder defines the first and second portions of the working chamber. The piston assembly includes a valve body and first and second unloaders adapted to control the flow of fluid between the first and second portions of the working chamber. At least one of the unloaders being located external to the valve body.

92 Claims, 21 Drawing Sheets

U.S. PATENT DOCUMENTS

| | | | |
|---|---|---|---|
| 4,333,668 | 6/1982 | Hendrickson et al. | 280/703 |
| 4,468,050 | 8/1984 | Woods et al. | 280/707 |
| 4,469,315 | 9/1984 | Nichols et al. | 267/64.17 |
| 4,526,401 | 7/1985 | Kakizaki et al. | 280/707 |
| 4,534,580 | 8/1985 | Kobayashi et al. | 280/712 |
| 4,576,258 | 3/1986 | Spisak et al. | 188/299 |
| 4,597,411 | 7/1986 | Lizell | 137/493.8 |
| 4,598,929 | 7/1986 | Kumagai et al. | 280/707 |
| 4,600,215 | 7/1986 | Kuroki et al. | 280/707 |
| 4,620,619 | 11/1986 | Emura et al. | 188/319 |
| 4,635,960 | 1/1987 | Shirakuma | 280/707 |
| 4,638,896 | 1/1987 | Poyser | 188/299 |
| 4,645,044 | 2/1987 | Kato et al. | 188/319 |
| 4,648,622 | 3/1987 | Wada et al. | 280/707 |
| 4,660,686 | 4/1987 | Munning et al. | 188/280 |
| 4,671,392 | 6/1987 | Wossner | 188/299 |
| 4,673,067 | 6/1987 | Munning et al. | 188/299 |
| 4,682,675 | 7/1987 | Eddy, Jr. | 188/299 |
| 4,696,379 | 9/1987 | Yamamoto et al. | 188/299 |
| 4,723,640 | 2/1988 | Beck | 188/319 |
| 4,726,453 | 2/1988 | Obstfelder et al. | 188/319 |
| 4,729,459 | 3/1988 | Inagaki et al. | 188/299 |
| 4,732,408 | 3/1988 | Ohlin | 280/707 |
| 4,743,046 | 5/1988 | Schnittger | 280/707 |
| 4,749,069 | 6/1988 | Knecht et al. | 188/299 |
| 4,749,070 | 6/1988 | Moser et al. | 188/299 |
| 4,867,475 | 9/1989 | Groves | 280/707 |
| 4,890,858 | 12/1989 | Blankenship | 280/707 |
| 4,923,038 | 5/1990 | Lizell | 188/299 |

| Number | Date | Country |
|---|---|---|
| 0166313 | 1/1986 | European Pat. Off. |
| 0186908 | 7/1986 | European Pat. Off. |
| 0200446 | 11/1986 | European Pat. Off. |
| 1505417 | 3/1970 | Fed. Rep. of Germany |
| 2911768 | 10/1980 | Fed. Rep. of Germany |
| 3334704 | 4/1985 | Fed. Rep. of Germany |
| 3405315 | 8/1985 | Fed. Rep. of Germany |
| 3425988 | 1/1986 | Fed. Rep. of Germany |
| 3428306 | 2/1986 | Fed. Rep. of Germany |
| 7028174 | 6/1987 | Fed. Rep. of Germany |
| 3348176 | 2/1988 | Fed. Rep. of Germany |
| 1095506 | 12/1954 | France |
| 1130621 | 2/1957 | France |
| 1242350 | 1/1961 | France |
| 1508169 | 1/1968 | France |
| 2552515 | 3/1985 | France |
| 55-11924 | 1/1980 | Japan |
| 55-142141 | 11/1980 | Japan |
| 57-173629 | 10/1982 | Japan |
| 57-173630 | 10/1982 | Japan |
| 57-173632 | 10/1982 | Japan |
| 57-182506 | 11/1982 | Japan |
| 58-50339 | 3/1983 | Japan |
| 58-131442 | 8/1983 | Japan |
| 58-141909 | 8/1983 | Japan |
| 58-146742 | 9/1983 | Japan |
| 59-97339 | 6/1984 | Japan |
| 59-128941 | 8/1984 | Japan |
| 59-137641 | 8/1984 | Japan |
| 59-197639 | 11/1984 | Japan |
| 60-9797 | 1/1985 | Japan |
| 60-12325 | 1/1985 | Japan |
| 61-13041 | 1/1986 | Japan |
| 8500120 | 3/1985 | PCT Int'l Appl. |
| 8600212 | 5/1986 | PCT Int'l Appl. |
| 71063820 | 10/1975 | Switzerland |
| 664770 | 1/1952 | United Kingdom |
| 1450441 | 9/1976 | United Kingdom |
| 1450765 | 9/1976 | United Kingdom |
| 1485003 | 9/1977 | United Kingdom |
| 2112104 | 7/1983 | United Kingdom |
| 2117875 | 10/1983 | United Kingdom |
| 2120355 | 11/1983 | United Kingdom |
| 2159917 | 7/1984 | United Kingdom |
| 2134625 | 8/1984 | United Kingdom |
| 2147683 | 8/1984 | United Kingdom |
| 2177475 | 6/1986 | United Kingdom |

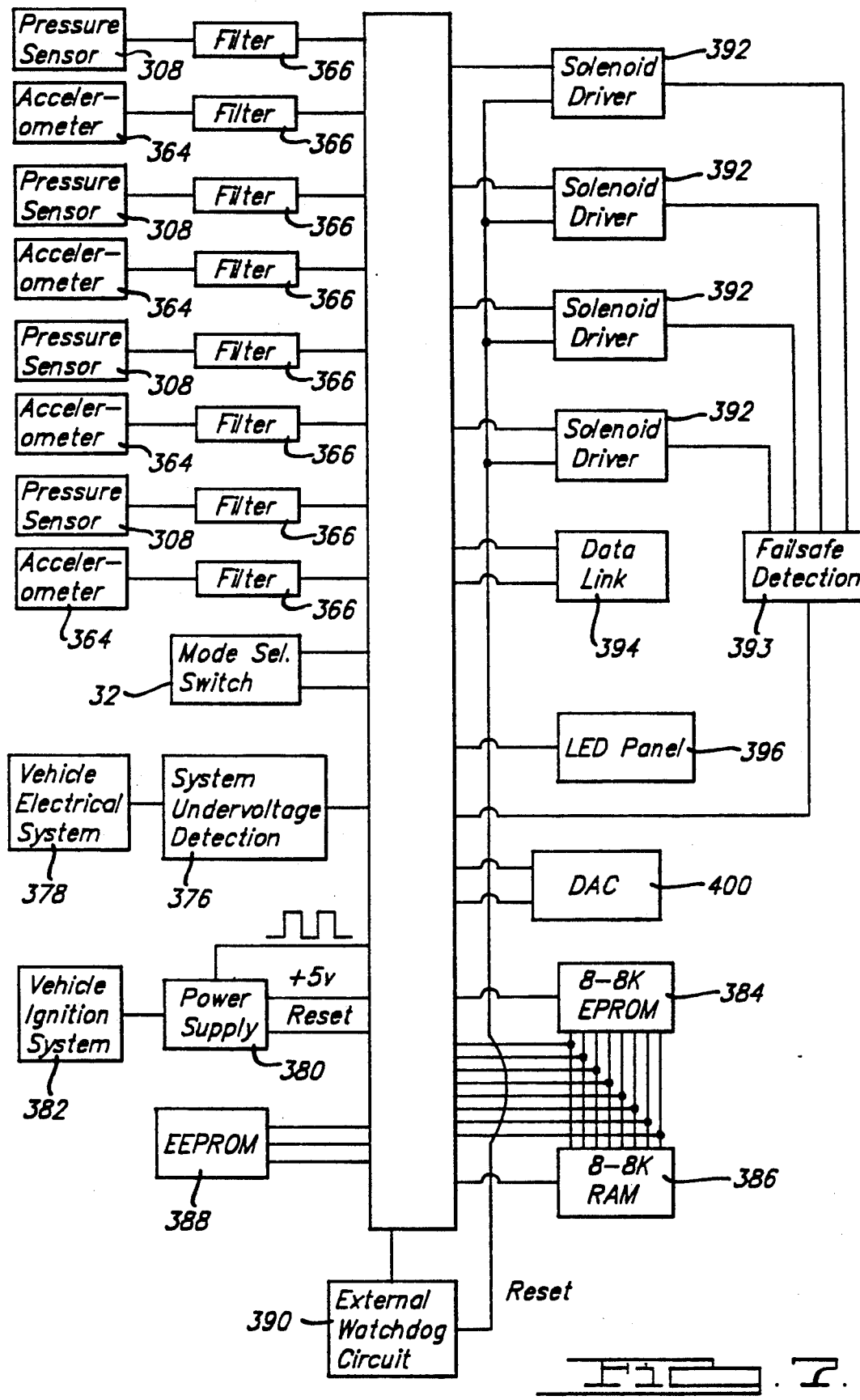

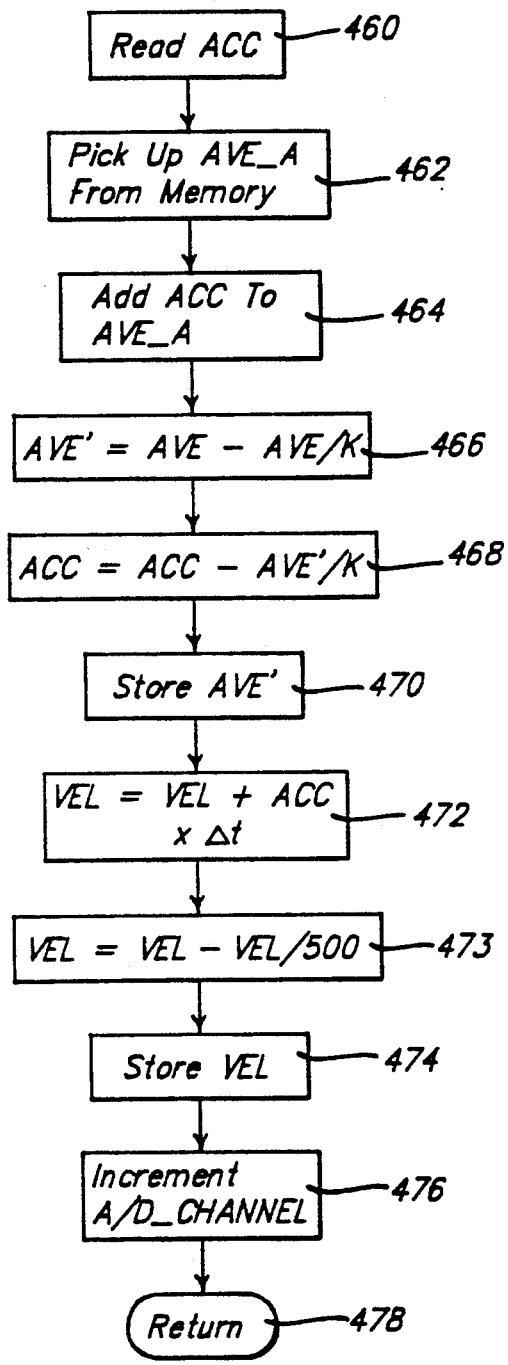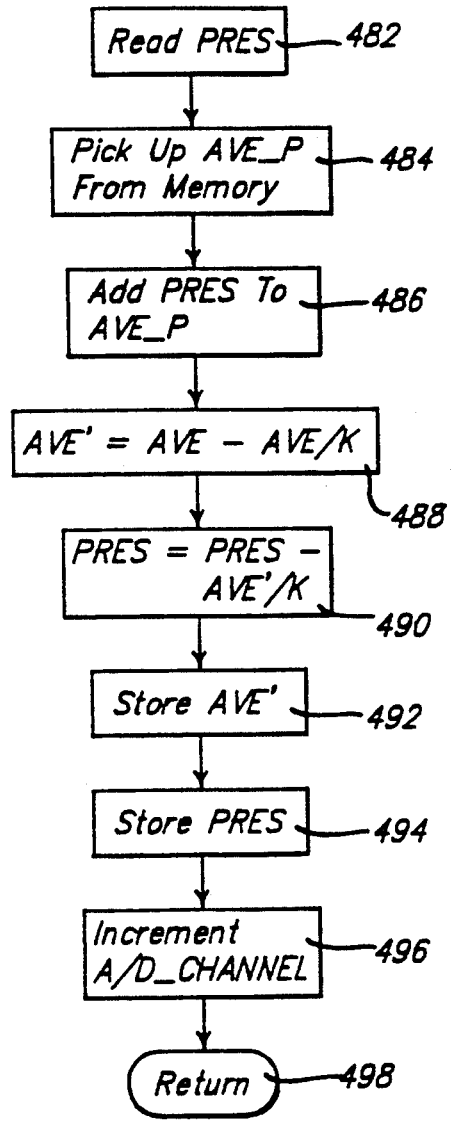
FIG. 10.
FIG. 11.

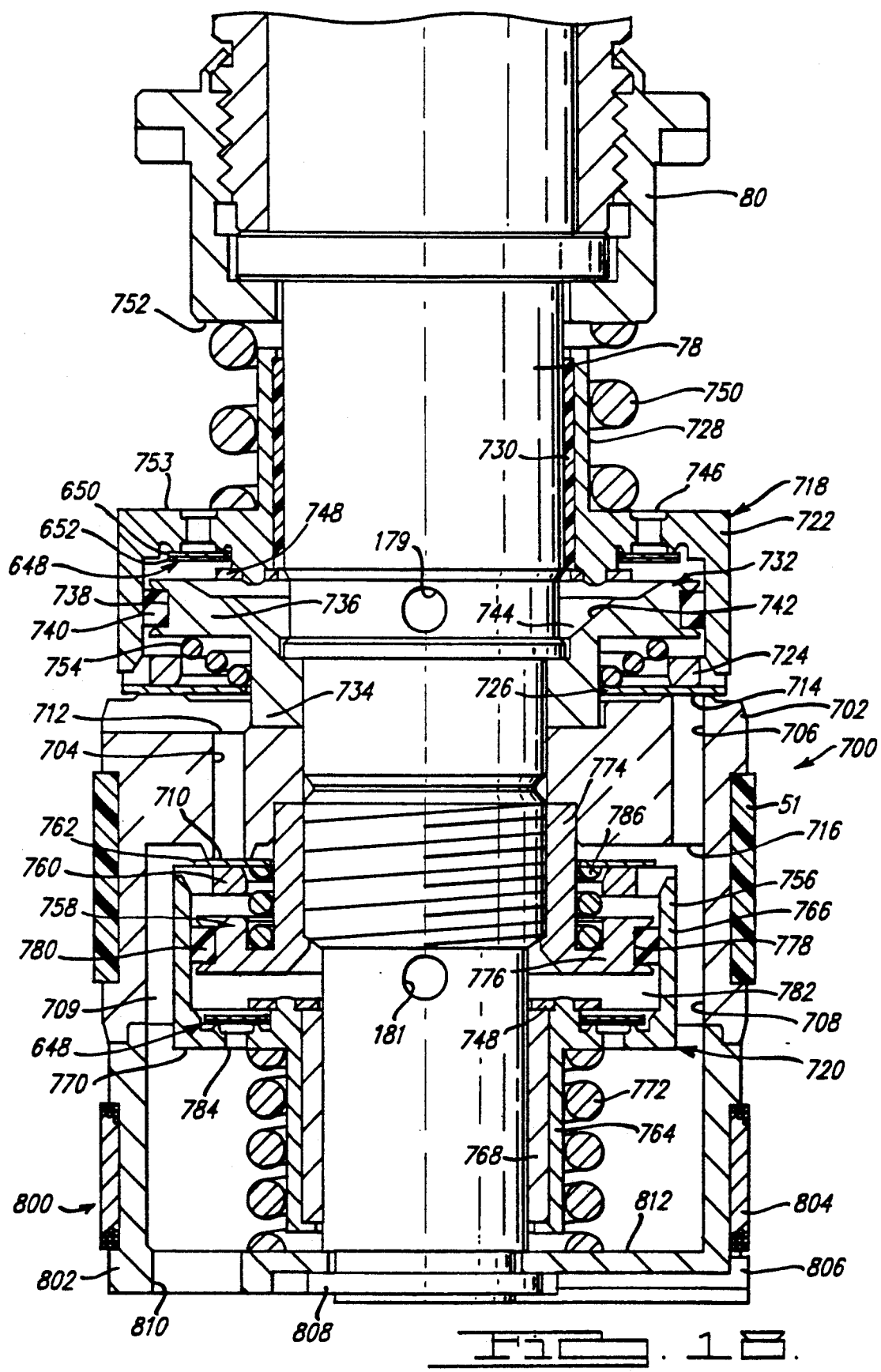

METHOD AND APPARATUS FOR CONTROLLING SHOCK ABSORBERS

CROSS REFERENCE TO RELATED APPLICATION

This application is a continuation-in-part of co-pending application, Ser. No. 07/322,774, filed Mar. 13, 1989 for METHOD AND APPARATUS FOR CONTROLLING SHOCK ABSORBERS, now U.S. Pat. No. 5,016,908.

BACKGROUND OF THE INVENTION

1. Field of the Invention

This invention relates to suspension systems for automobiles and machines which receive mechanical shock, and more particularly to a method and apparatus for controlling shock absorbers.

2. Description of Related Art

Shock absorbers are used in connection with automotive suspension systems to absorb unwanted vibrations which occur during driving. To dampen unwanted vibrations, shock absorbers are generally connected between the body and the suspension of the automobile. A piston assembly is located within the shock absorber and is connected to the body of the automobile through a piston rod. Because the piston assembly is able to limit the flow of damping fluid within the working chamber of the shock absorber when the shock absorber is compressed or extended, the shock absorber is able to provide a damping force which "smooths" or "dampens" vibrations transmitted from the suspension to the body.

The greater the degree to which the flow of damping fluid within the working chamber is restricted by the piston assembly, the greater the damping forces which are provided by the shock absorber. Accordingly, a "soft" compression and rebound stroke is produced when the flow of damping fluid in the working chamber is relatively unrestricted. In contrast, a "firm" compression and rebound stroke is produced when there is an increased restriction in the flow of damping fluid in the working chamber.

In selecting the amount of damping that a shock absorber is to provide, three vehicle performance characteristics are often considered: ride comfort, vehicle handling and road holding ability. Ride comfort is often a function of the spring constant of the main springs of the vehicle, as well as the spring constant of the seat, tires, and the damping of the shock absorbers. Vehicle handling is related to the variation in the vehicle's attitude (i.e., roll, pitch and yaw). For optimum vehicle handling, relatively large damping forces are required to avoid excessively rapid variation in the vehicle's attitude during cornering, acceleration, and deceleration. Road holding ability is generally a function of the amount of contact between the tires and the ground. To optimize road holding ability, large damping forces are required when driving on irregular surfaces to prevent loss of contact between the wheels and the ground for an excessive period of time.

Because different driving characteristics depend on the amount of damping forces the shock absorber provides, it is often desirable to have a shock absorber in which the amount of damping forces generated by the shock absorber is adjustable. One method for selectively changing the damping characteristics of a shock absorber is disclosed in European Patent Application Publication No. 0 186 908 A2. In European Patent Application Publication No. 0 186 908 A2, a controller detects the distance between the body of the automobile and the front wheel so as to determine the contour of the surface. A rotary valve in each of the rear shock absorbers is then adjusted so that the rear shock absorbers are able to provide the desired amount of damping forces.

Another method for selectively changing the damping characteristics of a shock absorber is disclosed in PCT International Publication No. WO 88/06983. In PCT International Publication No. WO 88/06983, the shock absorber has a solenoid which controls the flow of damping fluid into pressure chambers which are located adjacent to valve disks which control the damping characteristics of the shock absorber. Upon movement of the plunger of the solenoid, the pressure in these pressure chambers changes so that the damping characteristics of the shock absorber may be varied.

SUMMARY OF THE INVENTION

Accordingly, it is the primary object of the present invention to provide a method and apparatus for controlling shock absorbers in which the amount of damping fluid flowing between the upper and lower portions of the working chamber may be controlled with a relatively high degree of accuracy and speed. A related object of the present invention is to provide a method and apparatus for controlling shock absorbers in which the amount of damping forces provided by the shock absorber can be adjusted with a relatively high degree of accuracy and speed.

Another object of the present invention is to provide a method and apparatus for controlling shock absorbers in which movement of the components of the solenoid which is used to control the damping forces is reduced. In this regard, a related object of the present invention is to provide a method and apparatus for controlling shock absorbers in which the plunger of a solenoid may be held in one position to produce both a firm compression stroke as well as a firm rebound stroke.

A further related object of the present invention is to provide a method and apparatus for controlling shock absorbers in which the plunger of a solenoid may be held in one position to produce both a soft compression stroke as well as a soft rebound stroke.

Another object of the present invention is to provide a method and apparatus for controlling shock absorbers in which the occurrence of a compression or rebound stroke may be determined by measuring the pressure differential between the damping fluid in the upper and lower portions of the working chamber (i.e., the pressure difference across the piston of the shock absorber). Alternatively, the occurrence of a compression or rebound stroke may be determined by sensing the position of the piston relative to the pressure cylinder.

A related object of the present invention is to provide a method and apparatus for controlling shock absorbers in which damping characteristics of the shock absorber are determined in part by the output of an accelerometer.

A further object of the present invention is to provide a method and apparatus for controlling shock absorbers in which the sensors used for controlling damping characteristics may be disposed within a shock absorber.

Another object of the present invention is to provide a method and apparatus for controlling shock absorbers in which the flow of damping fluid through the shock absorber is unidirectional. In this regard, a related object of the present invention is to provide method and apparatus for controlling shock absorbers in which a base valve limits flow of damping fluid to one direction.

A further object of the present invention is to provide a method and apparatus for controlling shock absorbers in which solenoid operated flow control means are used in conjunction with first and second unloader assemblies for controlling the flow of fluid through a piston assembly for generating two distinct damping characteristics. The first and second unloader assemblies define first and second pressure chambers respectively, which act to aid in increasing fluid flow through the piston valve when the flow control means is in one position to produce a "soft" damping characteristic, and to decrease fluid flow for producing a "firm" damping characteristic when the flow control means is in a second position.

A related object of the present invention is to simplify the design of piston valve body. The simplified valve body of the present invention is adapted to include a sealing system for preventing loss of fluid pressure in the first and second pressure chambers during axial movement of the unloader assemblies. The simplified valve body is configured to maximize the effective pressure area with the pressure chambers.

A further object of the present invention is to provide a method and apparatus for controlling shock absorbers which is relatively inexpensive yet is able to accurately control the damping forces provided by the shock absorber.

BRIEF DESCRIPTION OF THE DRAWINGS

Other objects of the present invention will become apparent to one skilled in the art upon reading the following specification and by reference to the following drawings in which:

FIGS. 2, and 2B is the schematic representation of the shock absorber using the method and apparatus for controlling shock absorbers according to the teachings of the preferred embodiment of the present invention;

FIG. 7 is a block diagram illustrating the electronic control module which is used for controlling the shock absorber shown in FIG. 2;

FIG. 10 is a flow chart of the CALC VEL routine which is used by the microprocessor shown in FIG. 8 for controlling the shock absorber shown in FIG. 2;

FIG. 11 is a flow chart of the PRESSURE routine which is used by the microprocessor shown in FIG. 8 for controlling the shock absorber shown in FIG. 2;

FIGS. 16A and 16B are views illustrating the fluid flow path associated with the shock absorber of FIG. 15 during a compression stroke;

DESCRIPTION OF THE PREFERRED EMBODIMENT

Figure 1:
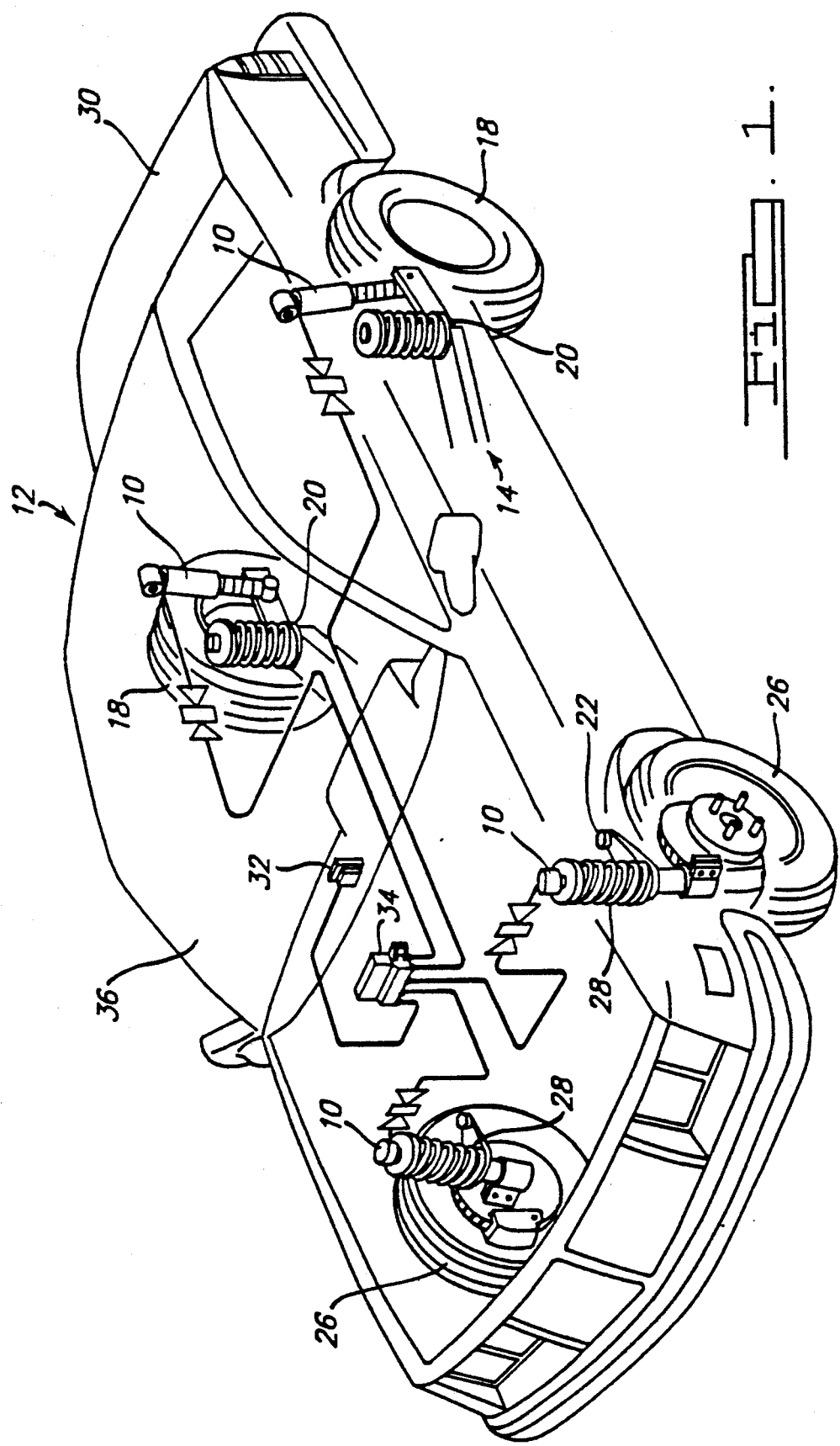
FIG. 1 is an illustration of an automobile using the method and apparatus for controlling shock absorbers according to the teachings of the preferred embodiment of the present invention.

Referring to FIG. 1, a plurality of four hydraulic dampers or shock absorbers 10 according to the preferred embodiment of the present invention are shown. The shock absorbers 10 are depicted in operative association with a diagrammatic representation of a conventional automobile 12. The automobile 12 includes a rear suspension system 14 having a transversely extending rear axle assembly (not shown) adapted to operatively support the vehicle's rear wheels 18. The rear axle assembly is operatively connected to the automobile 12 by means of a pair of shock absorbers 10 as well as by the helical coil springs 20. Similarly, the automobile 12 has a front suspension system 22 including a transversely extending front axle assembly (not shown) to operatively support the front wheels 26. Front axle assembly is operatively connected to the automobile 12 by means of a second pair of shock absorbers 10 and by the helical coil springs 28. The shock absorbers 10 serve to damp the relative movement of the unsprung portion (i.e., the front and rear suspension systems 22 and 14) and the sprung portion (i.e., the body 30) of the automobile 12. While the automobile 12 has been depicted as a passenger car, the shock absorber 10 may be used with other types of automotive vehicles or in other types of applications. Further, the term "shock absorber" as used herein will refer to shock absorbers in the general sense of the phrase and will include MacPherson struts and any other hydraulic dampers used in motor vehicle applications. In addition, the shock absorbers may be used with other types of suspension systems as well.

To allow the damping characteristics of the shock absorbers 10 to be controlled, a mode select switch 32 and an electronic control module 34 are provided. The mode select switch 32 is located within the passenger compartment 36 of the automobile 12 and is accessible by the occupants of the automobile 12. The mode select switch 32 is used for selecting which type of damping characteristics the shock absorbers 10 are to provide (i.e., firm, soft or automatic). The electronic control module 34 receives the output from the mode select switch 32 and is used for generating electronic control signals for controlling damping characteristics of the shock absorbers 10. By controlling the damping characteristics of the shock absorbers 10, the shock absorbers 10 are able to dampen relative movement between the body 30 and the suspension of the automobile 12 in such a manner as to optimize both ride comfort and road handling ability simultaneously.

Figure 2:
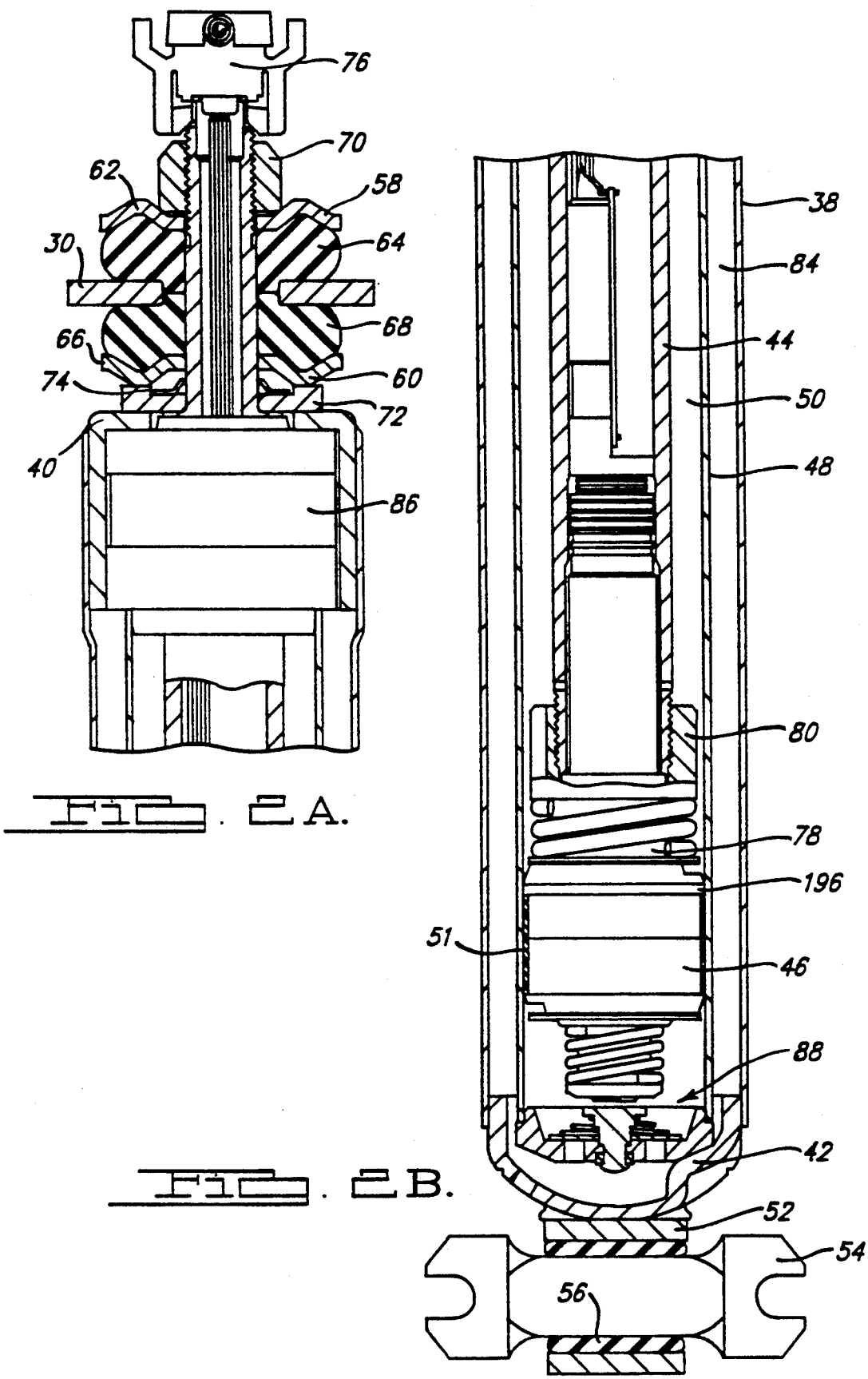

The structure of the shock absorbers 10 will now be described with reference to FIG. 2. The shock absorber 10 comprises an elongated reserve tube 38 which engages a cup-shaped oil cap 40 at the upper end of the reserve tube 38. The reserve tube 38 also engages a base cup 42 at the lower end of the reserve tube 38 so as to form a chamber which is able to store damping fluid. Extending axially through the oil cap 40 is a piston rod 44 which is secured to a reciprocating piston assembly 46 at the lower end of the piston rod 44. The piston assembly 46 is axially displaceable within an elongated tubular pressure cylinder 48 which is disposed within the reserve tube 38. The pressure cylinder 48 defines a working chamber 50 in which the upper portion of the working chamber 50 is located above the piston assembly 46, while the lower portion of the working chamber 50 is located below the piston assembly 46. Disposed between the piston assembly 46 and the pressure cylinder 48 is a teflon sleeve 51 which is used to facilitate movement of the piston assembly 46 with respect to pressure cylinder 48.

To connect the shock absorber 10 to the rear axle assembly of the automobile 12, the shock absorber 10 comprises a circular end fitting 52. The circular end fitting 52 is secured to the base cup 42 of the shock absorber 10 by a suitable means such as welding. Within the circular end fitting is disposed a mounting pin 54 disposed within a bushing 56 which is adapted to engage the axle assembly of the automobile 12. To connect the shock absorber 10 to the body 30 of the automobile 12, a first retainer 58 and a second retainer 60 are provided. The first retainer 58 and the second retainer 60 are disk shaped and have a central aperture operable to receive the piston rod 44. The first retainer 58 is disposed above the body 30, while the second retainer 60 is disposed below the body 30. The first retainer 58 has an upwardly facing annular indentation 62 which is able to accommodate a first disk-shaped cushion 64 which is disposed between the body 30 of the automobile 12 and the first retainer 58. Similarly, the second retainer 60 has a downwardly facing annular indentation 66 which is operable to receive a second disk-shaped cushion 68 which is disposed between the body 30 of the automobile 12 and the second retainer 60.

The shock absorber 10 further comprises a self-locking nut 70 which is disposed on the piston rod 44 immediately above the first retainer 58. The self-locking nut 70 has an internally threaded bore which is able to threadably engage the threaded upper end portion of the piston rod 44. Accordingly, by rotating the self-locking nut 70 on the upper portion of the piston rod 44, both the first retainer 58 and the first cushion 64 are displaced in a direction toward the body 30 of the automobile 12.

The second retainer 60 is positionally secured in part by means of an annular spacer 72 which is disposed immediately above the oil cap 40. The spacer 72 has a central bore which is able to receive the upper end portion of the piston rod 44. A pal nut 74 is disposed between the second retainer 60 and the spacer 72. The pal nut 74 is generally disk shaped and has a central bore which is able to receive the piston rod 44. The pal nut 74 is used to locate and secure the spacer 72.

Figure 8:
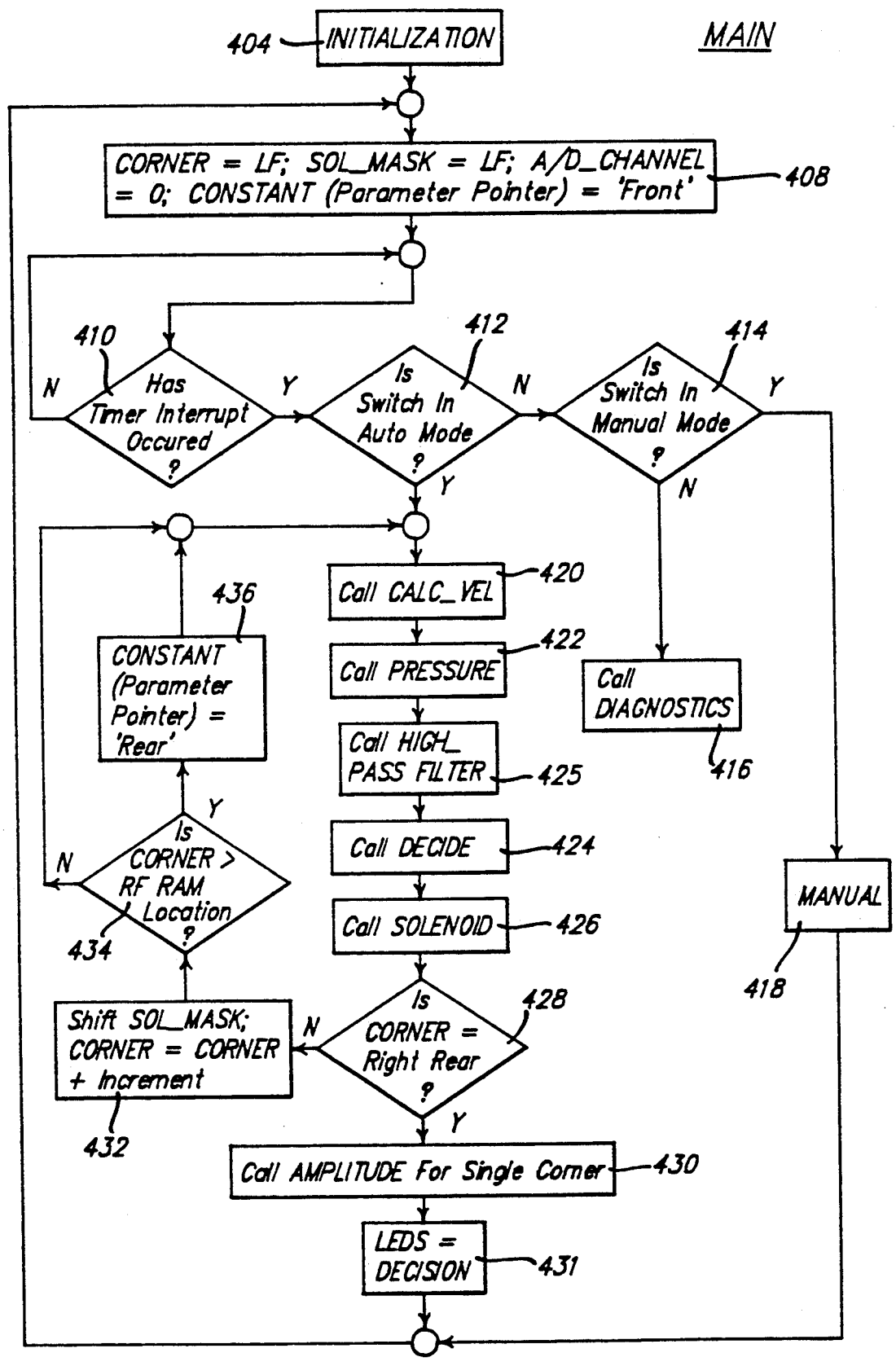
FIG. 8 is a flow chart illustrating the MAIN routine which is used by the microprocessor shown in FIG. 7 for controlling the operation of the shock absorber shown in FIG. 2.
Figure 9:
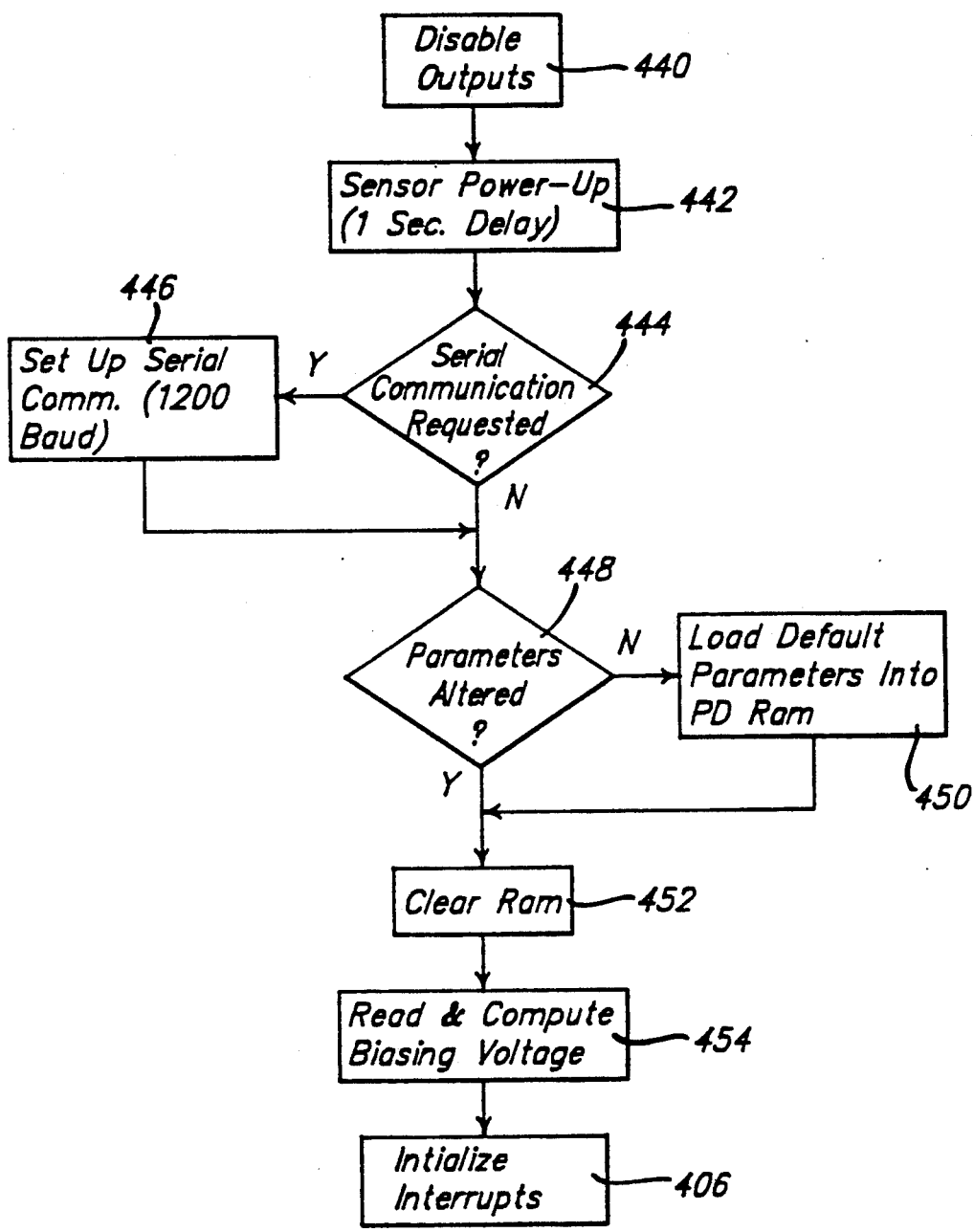
FIG. 9 is a flow chart of the INITIALIZATION portion of the MAIN routine which is used by the microprocessor shown in FIG. 8 for controlling the shock absorber shown in FIG. 2.

To permit electrical communication between the electronic control module 34 and the coil described below, the shock absorber 10 further comprises an electrical connector assembly 76. The electrical connector assembly 76 allows for rapid electrical decoupling of the shock absorber 10 from the electronic control module 34 so that the shock absorber 10 may be replaced. The electrical connector assembly 76 may be of the type which is shown in FIGS. 8-10 of U.S. Ser. No. 105,404 filed on Oct. 5, 1987, though other suitable electrical connectors may be used.

To support the piston assembly 46 on the piston rod 44, an axially extending piston post 78 and a piston post rod nut 80 are provided. The piston post 78 is generally circular in cross-section and extends axially through the central bore 82 (see FIG 5) of the piston assembly 46. The piston post 78 is secured to the piston rod 44 by the piston post rod nut 80. The piston post rod nut 80 is annularly shaped and comprises an internally threaded bore which is able to mate with the externally threaded lower portion of the piston rod 44.

To support the piston rod 44 within the working chamber 50 as well as to provide unidirectional flow of damping fluid through the damping fluid reservoir 84, a rod guide/valve assembly 86 is provided. The rod guide/valve assembly 86 allows fluid flow from the upper portion of the chamber 50 to the damping fluid reservoir 84 during compression of the shock absorber 10, while preventing the flow of damping fluid from the 28 upper portion of chamber 50 to the damping fluid reservoir 84 during rebound of the shock absorber 10. The rod guide/valve assembly 86 may be of the type which is shown and described in conjunction with FIG. 10 of U.S. Ser. No. 322,543, filed Mar. 13, 1989, which is hereby incorporated by reference. However, it is to be understood that other suitable rod guide/valve assemblies may be used.

Figure 3:
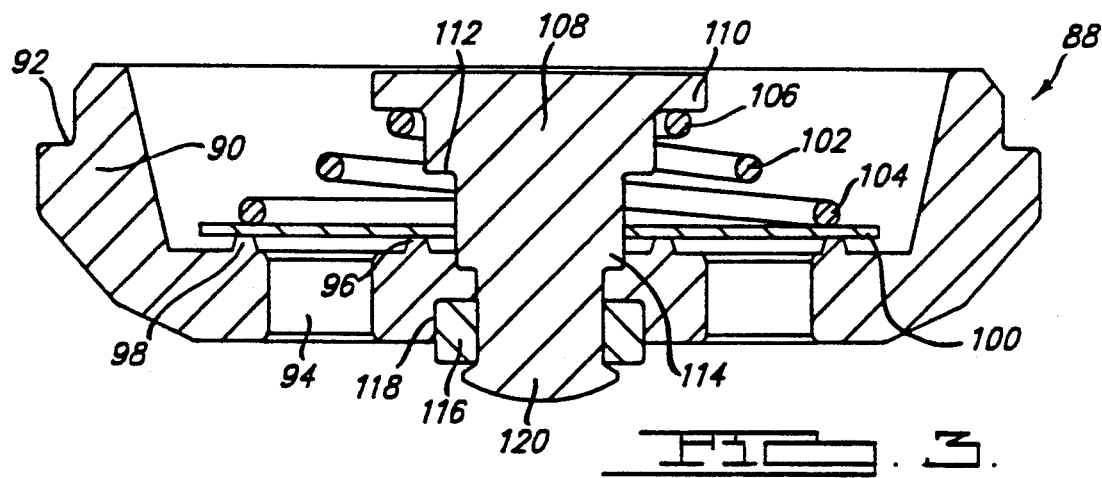
FIG. 3 is a cross-sectional view of the base valve shown in FIG. 2.

To allow damping fluid in the damping fluid reservoir 84 to flow into the working chamber 50, a base valve assembly 88 is provided as shown in FIG. 3. The base valve assembly 88 allows damping fluid to flow from the damping fluid reservoir 84 into the lower portion of the working chamber 50 during rebound. However, the base valve assembly 88 prevents the flow of damping fluid from the lower portion of the working chamber 50 to the damping fluid reservoir 84 through the base valve assembly 88 during compression. The base valve assembly 88 comprises a generally cup-shaped pressure cylinder end portion 90 which is disposed coaxially with, and adjacent to, the lower portion of the pressure cylinder 48. The end portion 90 contains a peripherally upwardly disposed recess 92 which is operable to engage the lower portion of the pressure cylinder 48. The pressure cylinder 48 is secured to the recess 92 by a suitable means such as a press fit.

The pressure cylinder end portion 90 comprises six upwardly disposed flow passages 94 which permit damping fluid to flow through the pressure cylinder end portion 90. The base valve assembly 88 further comprises first and second upwardly disposed annual projections 96 and 98 which are disposed on the upper surface of the pressure cylinder end portion 90. The upwardly disposed annular projection 96 extends coaxially with the axial center line of the pressure cylinder end portion 90 and resides adjacent to the radially inwardmost edge of the flow passages 94. Similarly, the upwardly disposed annular projection 98 extends coaxially with respect to the axial center line of the pressure cylinder end portion 90 and is adjacent to the radially outwardmost edge of the flow passages 94.

The flow of damping fluid through the flow passages 94 is regulated by an intake disk 100. The intake disk 100 is located perpendicular to the axial center line of the pressure cylinder end portion 90. Furthermore, the intake disk 100 rests on the upwardly disposed annular projections 96 and 98 when no damping fluid is flowing through the flow passages 94. Accordingly, the intake disk 100 is able to prevent the flow of damping fluid through the flow passages 94 while the intake disk 100 rests on the upwardly disposed annular projections 96 and 98.

To bias the intake disk 100 against the upwardly disposed annular projections 96 and 98, the base valve assembly 88 also comprises a tapered helical intake spring 102. The intake spring 102 is disposed coaxially with the axial center line of the pressure cylinder end portion 90, with the lower portion 104 of the intake spring 102 resting against the upper surface of the intake disk 100. The diameter of the lower portion 104 of the intake spring 102 is larger than the diameter of the upper portion 106 of the intake spring 102 so that the lower portion 104 of the intake spring 102 extends proximate to the radially outwardmost periphery of the intake disk 100. Because the lower portion 104 of the intake spring 102 biases the intake disk 100 against the upwardly disposed annular projections 96 and 98, damping fluid is able to flow through the flow passages 94 only when the force exerted by the damping fluid in the flow passages 94 is large enough to overcome the biasing force provided by the intake spring 102.

To secure the upper end of the intake spring 102 within the base valve assembly 88, the base valve assembly 88 further comprises a base valve pin 108. The base valve pin 108 extends through and is disposed coaxially with the axial center line of the pressure cylinder end portion 90. The base valve pin 108 also extends through a central aperture in the intake disk 100 so that the base valve pin 108 can prevent lateral movement of the intake disk 100. The upper portion of the base valve pin 108 includes a first flange portion 110 which extends perpendicularly with respect to the axial center line of the base valve pin 108. The upper surface of the intake spring 102 rests on the lower surface of the first flange portion 110 so as to secure the intake spring 102 within the base valve assembly 88.

The base valve pin 108 further comprises a second flange portion 112 and a third flange portion 114. Because the second flange portion 112 extends a greater radial distance than the central aperture of the intake disk 100 through which the base valve pin 108 extends, the flange portion 112 may limit upward movement of the intake disk 100. The third flange portion 114 extends a greater radial distance than the aperture of the pressure cylinder end portion 90 through which the base valve pin 108 extends. Accordingly, the third flange portion 114 limits downward movement of the base valve pin 108 with respect to the pressure cylinder end portion 90.

Upward movement of the base valve pin 108 is limited by an annular base valve insert 116 which is disposed within a central annular recess 118 on the lower surface of the pressure cylinder end portion 90. The base valve insert 116 is disposed coaxially with the axial center line of the base valve pin 108 and is disposed on the radial periphery of the base valve pin 108. Because the lower portion of the base valve pin 108 has a deformed head portion 120 having a greater radial diameter than the internal diameter of the base valve insert 116, the base valve insert 116 prevents upward movement of the base valve pin 108 with respect to the pressure cylinder end portion 90.

Figure 4A:
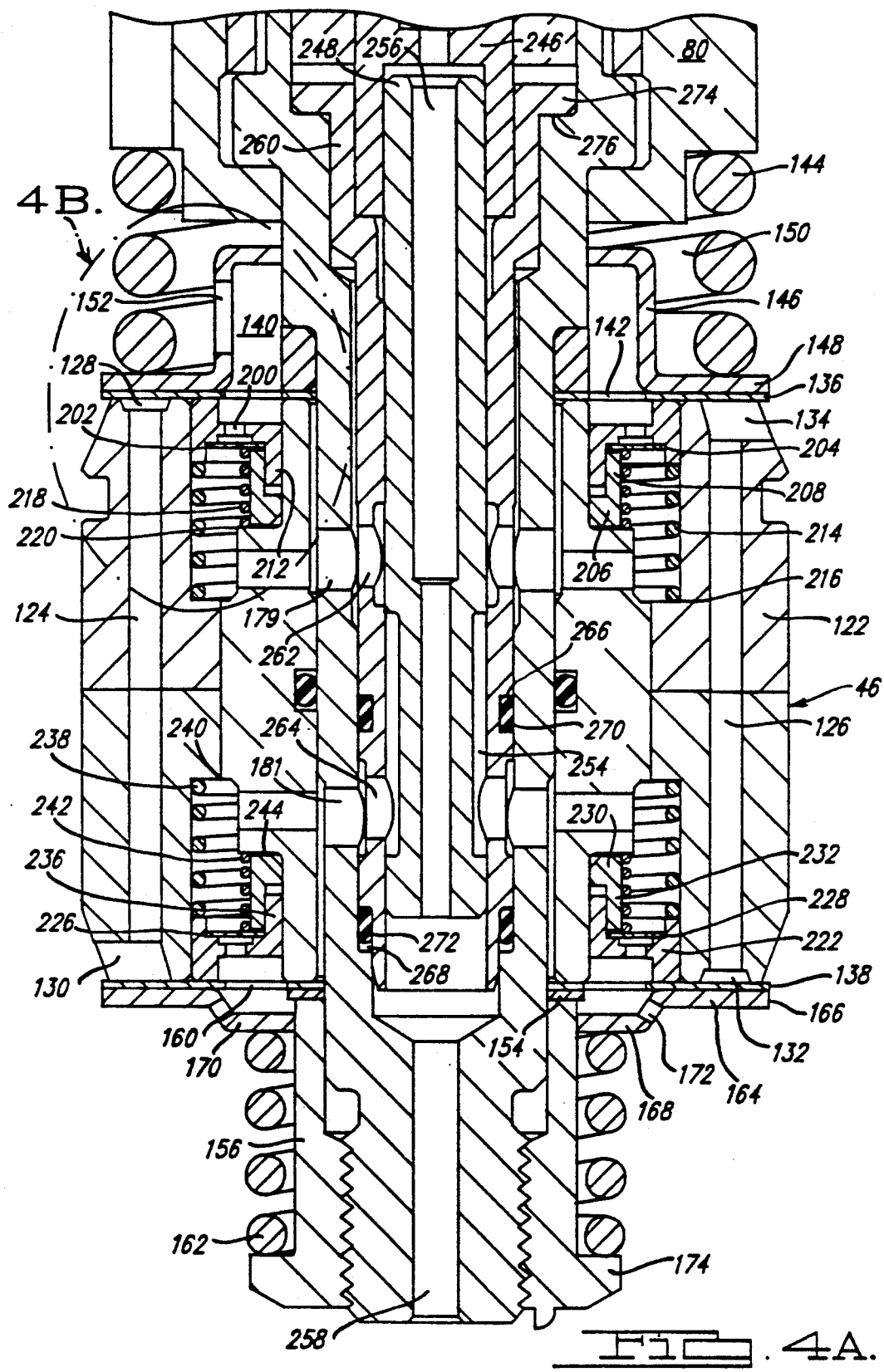
FIGS. 4A, 4B and 4C are cross-sectional views of the piston assembly and the lower portion of the piston post shown in FIG. 2.

The piston assembly 46 will now be described in greater detail with reference to FIGS. 4A, 4B and 4C. The piston assembly 46 is used for controlling the flow of damping fluid between the upper and lower portions of the working chamber 50. The piston assembly 46 comprises a valve body 122 having a first and second plurality of vertical flow passages 124 and 126. Each of the flow passages 124 comprises a valve controlled upper outlet end portion 128 and a lower counter-recessed inlet end portion 130. Similarly, each of the flow passages 126 comprise a valve controlled lower outlet end portion 132 and an upper counter-recessed inlet end portion 134.

To allow the piston assembly 46 to regulate the flow of damping fluid between the upper and lower portions of the working chamber 50, an upper spring disk 136 and a lower spring disk 138 are provided. The upper spring disk 136 is disposed adjacent to the upper outlet end portion 128 of the flow passages 124, as well as the upper inlet end portion 134 of the flow passages 126. In addition, the upper surface of the spring disk 136 is adjacent to an annular spacer 140 which is coaxially disposed on the periphery of the piston post 78. Accordingly, the spacer 140 and the piston assembly 46 prevent movement of the radially inward portion of the upper spring disk 136. The upper spring disk 136 further has a flow passage 142 which allows damping fluid to flow therethrough which is used to bias the spring disks 136 and 138 in a manner described below.

To place a biasing force on the upper surface of the upper spring disk 136, a first helical valve spring 144 and a annularly shaped spring seat 146 are provided. The spring seat 146 has a radially extending portion 148 as well as an axially extending portion 150. The radially extending portion 148 is disposed adjacent to the upper surface of the upper spring disk 136 and extends from the outer radial surface of the flow passage 142 to the radially outer edge of the upper spring disk 136. The axially extending portion 150 of the spring seat 146 extends from the radially extending portion 148 in an axially direction to a position immediately below the piston post rod nut 80. The axially extending portion 150 further comprises a flow passage 152 which allows damping fluid in the upper portion of the working chamber 50 to flow therethrough so as to provide the necessary biasing forces in the manner described below.

The helical valve spring 144 is disposed between the piston post rod nut 80 and the upper surface of the radially extending portion 148 of the spring seat 146. Since the valve spring 144 is in compression, the valve spring 144 forces the radially extending portion 148 of the spring seat 146 against the upper surface of the spring disk 136, which in turn forces the lower surface of the spring disk 136 against the upper outlet end portion 128 of the vertical flow passages 124.

The lower spring disk 138 is disposed adjacent to the lower surface of the piston assembly 46 adjacent to the lower outlet end portion 132 of the vertical flow passages 126 as well as the lower inlet end portion 130 of the vertical flow passages 124. The lower spring disk 138 is upwardly secured by the upper surface of the valve body 122, and is downwardly secured by a disk-shaped spacer 154 which is disposed coaxially above a piston nut 156 which threadably engages the externally threaded lower end portion of the piston post 78. Accordingly, the inner radial periphery of the lower spring disk 138 is secured between the spacer 154 and the valve body 122 by the piston nut 156. The lower spring disk 138 comprises a flow passage 160 which allows damping fluid in the lower portion of the working chamber 50 to flow therethrough. As will be described more thoroughly below, damping fluid flowing through the flow passage 160 is used for varying the biasing force applied to the upper spring disk 136 and thus the valve spring 144.

To provide biasing forces on the outer periphery of the lower spring disk 138, a second valve spring 162 and a spring seat 164 are provided. The spring seat 164 comprises a first radially extending portion 166 as well as a second radially extending portion 168. The first radially extending portion 166 is disposed coaxially above the second radially extending portion 168 and is connected thereto by the step portion 170. The step portion 170 further has a flow passage 172 which allows damping fluid to flow therethrough in a manner described below.

The second valve spring 162 is disposed adjacent to the outer periphery of the upper portion of the piston nut 156 with the upper surface of the valve spring 162 resting on the lower surface of the second radially extending portion 168 of the spring seat 164. The lower surface of the valve spring 162 rests on the upper surface of a radially extending flange portion 174 of the piston post 78. Because the valve spring 162 is in compression, the valve spring 162 places an upward biasing force on the spring seat 164 which places an upwardly directed biasing force on the lower spring disk 138. Accordingly, the lower spring disk 138 is able to limit the flow of damping fluid flowing through the flow passages 126 during rebound.

Figure 5:
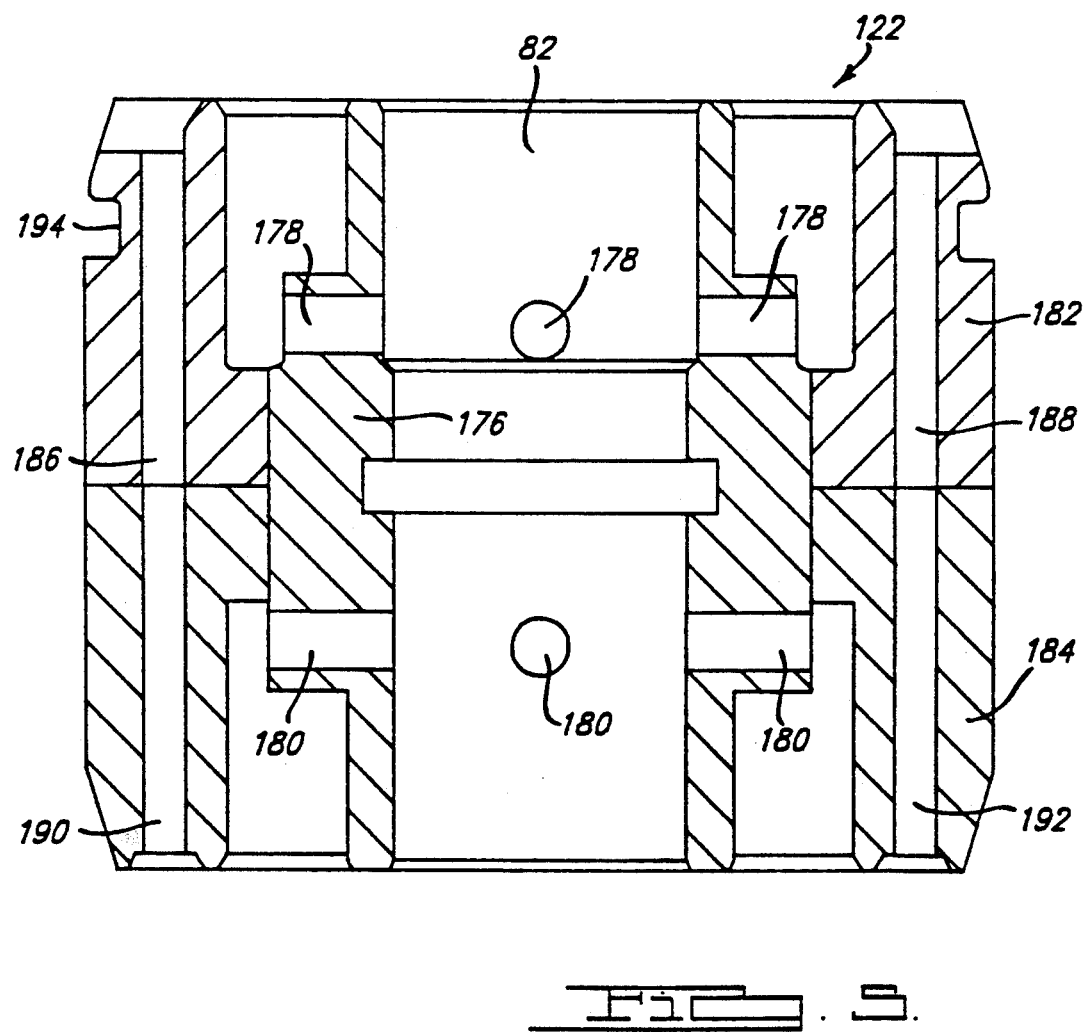
FIG. 5 is a cross-sectional view of the inner piston subassembly as well as the first and second outer piston subassemblies shown in FIG. 2.

The valve body 122 comprises an annular inner piston subassembly 176 as shown in FIG. 5. The annular inner piston subassembly 176 is disposed coaxially with the axial center line of the piston post 78, and is disposed on the outer radial periphery of the piston post 78 between the upper spring disk 136 and the lower spring disk 138. The inner piston subassembly 176 comprises a first plurality of flow passages 178 as well as a second plurality of flow passages 180. The first and second plurality of flow passages 178 and 180 radially extend from the axial center line of the inner piston subassembly 176. In addition, the center lines of the first plurality of flow passages 178 lie in a plane which is perpendicular to the axial center line of the inner piston subassembly 176 The center lines of the second plurality of flow passages 180 also reside in a plane which is perpendicular to the axial center line of the inner piston subassembly 176, though the flow passages 180 are displaced axially downward from the flow passages 178. The flow passage 178 fluidly communicate with a plurality of radially extending flow passages 179 which are disposed in the piston post 78, while the flow passages 180 communicate with a plurality of flow passages 181 also disposed in the piston post 78. The axial center lines of the flow passages 178 are colinear with the axial center lines of the flow passages 179, while the axial center lines of the flow passages 180 are colinear with the axial center lines of the flow passages 181.

The valve body 122 also comprises a first outer annular piston subassembly 182 and a second outer annular piston subassembly 184. The first and second outer annular piston subassemblies 182 and 184 are disposed on the radial outer peripheral edge of the inner piston subassembly 176 at a position proximate to the plane perpendicular to the axial center line of the piston assembly 46 dividing the inner piston subassembly 176 into similar portions. The first outer annular piston subassembly 182 comprises a plurality of flow passages 186 and 188 which extend coaxially with the axial center line of the piston post 78. In addition, the second outer annular piston subassembly 184 comprises a plurality of flow passages 190 and 192 which also extend coaxially with the axial center line of the piston post 78. Because the flow passages 186 of the first outer annular piston subassembly 182 are coaxial with the flow passages 190 of the second outer annular piston subassembly 184, the flow passages 186 and 190 form the vertical flow passages 124 as shown in FIG. 4A. Similarly, the flow passages 188 of the first outer annular piston subassembly 182 are coaxial with the flow passages 192 of the second outer annular piston subassembly 184 so as to form the flow passages 126 also shown in FIG. 4A.

The first outer annular piston subassembly 182 further comprises a annular groove 194 disposed on the radially outer surface of the subassembly 182. The annular groove 194 is of sufficient depth to secure the seal 196 (see FIG. 2B) disposed between the pressure cylinder 48 and the first outer annular piston subassembly 182. The annular inner piston subassembly 176, the first outer annular piston subassembly 182, as well as the second outer annular piston subassembly 184 may be rigidly secured to each after formation of the flow passages 178 and 180 by copper infiltration. Accordingly, difficulties otherwise encountered in forming the flow passages 178 and 180 if the subassemblies 176, 182 and 184 were initially an integral unit are reduced.

Figure 4B:
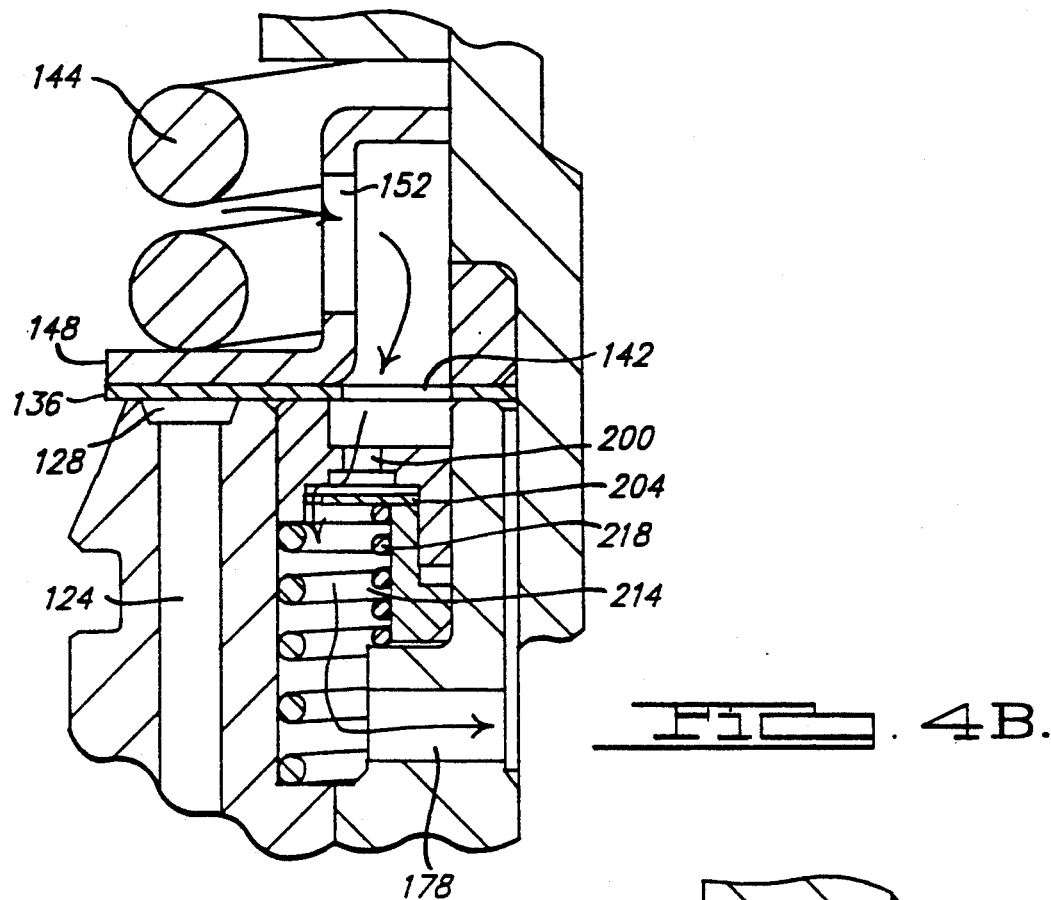
Figure 4C:
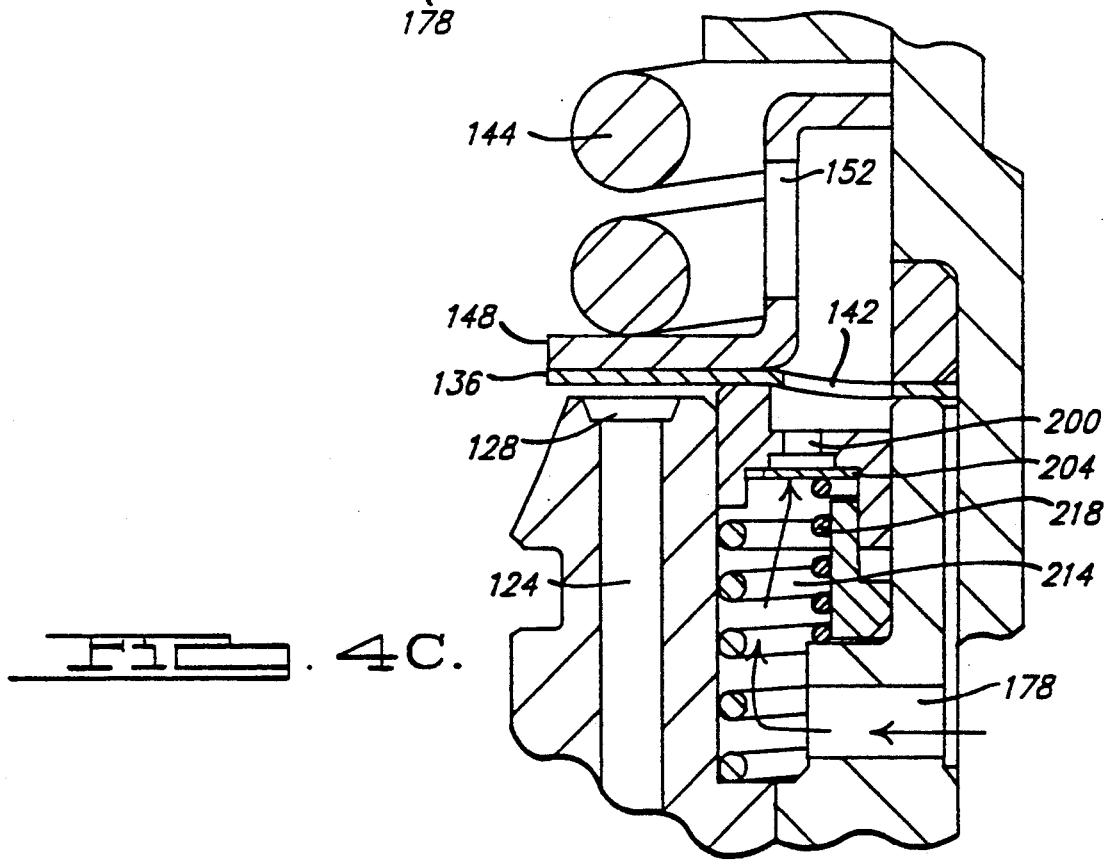

To vary the biasing force applied to the upper spring disk 136, an upper outer annular unloader 198 is provided (see FIGS. 4B and 4C). The radially inward surface of the upper outer unloader 198 is disposed on the radially outer surface of the upper portion of the inner piston subassembly 176. The radially outer surface of the upper outer unloader 198 mechanically communicates with the radially inner surface of the first outer annular piston subassembly 182, and has an upwardly disposed annular projection that mechanically communicates with the lower surface of the upper spring disk 136. The central portion of the upper outer unloader 198 includes a flow passage 200 as well as a valve seat 202. The valve seat 202 is used to prevent upward movement of a valve disk 204 which is used to limit the flow of damping fluid through the flow passage 200 in a manner described below.

To positionally secure the inner periphery of the valve disk 204, an upper inner unloader 206 is provided. The upper inner unloader 206 is disposed on the outer radial periphery of the upper portion of the inner piston subassembly 176. The upper inner unloader 206 comprises an axially extending portion 208 having a radially inward surface which is disposed adjacent to a radially outward surface of a downwardly extending projection 212 of the upper outer unloader 198. Furthermore, the upper inner unloader 206 is disposed so that the upwardmost surface of the upper inner unloader 206 is proximate to a radially inwardmost portion of the valve disk 204 thereby securing the valve disk 204 between the upper outer unloader 198 and the upper inner unloader 206.

To bias the upper outer unloader 198 against the upper spring disk 136, a helical coil spring 214 is provided. The helical coil spring 214 is disposed coaxially between the lower surface of the radially outwardmost portion of the upper outer unloader 198 and a step portion 216 in the first outer piston subassembly 182. Because the spring 214 is in compression, the spring 214 biases the upper outer unloader 198 against the lower surface of the upper spring disk 136. In addition, to bias the valve disk 204 against the valve seat 202, a helical spring 218 is provided. The spring 218 is disposed coaxially with the axial center line of the piston post 78 adjacent to the upper inner unloader 206. Upward movement of the spring 218 is limited by the valve seat 202, while downward movement of the spring 218 is limited by a step 220 which is disposed on the outer surface of the inner piston subassembly 176. The spring 218 is used to bias the valve disk 204 against the valve seat 202.

To vary the biasing force applied to the lower spring disk 138, a lower outer annular unloader 222 is provided. The radially inward surface of the lower outer unloader 222 is disposed o the radially outer surface of the lower portion of the inner piston subassembly 176. The radially outer portion of the lower outer unloader 222 has an upper surface which mechanically communicates with the upper surface of the lower spring disk 138, and has a radially extended surface which mechanically communicates with the second outer annular piston subassembly 184. The central portion of the lower outer unloader 222 includes a flow passage 224 as well as a valve seat 226. The valve seat 226 is used to prevent downward movement of a valve disk 228 which is used to limit the flow of damping fluid through the flow passage 224 in a manner described below.

To positionally secure the inner periphery of the valve disk 228, a lower inner unloader 230 is provided. The lower inner unloader 230 is disposed on the outer radial periphery of the lower portion of the inner piston subassembly 176. The lower inner unloader 230 comprises an axially extending portion 232 having a radially inward surface which is disposed adjacent to a radially outward surface of a upwardly extending projection 236 of the lower outer unloader 222. Furthermore, the lower inner unloader 230 is disposed so that the lowermost surface of the lower inner unloader 230 is proximate to a radially inwardmost portion of the valve disk 228 thereby securing the valve disk 228 between the lower outer unloader 222 and the lower inner unloader 230.

To bias the lower outer unloader 222 against the lower spring disk 138, a helical coil spring 238 is provided. The helical coil spring 238 is disposed coaxially between the upper surface of the radially outwardmost portion of the lower outer unloader 222 and a step portion 240 in the second outer piston subassembly 184. Because the spring 238 is in compression, the spring 238 biases the lower outer unloader 222 against the lower spring disk 138. In addition, to bias the valve disk 228 against the valve seat 226, a helical spring 242 is provided. The spring 242 is disposed coaxially with the axial center line of the piston post 78 adjacent to the lower inner unloader 230. Upward movement of the spring 242 is limited by the valve seat 226, while downward movement of the spring 242 is limited by a step 244 which is disposed on the outer surface of the inner piston subassembly 176. The spring 242 is used to bias the valve disk 228 against the valve seat 226.

To control the flow of damping fluid between the first plurality of flow passages 178 and the second plurality of flow passages 180 in the inner piston subassembly 176, flow control means including a solenoid operated upper plunger member 246 and an annular lower plunger member 248 are provided. The upper plunger member 246 is annular in shape and is disposed coaxially within the piston post 78. Disposed between the upper and lower surfaces of the upward plunger member 246 is a radially inwardly disposed step portion 250 which is used to seat a spring described below which bias the upper plunger member 246 in a downward direction. In addition, the upper plunger member 246 further comprises a pressure passage 252 which is axially disposed on the center line of the upper plunger member 246 and allows damping fluid to fluidly communicate therethrough. The lower portion of the upper plunger member 246 is secured to the upper portion of the lower plunger member 248 by a suitable means such as by welding.

The lower plunger member 248 is disposed coaxially within the piston post 78 and is cylindrical in cross-section. The lower plunger member 248 includes a region 254 located at the lower end of the lower plunger member 248 which has a reduced external radius. The region is used to allow damping fluid to flow between the flow passages 178 and 180 in the manner described below. In addition, the lower plunger member 248 includes a pressure passage 256 which allows damping fluid in the lower portion of the working chamber 50 to fluidly communicate with the pressure passage 252 of the upper plunger member 246 through the pressure passage 258 located at the lower end of the piston post 78.

To house the lower plunger member 248, a plunger housing 260 is provided. The plunger housing 260 is disposed on the inner periphery of the piston post 78 and extends coaxially therewith. The plunger housing 260 comprises a plurality of upper flow passages 262 and a plurality of lower flow passages 264. The upper flow passages 262 fluidly communicate with the flow passages 178 in the inner piston subassembly 176, as well as the flow passages 179 in the piston post 78. In addition, the lower flow passages 264 in the plunger housing 260 fluidly communicate with the second plurality of flow passages 180 in the inner piston subassembly 176, as well as the flow passages 181 in the piston post 78. Furthermore, the upper flow passages 262 are able to fluidly communicate with the lower flow passages 264 when the lower plunger member 248 is displaced sufficiently in an upward direction so that the region 254 of the lower plunger member 248 having a reduced external diameter is proximate to both the upper flow passages 262 and the lower flow passages 264.

The plunger housing 260 further comprises an upper annular groove 266 and a lower annular groove 268. Both the grooves 266 and 268 are disposed around the radial outer periphery of the plunger housing 260 adjacent to the piston post 78. The groove 266 is disposed between the upper flow passages 262 and the lower flow passages 264 in the plunger housing 260, while groove 268 is disposed between the lower flow passage 264 and the lowermost portion of the plunger housing 260. Disposed within the groove 266 is an annular seal 270 which prevents damping fluid from flowing between the plunger housing 260 and the piston post 78. Further, an annular seal 272 is disposed in the groove 268 which also prevents damping fluid from flowing between the plunger housing 260 and the piston post 78.

To limit downward movement of the plunger housing 260, the plunger housing 260 has a radial extending flange 274 disposed at the upper portion thereof. The flange 274 rests on a radially extending step portion 276 of the piston post 78. Because the internal diameter of the piston post 78 in the region proximate to the step portion 276 is less than the diameter of the radially outwardmost surface of the flange 274, the step portion 276 prevent the flange 274 and hence the plunger housing 260 from being displaced in a downward direction. Upward movement of the plunger housing 260 is limited by an annular spacer 278 which is disposed adjacent to the upper surface of the flange 274 of the plunger housing 260. The spacer 278 is disposed adjacent to the radially outward surface of the upper plunger member 246 and is also adjacent to the radially inwardmost surface of the piston post 78.

To cause movement of the lower plunger member 248 within the plunger housing 260, an annular coil 286 is provided. The annular coil 286 is disposed on the inner periphery of the piston post 78 at a position above the spacer 278. The coil 286 is formed around an annular coil sleeve 288 which resides on the inner periphery of the coil 286 and is located approximate to the radially outer surface of the upper plunger member 246. In addition, the annular coil 286 comprises a pressure passage 289 disposed axially through the sleeve 288 which permits damping fluid to fluidly communicate between the lower portion of the working chamber 50 and the pressure sensor described below.

As those skilled in the art will recognize, the upper plunger member 246, the lower plunger 248 and the coil 286 form a solenoid. The application of current to the coil 286 will cause the upper plunger member 246 to be upwardly displaced thereby causing the region 254 of the lower plunger member 248 to be proximate to the upper flow passages 262, as well as the lower flow passages 264. When this occurs, damping fluid is able to flow from the upper portion of the working chamber 50 to the area immediately above the lower outer unloader 222 during rebound through the following path passages: the flow passage 152, the flow passage 142, the flow passage 200, the flow passage 178, the flow passage 179, the flow passage 262, the flow passage formed between the region 254 and the plunger housing 260, the flow passage 264, the flow passage 181, and the flow passage 180. When this occurs, the increased pressure caused by fluid flowing through these flow passages causes the biasing forces exerted on the lower outer unloader 222 to increase, thereby causing the lower outer unloader 222 and hence the lower spring disk 138 to be displaced in a downward direction. More damping fluid is therefore able to flow through the flow passages 126 thereby decreasing the damping forces which the piston assembly 46 generates so as to provide a soft rebound stroke.

When the piston assembly 46 is in compression, damping fluid is able to flow through the following flow passages from the lower portion of the working chamber 50 to the region immediately below the upper outer unloader 198: the flow passage 172, the flow passage 160, the flow passage 224, the flow passage 180, the flow passage 181, the flow passage 264, the flow passage formed between the region 254 and the plunger housing 260, the flow passage 262, the flow passage 179, and the flow passage 178. When this occurs, the increased pressure caused by the fluid flowing through these flow passages cause the biasing forces exerted on the upper outer unloader 198 to increase (see FIG. 4C), thereby increasing the biasing force exerted on the upper spring disk 136 in an upward direction. Accordingly, a greater amount of damping fluid is able to flow through the flow passages 124 to thereby cause a soft compression stroke.

When the lower plunger member 248 is displaced downward in such a manner that the region 254 is not proximate to the flow passages 262 and 264, damping fluid is unable to flow between the upper portion of the working chamber 50 to the area above the lower outer unloader 222 during rebound, nor is able to flow from the lower portion of the working chamber 50 to the area immediately below the upper outer unloader 198 during compression. Accordingly, the only biasing forces exerted on the upper spring disk 136 is that which is exerted primarily by the spring 144 as the forces exerted by the springs 214 and 218 are negligible. Similarly, the only biasing force acting on the lower spring disk 138 is that which is generated primarily by the spring 162 as the forces exerted by the springs 238 and 242 are negligible. Accordingly, a firm rebound and compression stroke will be generated.

Figure 6A:
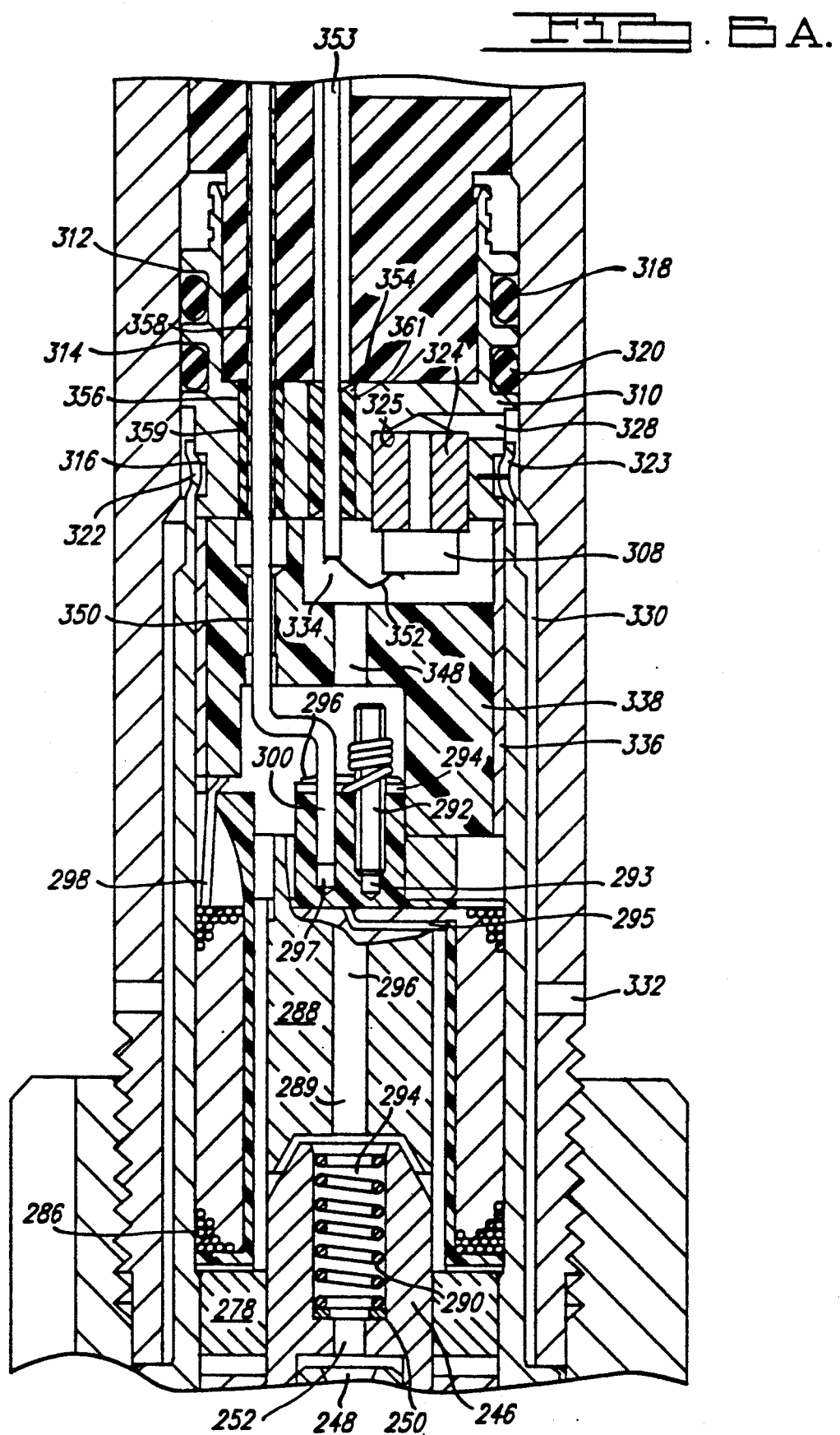
FIGS. 6A and 6B is a cross-sectional view of a portion of the piston rod shown in FIG. 2 taken in the region immediately above the piston nut.
Figure 6B:
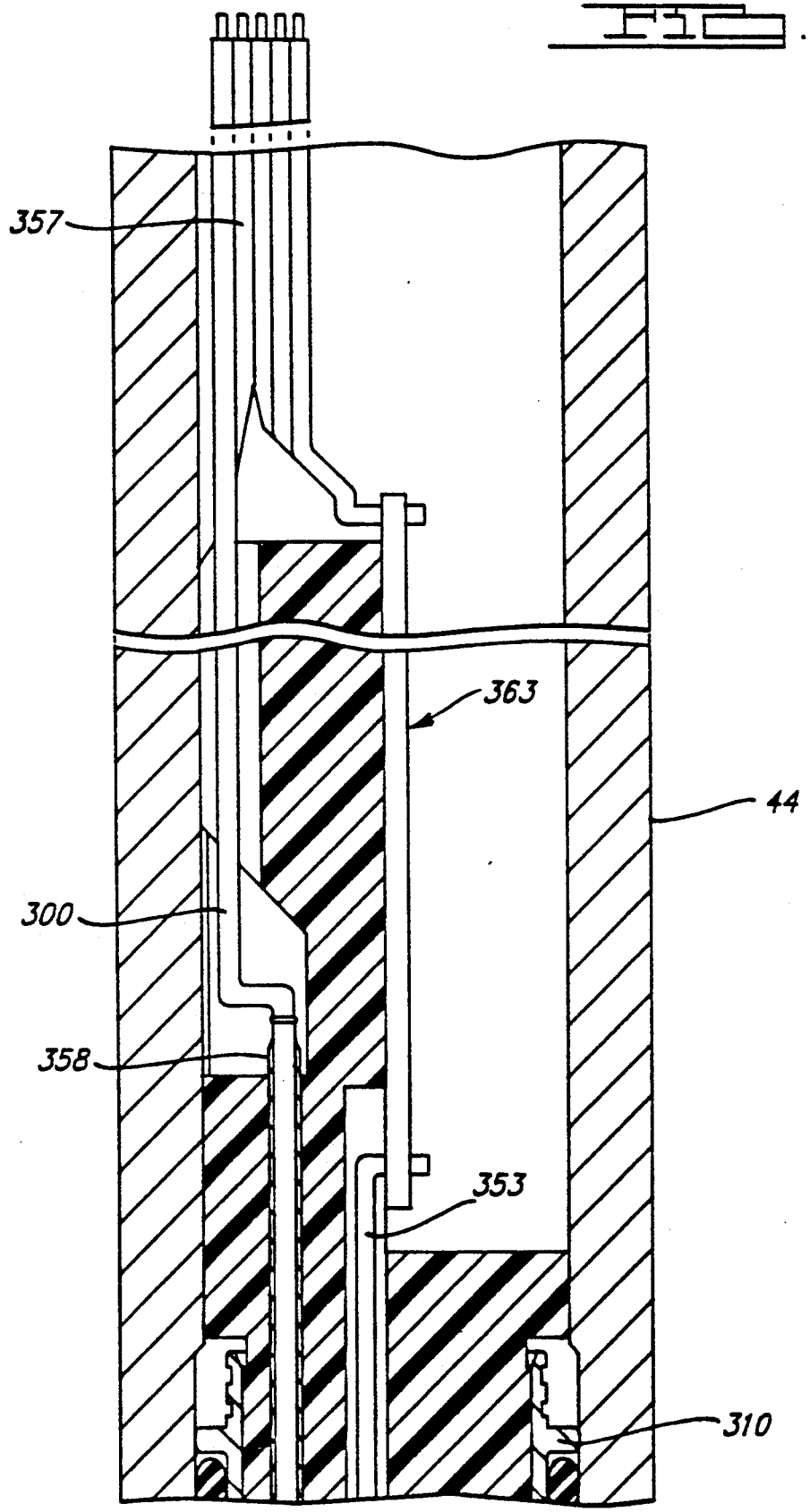

To bias the upper plunger member 246 and the lower plunger member 248 in a downward direction, a helical spring 290 is provided which is disposed coaxially within the upper plunger member 246. The lower portion of the helical spring 290 rests on the step portion 250 of the upper plunger member 246. The upper portion of the spring 290 rests on the lower surface of the annular coil sleeve 288. To allow the coil 286 to receive current from the electronic control module 34, the shock absorber 10 further comprises a pin 292. The pin 292 is disposed in a bore 293 which extends downwardly from the upper surface 294 of the annular coil sleeve 288. Wound around the upper portion of the pin 292 is a first lead 295 from the coil 286. A solder region 296 allows electrical communication between the lead 295 and one of two conductors 300 which is disposed within the bore 297 and used to allow electrical communication between the lead 295 and a flex circuit described below. While only one pin 292 is shown in FIG. 6A, it will be understood that another pin similar to pin 292 exists on the annular coil sleeve 288 which is able to accommodate the second lead 297 from the coil 286. The second lead 297 is therefore able to electrically communicate with another of the conductors 300.

To determine whether the shock absorber 10 is in compression or rebound, a pressure sensor 308 is provided. The pressure sensor 308 is electrically connected to the signal conditioning circuits described below through four conductors 353 which are electrically connected to the pressure sensor 308 via the leads 352. The pressure sensor 308 is supported in the piston rod 44 by a header 310 which is disposed in the piston rod 44 at a position above the annular coil 286. The header 310 is annularly shaped and has three radially extending grooves 312, 314 and 316 on the outer periphery thereof. The groove 312 is used to accommodate an annular seal 318 which is disposed in the groove 312 between the piston rod 44 and the header 310. In addition, the groove 314 is used to accommodate an annular seal 320 which is also disposed between the piston rod 44 and the header 310, though at a position below the seal 318. The groove 316 is used to accommodate a radially inwardly directed tab 322 which is disposed at the upper end of the piston post 44. Because the groove 316 engages the tab 322, the tab 322 prevents movement of the header 310 within the piston rod 44. An anti-rotation pin 323 extends radially inward through the tab 322 and engages the header 310 so as to prevent rotational movement of the header 310 with respect to the piston post 78.

The pressure sensor 308 is secured to the lower surface of the header 310 by means of an annular tube 324 which is preferably fabricated from Kovar. The annular tube 324 is disposed in an upwardly extending bore 325 extending upwardly from the lower surface of the header 310. The annular tube 324 may be preferably secured to the bore 325 by epoxy cement, and the pressure sensor 308 may also be preferably secured to the lower surface of the annular tube 324 by epoxy cement. To allow the upper surface of the pressure sensor 308 to receive damping fluid from the upper portion of the working chamber 50, the header 310 includes a radially extending pressure passage 328. The pressure passage 328 allows damping fluid to fluidly communicate between the upper surface of the pressure sensor 308 and pressure passage 330 which is the region between the piston rod 44 and the piston post 78. The pressure passage 330 in turn fluidly communicates in turn with the pressure passage 332 which extends radially through the piston rod 44 into the upper portion of the working chamber 50. Accordingly, damping fluid from the upper portion of the working chamber 50 is able to fluidly communicate with the upper surface of the pressure sensor 308 through the pressure passage 328, the pressure passage 330 and the pressure passage 332.

To allow the lower surface of the pressure sensor 308 to be exposed to damping fluid at the same pressure as that which is in the lower portion of the working chamber 50, a pressure cavity 334 is provided. The pressure cavity 334 is disposed immediately adjacent to the lower surface of the pressure sensor 308. The upper surface of the pressure cavity 334 is formed by the header 310, while the sides of the pressure cavity 334 are formed in part by an annulus 336 which is disposed adjacent to the inside periphery of the piston post 78 at a position immediately below the header 310. The lower surface of the pressure cavity 334 as well as a portion of the side of the pressure cavity 334 is formed by a spacer 338 which will be more thoroughly described below.

The spacer 338 is disposed in the piston rod 44 between the pressure sensor 308 and the coil 286. To allow damping fluid in the pressure passage 289 of the annular coil 286 to fluidly communicate with the pressure cavity 334, the spacer 338 further comprises a central bore 348. The central bore 348 extends axially through the spacer 338 from the pressure cavity 334 to the region immediately adjacent the coil 286. In addition, the spacer 338 includes a bore 350 which extends also axially through the spacer 338. The bore 350 permits one of the conductors 300 from the coil 286 to pass through the spacer 338. A second bore (not shown) similar to the bore 350 is also located in the spacer and allows another of the conductors 300 to pass therethrough.

To allow the conductors 300 of the coil 286 and the conductors 353 from the pressure sensor 308 to pass through the header 310, the header 310 has four bores 354 and two bores 356 which extend axially through the header 310. Each of the bores 356 is sufficient to accommodate one of the two conductors 300 as it passes through the header 310.

In addition, the bores 356 are sufficiently large to accommodate a plurality of axially extending tubes 358 each of which extend through one of the bores 356. The tubes 358 are used to facilitate electrical connection between the coil 286 and the signal conditioning circuit assembly described below. A glass frit 359 is disposed in the region between each of the tubes 358 and the walls of the bores 356 through which the tubes 358 extend. The glass frit 359 disposed within the bores 356 is used to seal the bores 356 as well as to electrically isolate the tubes 358. Further, each of the conductors 300 are secured and sealed to the upper portion of the tube 358 through which the conductors 300 extend by solder at the upper portion of the tubes 358. Each of the conductors 353 are secured and sealed to the bores 354 through which they extend by means of glass frit 361 disposed between the walls of each of the bores 354 and the conductors 353.

The conductors 300, which electrically communicate with the annular coil 286, as well as the conductors 353, which electrically communicate with the pressure sensor 308, are electrically connected to a flex circuit 357 which is connected to a signal conditioning circuit assembly 363. The signal conditioning circuit assembly 363 is used to condition the signals received from the pressure sensor 308 which in turn are delivered to the electronic control module 34 through the flex circuit 357. In addition, the signal conditioning circuit assembly 363 also permits direct electrical communication between the flex circuit 357 and the conductors 300 (i.e., without signal conditioning) which in turn electrically communicates with the coil 286. The signal conditioning circuit assembly 363 may include electronic components which are able to temperature compensate, buffer and amplify the output from the pressure sensor 308. While the signal conditioning circuit assembly 363 may be that which is disclosed in U.S. patent application Ser. No. 322,543 filed Mar. 13, 1989, other suitable signal conditioning circuit assemblies may be used.

As discussed above, the electronic control module 34 is used for controlling the damping characteristics of the shock absorbers 10 in response to the movement of the body and wheel of the automobile 12. For determining the relative velocity of the body 30, a plurality of accelerometers 364 are provided as shown in FIG. 7. The accelerometers 364 may be attached to the body near each wheel, or may be physically located within the piston rod 44 of each of the shock absorbers 10. As more fully discussed below, the output from each of the accelerometers 364 are integrated so as to determine the velocity at which the corner of the body 30 associated with the shock absorber 10 is moving. To decide whether the shock absorber 10 is in compression or rebound, the electronic control module 34 determines whether the output from the pressure sensors 308 associated with a shock absorber 10 is either positive or negative. For example, a positive output from the pressure sensor 308 indicates that the shock absorber 10 is in compression while a negative output from the pressure sensor 308 indicates that the shock absorber 10 is in rebound. By appropriately processing the information from the pressure sensor 308 and the accelerometer 364, the electronic control module 34 can adjust the damping characteristics of the shock absorber 10 to provide the desired ride and road holding characteristics.

The operation of the electronic control module 34 will now be described in greater detail. As shown in FIG. 7, the electronic control module 34 comprises a plurality of low-pass filters 366. Each of the low-pass filters 366 receives the output from one pressure sensor 308 or the output from one of the accelerometers 364. The low-pass filters 366 are used for eliminating high frequency signals and to provide anti-aliasing which might otherwise interfere with the operation of the electronic control module 34. The outputs from the low-pass filters 366 are delivered to a microprocessor 374. While the microprocessor may comprise an Intel 8097, other suitable microprocessors might be used.

The microprocessor 374 also receives input from the mode select switch 32. As discussed above, the mode select switch 32 is used by the driver for selecting the type of driving characteristics which are desired. For example, the driver of the automobile may either want firm damping characteristics, soft damping characteristics, or may want the electronic control module 34 to select the damping characteristics. In addition, the microprocessor 374 also receives input from a system undervoltage detection circuit 376. The system undervoltage detection circuit 376 is used to indicate to the microprocessor 374 that a low voltage condition (i.e., below 8.5-9.0 volts) is being experienced by the vehicle's electrical system which is generally indicated by the box designated by the numeral 378. When this occurs, the microprocessor 374 deactivates automatic damping system so as to provide firm damping during both compression and rebound.

The microprocessor 374 also receives the output from a power supply 380 which is connected to the vehicle igniting system 382. The power supply 380 and vehicle ignition system 382 of the automobile 12 generates three signals which are used by the electronic control module 34. The power supply 380 first generates a five-volt signal which issued for providing the supply voltage for the electronic control module 34. In addition, the power supply 380 generates a reset signal which is used by the microprocessor 374 to indicate that the ignition switch on the automobile has just been activated. Finally, the microprocessor 374 generates a pulse train (250-350 Hz) which is used for providing watchdog timing pulses to the power supply 380 so as to inhibit system reset.

The microprocessor 374 is sued for executing the instructions which are provided in an EPROM 384 as will be more fully discussed below. The microprocessor 374 and the EPROM 384 are electrically connected to a RAM 386 which is used during the execution of the program stored in the EPROM 384. The microprocessor 374 also communicates with an EPROM 388 which is used to receive and store the most recent diagnostic data concerning the failure modes of each of the shock absorbers 10, as well as data concerning the pressure sensor 308, the accelerometers 364, the coils 286, as well as the solenoid drivers 382. In addition, the microprocessor 374 electrically communicates with an external watchdog circuit 390 which prevents the coil 286 of each of the shock absorbers 10 from activating during power-up. In addition, the external watchdog circuit 390 monitors the output from the microprocessor 374 to determine whether the output is within a given range (i.e., 250-550 Hz). If the output of the microprocessor 374 is not with the given range, the external watchdog circuit 390 prevents the coils 286 from energizing.

The output from the microprocessor 374 containing information on how the coil 286 of each of the shock absorbers 10 should be energized is delivered to the solenoid drivers 392. The solenoid drivers 392 are used for controlling the current which is delivered to the coil 286 associated with each shock absorber 10. The solenoid drivers 392 may be used for providing a relatively high current to the coil 286 so as to cause the position of the lower plunger member 248 to change, then reducing the current to a holing current so as to maintain the position of the lower plunger member 248 while preventing the coil 286 from burning out.

In addition, the electronic control module 34 comprises a failsafe detection circuit 393. The failsafe detection circuit 393 is used for shutting down the operation of the damping system in the event that a short or open circuit is detected in any of the coils 286.

For development purposes, it may also be useful to have the electronic control module 34 include a serial data link circuit 394, a LED panel 396, as well as a digital-to-analog converter 400. The data link circuit 394 is used to provide an RS232 interface between the microprocessor 374 and development tools such as an external computer. The LED panel 396 may be used to visually indicate whether each of the shock absorbers 10 are adjusted to provide firm or soft damping during compression and rebound. The digital-to-analog converter 4090 may be used to provide an analog output for purposes of adjusting various system parameters described below and for monitoring internal signals.

Before discussing the operation of software which is shown in FIGS. 8-, it will be noted that two alternative methods have been developed for causing the shock absorbers 10 to provide firm damping during both compressing and rebound if the amplitude of the vertical movement of the wheel becomes too great at the resonant frequency of the wheels. In the first method, a high-pass filter is used to initially filter the frequency of the vertical movement of the wheel so as to allow only frequencies at or above the resonance frequency (i.e., RESONANCE FREQUENCY) of the wheel to be considered. Then if the amplitude of the wheel movement exceeds a given threshold (i.e., WHEELCONTROLTHRESHOLD) when the frequency exceeds the resonance frequency, the microprocessor 374 causes firm damping to be provided during both compression and rebound. The high-pass filtering method may also involve rectifying the output from the high-pass filter and passing it through a low-pass filter so as to smooth the signal. In the second method, the discrete fourier transform of the differential pressure between the upper and lower portions of the working chamber is first calculated. The discrete fourier transform is then compared to a threshold, the exceedance of which will cause firm damping during both compression and rebound. The manner in which each of these methods are used will be described below.

The MAIN routine, which is shown in FIG. 8, acts as a scheduler for the program. The first step in the MAIN routine is step 404 which causes the INITIALIZATION routine to be performed. As more fully discussed below, the INITIALIZATION routine, represents a portion of the MAIN routine, which is used for clearing RAM data storage spaces as well as for initializing and reserving storage space for the stack pointer. After step 404 is executed, the step 408 is executed. At step 408, the microprocessor 374 initializes certain variables to indicate that the left front shock absorber 10 will be the first to be evaluated. In this regard, the variable CORNER which represents the data location of the information regarding one of the four shock absorbers 10 is set equal to a memory location which represents the base location of the data concerning the left front shock absorber. Further, the variable SOLMASK is set to 00 00 11 bitwise which is used in the DECIDE routine described below to indicate which of the four shock absorbers 10 is currently under evaluation. Finally, the variable CONSTANT is set equal to a value which indicates that the data from either of the two front shock absorbers is being considered.

After executing step 408, the microprocessor 374 executes step 410. At step 410, the microprocessor 374 determines whether a timer interrupt has occurred which happens every two milliseconds. If the timer interrupt has not occurred at the time step 410 is executed, step 410 is again executed to determine whether a timer interrupt has occurred. This process continues until the microprocessor 374 determines at step 410 that a timer interrupt has occurred.

After the microprocessor 374 determines that a timer interrupt has occurred at step 410, the microprocessor 374 determines whether the driver of the automobile 12 has set the mode select switch 32 in automatic mode. If the microprocessor 374 determines at step 412 that the mode select switch 32 is not in automatic mode, the microprocessor 374 executes step 414. At step 414, the microprocessor 374 determines whether the driver of the automobile 12 has set the mode select switch 32 in manual mode. If the microprocessor 374 determines at step 414 that the mode select switch 32 is not in manular mode, the microprocessor 374 executes step 416 in which a diagnostic routine may be executed. If the microprocessor 374 determines at step 414 that the driver of the automobile 12 has set the mode select switch 32 in the manual mode, the microprocessor 374 then executes step 418 in which the MANUAL portion of the MAIN routine is executed which is discussed below. After the MANUAL portion of the MAIN routine is executed at step 418, the microprocessor 374 then returns to step 408 discussed above.

If the microprocessor 374 determines at step 412 that the driver of the automobile 12 has set the mode select switch 32 in automatic mode, the microprocessor 374 executes step 420. As more fully described below, step 420 calls the CALCVEL routine which is used to calculate the vertical velocity of the corner of the body from the outputs from one of the accelerometers 364 which corresponds to that corner. After the microprocessor 374 executes step 420, the microprocessor 374 executes step 422 in which the PRESSURE routine is called. As more fully described below, the PRESSURE routine is used to determine whether the shock absorber 10 in question is either in compression or rebound.

As discussed above, these are two alternative methods which may be used to cause the shock absorber 10 to provide firm damping during compression and rebound if excessive vertical wheel movement occurs. If the high-pass filtering method is used, the microprocessor 374 determines whether the frequency of vertical movement of the wheel exceeds the resonant frequency of the wheel (10-15 Hz) by using a high-pass filtering routine.

After executing step 425 or if at step 422 the discrete fourier transform method is used to determine whether the is excessive vertical wheel movement, the microprocessor 374 executes step 424 in which the DECIDE routine is called. As described below, the DECIDE routine is used for determining whether the shock absorber 10 in question should be adjusted so as to provide a firm or soft damping characteristics. After executing step 424, the microprocessor 374 executes step 426 in which the SOLENOID routine is called. As discussed below, the SOLENOID routine is used for determining whether the coil 286 should be energized or deenergized. After the step 426 has been executed, the microprocessor 374 executes step 428. At step 428, the microprocessor 374 determines whether the value of the variable CORNER is equal to the RAM address location where information regarding the right rear shock absorber is stored.

If the value of CORNER is equal to a RAM address location where in formation concerning the right rear shock absorber is store and the discrete fourier transform method is used for causing firm damping upon excessive vertical wheel movement, the microprocessor 374 executes step 430. At step 430, the microprocessor 374 calls the AMPLITUDE routine which takes the discrete fourier transform of the output from the pressure sensor 08. The discrete fourier transform of the output of the pressure sensor 308 is then set equal to the variable AMP which is used in the DECIDE routine described below. The discrete fourier transform is calculated by the AMPLITUDE routine according to the following equation:

$$AMP = \left[\left(\sum_{t=0}^{T} P_t \times \sin\frac{2\pi t}{T}\right)^2 + \left(\sum_{t=0}^{T} P_t \times \cos\frac{2\pi t}{T}\right)^2\right]$$

where:
$P_t$ is the differential pressure between the upper portion and the lower portion of the working chamber 50 at time t; and
T is the period of the resonant frequency of the wheels of the automobile 12 (i.e., the reciprocal of RESONANCE FREQUENCY).

Each time step 430 is executed, the discrete fourier transform of pressure response for a different shock absorber is calculated. Further, step 430 is unnecessary if the high-pass filter method of determining whether there is excessive vertical wheel movement is used. After executing step 430, or if at step 428 the high-pass filter method is used for causing firm damping upon excessive vertical wheel movement and the variable CORNER is equal to the RAM address location where information regarding the right rear shock absorber is stored, the microprocessor 374 executes step 431. At step 431, the microprocessor 374 causes the LED panel 396 to illuminate to provide an indication of whether a firm or soft compression and rebound stroke is desired for each shock absorber. Step 431 is generally used for developmental purposes. After executing step 431, the microprocessor 374 executes step 408 discussed above.

If the value of the variable CORNER is not equal to the RAM address location where information regarding the right rear shock absorber is stored, as determined at step 428, the microprocessor 374 executes step 432. At step 432, the microprocessor 374 shifts the bit pattern in SOL_MASK to the left by two bits. For example, if the last shock absorber 10 to be evaluated was the left corner shock absorber, the SOL_MASK bit pattern would change from 00 00 00 11 to 00 00 11 00. Also at step 432, the value of the variable CORNER is increased by an offset so as to indicate the address of the data regarding the next shock absorber 10 which is to be adjusted.

After executing step 432, the microprocessor 374 executes step 434 which determines whether the value of the variable CORNER is greater than the base RAM address location where information regarding the rear shock absorbers 10 are stored. Accordingly, step 434 determines whether the data concerning the front shock absorbers is being reviewed, or is the data concerning the rear shock absorbers being reviewed. As discussed below, different parameters are used with the front shock absorbers 10 as compared to the rear shock absorbers 10.

If at step 432 the microprocessor 374 determines that the value of the variable CORNER is not greater than the base RAM address location where information regarding the rear shock absorbers 10 are stored, the microprocessor 374 executes step 420 discussed above. If at step 434 the microprocessor 374 determines that the value of the variable CORNER is greater than the base RAM address location where information regarding the rear shock absorbers are stored, the microprocessor 374 executes step 436 in which the variable CONSTANT is set equal to a value which indicates that a rear shock absorber is being evaluated. After executing step 436, the microprocessor 374 executes step 420 discussed above.

The INITIALIZATION routine, which represents a portion of the MAIN routine, will now be described with reference to FIG. 9. The first step in the INITIALIZATION routine is step 440 in which the outputs of the microprocessor 374 which are delivered to the solenoid drivers 392 are disabled. After executing step 440, the microprocessor 374 executes step 442 which causes a one second delay to occur. This delay allows the pressure sensors 308 as well as the accelerometers 364 to power-up and thereby generate a signal indicative of current status of the shock absorber 10. After executing step 442, the microprocessor 374 executes step 444. At step 444, the microprocessor 374 determines whether serial communication has been requested via the data link circuit 394. If communication has been requested as determined by step 442, the microprocessor 374 executes step 446 in which establishes a serial communications port. After executing step 446 or if at step 444 the microprocessor 374 determines that serial communication has not been requested, the microprocessor then executes step 448.

At step 448, the microprocessor 374 determines whether the parameters used for adjusting the shock absorbers 10 have been altered. The parameters which are used by the microprocessor 374 are given below:

| | |
|---|---|
| FIRM-ON TIME: | The number of cycles which the shock absorber is held in firm rebound or firm compression (typically 50 cycles depending on the vehicle type and the desired ride characteristics). |
| WHEEL_CONTROL_THRESHOLD: | Is used as a threshold for determining whether the DECIDE routine should cause the shock absorber in question to provide firm damping during compression and rebound (typically 90 psi). |
| RESONANCE FREQUENCY: | Is the resonant frequency of the wheels of automobile 12 (typically 10-12 Hz). |
| POS_THRESHOLD: | Is the positive velocity threshold. the exceedance of which will cause the DECIDE routine to signal a firm rebound stroke (typically 5-8 inchs/sec.). |
| NEG_THRESHOLD: | Is the negative velocity threshold. the exceedance of which will cause the DECIDE routine to signal a firm compression stroke (typically 5-8 inches/sec.). |
| PRESS_DEADBAND: | Is used to set a level between which a pressure signal is considered noise. |

Because the damping characteristics of the front shock absorbers are generally different than the damping characteristics of the rear shock absorbers, the value of these parameters for a given shock absorber will depend in part on whether the shock absorber is located in the front or the rear of the automobile 12 (i.e., a different set of parameters is used for the front set of shock absorbers than is used for the rear set). These parameters are stored in the memory of the microprocessor 374 and will be used unless the microprocessor 374 determines at step 448 that the parameters have been altered. If at step 448 the microprocessor 374 determines that the parameters have not been altered, the microprocessor 374 executes step 450 which loads the default parameters into the memory of the microprocessor 374.

After executing step 450, or if at step 448 the microprocessor 374 determines that the parameters have been altered, the microprocessor 374 executes step 452 in which the storage locations in the RAM 386 other than those storing the parameters are cleared. After executing step 452, the microprocessor 374 executes step 454 in which the microprocessor 374 reads and computes the DC bias voltages from the pressure sensors 308 and the accelerometers 364.

After executing step 454, step 406 is executed which initializes the interrupts. These interrupts include the cycle time interrupt which is set at two milliseconds, as well as a discrete fourier transform interrupt (if a discrete fourier transform is used) which is used when the pressure values of the pressure sensors 308 to be read. An interrupt is also used for pulsing voltage to the coil 286 if the coil 286 is driven by pulse width modulation. An interrupt may also be associated with external data communications if desired during development. After executing step 406, the microprocessor 374 causes step 408 of the MAIN routine to be executed.

The CALC_VEL routine will now be described with reference to FIG. 10. The first step in the CALC VEL routine is step 460 in which the microprocessor 374 converts the analog output of one of the accelerometers 364 into digital form and sets the digitized value of the acceleration equal to the variable ACC. After the acceleration is read at step 460, the microprocessor 374 performs high-pass filtering to determine the D.C. bias voltage by executing the steps 462-470. At step 462, the D.C. average acceleration AVE_A, which is determined from the DC bias voltage of the accelerometers 364, is read from memory. After executing step 462, the microprocessor 374 executes step 464 which adds the value of ACC to the DC average acceleration AVE_A and sets this value equal to AVE_A.

After executing step 464, the microprocessor 374 executes step 466 in which the value of AVE_A divided by the constant K is subtracted from the value of AVE_A. The value of the constant K in the CA_VEL routine is equal to 500 to give a cutoff frequency of 0.16 Hz. The result of this subtraction is then assigned to the variable AVE_A'. After executing step 466, the microprocessor 374 executes step 468. At step 468, the value of AVE_A' divided by the value of the constant K is subtracted from the value of ACC. This value is then set equal to the variable ACC. After executing step 468, the microprocessor 374 executes step 470 which stores the value of AVE_A' in memory which is used as the DC average acceleration for the next cycle for the shock absorber 10 under consideration. After executing step 470, the microprocessor 374 executes step 472 in which velocity is calculated by multiplying the value of ACC by the change in time from the last time that velocity was calculated for the shock absorber 10 under consideration (approximately 2 milliseconds) and is added to the value of the variable VEL which represents the vertical velocity of the corner of the body. The result of this addition is then assigned to the variable VEL. After executing step 472, the microprocessor 374 executes step 474 in which the value of the variable VEL is stored in memory. The microprocessor 374 then executes step 476 in which the microprocessor 374 is instructed to use the next A/D channel for the next input (i.e., from the pressure sensor 308). Control is then returned to the MAIN routine by the return step 478.

The PRESSURE routine will now be described with reference to FIG. 11. The first step of the PRESSURE routine is step 482 which causes the microprocessor 374 to convert the analog output of one of the pressure sensors 308 into digital form and sets this output equal to the variable PRES. After reading the pressure from the pressure sensor 308 at step 482, the microprocessor 374 performs high-pass filtering which determines the DC bias voltage of the output of the pressure sensor 308. After reading the DC average pressure AVE_P from memory at step 484, the microprocessor 374 executes step 486 in which the current pressure PRES is added to the DC average pressure AVE_P. The result of this addition is assigned to the variable PRES. After executing step 486, the microprocessor 374 executes step 488 in which the value of AVE_P is first divided by the constant K and then is subtracted from the value of AVE_P. The result of this subtraction is then assigned to the variable AVE P'. The value of K in the PRESSURE routine is equal to 6,5535 which corresponds to a cutoff frequency of 0.001 Hz. After executing step 488, the microprocessor 374 executes step 490 which first divides the value of AVE_P' by K and then subtracts the resulting value from the value of the variable PRES to give absolute pressure. The resulting value is assigned to the variable PRES. After executing step 490, the microprocessor 374 executes step 492 which stores the value of AVE_P' in memory for the next cycle for the shock absorber 10 under consideration. Step 494 is then executed which stores the value of PRES in memory. After executing step 494, the microprocessor 374 executes step 496 in which the microprocessor 374 is instructed to use the next A/D channel for the next input (i.e., the output from the accelerometer 364 of the next shock absorber 10 to be examined). The control is then returned to the MAIN routine by return step 498.

Figure 12:
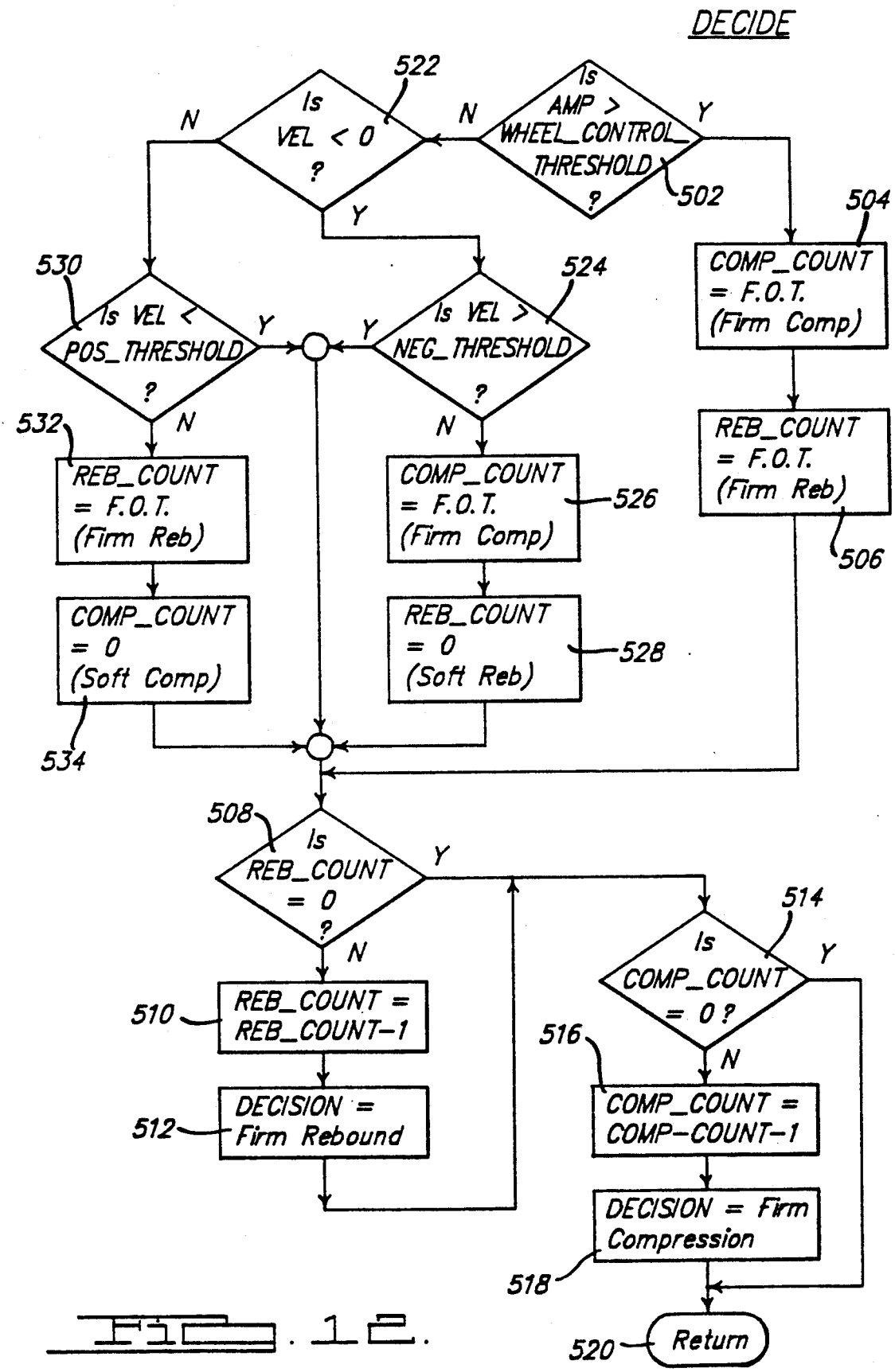
FIG. 12 is a flow chart of the DECIDE routine which is used by the microprocessor shown in FIG. 8 for controlling the shock absorber shown FIG. 2.

The DECIDE routine will now be described with reference to FIG. 12. The first step in the DECIDE routine is step 502 in which the microprocessor 374 determines whether the variable AMP is greater than the parameter WHEEL_CONTROL_THRESHOLD. If the value of the variable AMP is greater than the value of WHEEL_CONTROL_THRESHOLD, there is excessive vertical movement of the wheels and therefore both firm compression and firm rebound are desired. Accordingly, the microprocessor 374 executes step 504 which equates the compression timer COMP_COUNT to the parameter FIRM-ON TIME which is equal to 50 cycles. After executing step 504, the microprocessor 374 executes step 506 in which the rebound timer REB_COUNT is equal to the value of the parameter FIRM-ON TIME which is again equal to 50 cycles. After executing step 506, the microprocessor 374 executes step 508 which determines whether the value of REB_COUNT is equal to zero. If REB_COUNT is not equal to zero, the microprocessor 374 executes step 510 which decrements the value of REB_COUNT by one. After executing step 510, the microprocessor 374 executes step 512 which equates the value of the variable DECISION with the bit pattern indicating that a firm rebound is desired. This is done by adding the bit pattern of SOL_MASK by the bit pattern 55H.

After executing step 512, or if at step 508 the microprocessor 374 determines that REB_COUNT is equal to zero, the microprocessor 374 executes step 514 which is used to determine whether the shock absorber 10 has been in firm compression for the requisite length of time To perform this function, step 514 determines whether the value of COMP_COUNT is equal to zero. If the value of COMP_COUNT is not equal to zero, the microprocessor 374 executes step 516 which decrements the value of COMP_COUNT by one.

After executing step 516, the microprocessor 374 executes step 518 in which the bit pattern of the variable DECISION is set equal to a value that indicates that a firm compression stroke is desired. This is done by adding the bit pattern of SOL_MASK by the bit pattern AAH. After executing step 518, or if at step 514 the bit pattern of COMP_COUNT is equal to zero, control is returned to the MAIN routine by the return step 520.

If at step 502 the microprocessor 374 determines that the value of AMP is not greater than WHEEL_CON- TROL_THRESHOLD, the microprocessor 374 executes step 522. At step 522, the microprocessor 374 determines whether the vertical velocity of the corner of the body 30 is negative by determining whether the value of the variable VEL is less than zero. If the value of the variable VEL is less than zero, the microprocessor 374 executes step 524 which determines whether the downward velocity of the body to which the shock absorber 10 is connected is greater than the negative threshold by determining whether the value of the variable VEL is greater than the parameter NEG_THRESHOLD. If the value of the variable VEL is greater than the parameter NEG_THRESHOLD (i.e., closer to zero), the microprocessor 374 then executes step 508 described above. If the value of the variable VEL is not greater (i.e., more negative) than the parameter NEG_THRESHOLD, the microprocessor 374 executes step 526 which is used to set the compression timer COMP_COUNT to the parameter FIRM-ON TIME. After executing step 526, the microprocessor 374 executes step 528 which is used to set the rebound timer REB_COUNT equal to zero so as to produce a soft rebound stroke. After executing step 528, the microprocessor 374 executes step 508 described above.

If at step 522 the microprocessor 374 determines that the value of the variable VEL is not less than zero, the microprocessor 374 executes step 530. At step 530, the microprocessor 374 determines whether the velocity of the corner of the body 30 is less than a positive threshold by determining whether the value of the variable VEL is less than the parameter POS_THRESHOLD. If the value of VEL is less than the parameter POS_THRESHOLD, the microprocessor 374 executes step 508 described above. If at step 530 the value of VEL is not less (i.e., more positive) than the parameter POS_THRESHOLD, the microprocessor 374 executes step 532. At step 532, the microprocessor 374 sets the rebound timer REB_COUNT equal to 50 cycles so as to obtain a firm rebound stroke. After executing step 532, the microprocessor 374 executes step 534 in which the value of the compression timer COMP_COUNT is set equal to zero so a produce a soft compression stroke. After executing step 534, the microprocessor 374 then executes step 508 described above.

Figure 13:
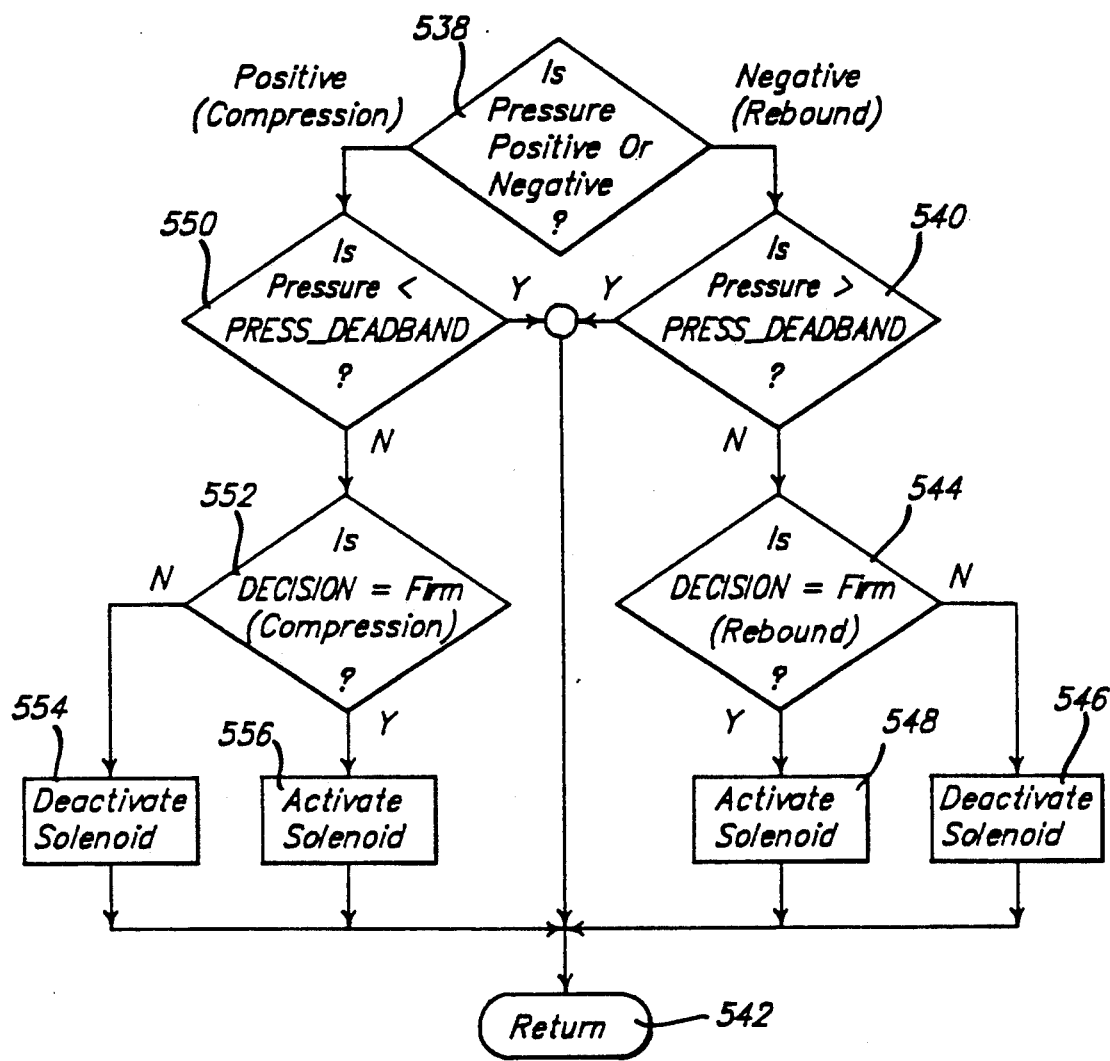
FIG. 13 is a flow chart of the SOLENOID routine which is used by the microprocessor shown in FIG. 8 for controlling the shock absorber shown in FIG. 2.

The SOLENOID routine will now be described with reference to FIG. 13. The first step in the SOLENOID routine is step 538 which is used to determine whether the shock absorber 10 for a given corner is in compression or rebound. This is done by determining whether the pressure sensed by the pressure sensor 308 is positive or negative. If the output from the pressure sensor 308 is negative thus indicating that the shock absorber 10 is in rebound, the microprocessor 374 executes step 540 which determines whether the pressure signal from the pressure sensor 308 is greater than the value of the parameter PRESS_DEADBAND. If at step 540 the microprocessor 374 determines that the output from the pressure sensor 308 is less than the parameter PRESS_DEADBAND, the output of the pressure sensor 308 is assumed to be noise and the microprocessor 374 returns control to the MAIN routine via the return step 542.

If at step 540 the microprocessor 374 determines that the output from the pressure sensor 308 is greater than PRESS_DEADBAND, the microprocessor 374 executes step 544 which determines whether the bit pattern of the variable DECISION is equal to a value indicating that a firm rebound stroke is desired. If at step 544 the microprocessor 374 determines that the bit pattern of the variable DECISION is equal to a value indicating that a firm rebound stroke is desired, the microprocessor 374 executes step 546 which de-energizes the coil 286 if it is energized. Control is then returned to the MAIN routine via the return step 542. If at step 544 the microprocessor 374 determines that the bit pattern of the variable DECISION is not equal to a value indicating that a firm rebound stroke is desired, the microprocessor 374 executes step 548 which energizes the coil 286. The microprocessor 374 then returns control to the MAIN routine via the return step 542.

If at step 538 the microprocessor 374 determines that the signal from the pressure sensor 308 is positive thus indicating that the shock absorber 10 is in compression, the microprocessor 374 executes step 550 which determines whether the signal from the pressure sensor 308 is less than the value of the parameter PRESS_DEADBAND. If the pressure signal from the pressure sensor 308 is less than the parameter PRESS DEADBAND, the output of the pressure sensor 308 is assumed to be noise. Accordingly, the microprocessor 374 returns control to the MAIN routine via the return step 542. If at step 550 the microprocessor 374 determines that the output from the pressure sensor 308 is greater than the parameter PRESS_DEADBAND, the microprocessor 374 executes step 552 which determines whether the bit pattern of the variable DECISION is equal to a value which indicates that a firm compression stroke is desired. If the bit pattern of DECISION is equal to a bit pattern which represents that a firm compression stroke is desired, the microprocessor 374 executes step 554 which de-energizes the coil 286 if energized. The microprocessor 374 then returns control to the MAIN routine via the return step 542. If at step 552 the microprocessor 374 determines the value of DECISION is not equal to a bit pattern which represents that a firm compression stroke is desired, the microprocessor 374 executes step 556 which energizes the coil 286. After executing step 556, the microprocessor 374 returns control to the MAIN routine via the return step 542.

Figure 14:
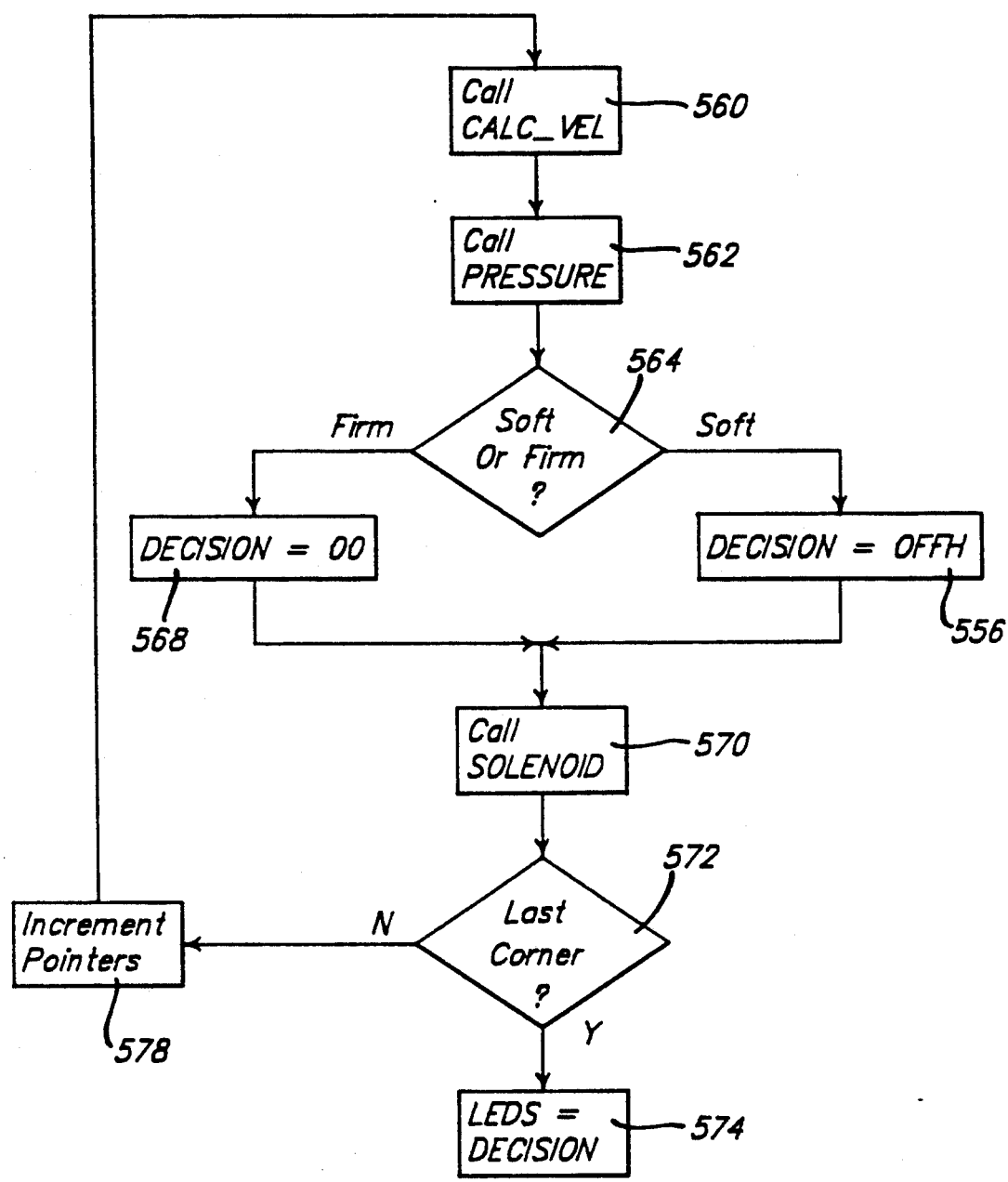
FIG. 14 is a flow chart of the MANUAL portion of the MAIN routine which is used by the microprocessor shown in FIG. 8 for controlling the shock absorber shown in FIG. 2.

The MANUAL portion of the MAIN routine will now be described with a reference to FIG. 14. The first step of the MANUAL routine is step 560 which calls the CALC_VEL routine. After executing step 560, the microprocessor 374 executes step 562 in which the PRESSURE routine is called. After executing step 562, the microprocessor 374 executes step 564 which determines whether the mode select switch 32 has been set to provide either a firm or soft compression and rebound stroke. If the microprocessor 374 determines at step 564 that the mode select switch 32 has been set to provide a soft compression and rebound stroke, the microprocessor 374 executes step 566 which sets the value of DECISION equal to OFFH which indicates that the shock absorber 10 is to produce a soft compression and rebound stroke. If at step 564 the microprocessor 374 determines the mode select switch 32 is set to generate a firm compression and rebound stroke, the microprocessor 374 executes step 568 which sets a bit pattern of DECISION equal to 00H thereby indicating that a firm compression and rebound stroke is to be generated. After executing either steps 566 or 568, the microprocessor 374 executes step 570 in which the SOLENOID routine is called which provides the proper current to the coils 286 to achieve the desired damping characteristics.

After the SOLENOID routine is executed, the microprocessor 374 executes step 572 which determines whether the shock absorber 10 currently being adjusted is the last shock absorber in the sequence (i.e., the sequence left-front, right-front, left-rear, right-rear). If the shock absorber 10 being evaluated is not the last shock absorber in sequence (i.e., is not the right rear shock absorber), the microprocessor 374 executes step 578 in which the pointers are incremented so that the next shock absorber 10 in the sequence will be evaluated. After executing step 578, the microprocessor 374 then executes step 560 in which CALC_VEL is called as described above.

If at step 572 the last shock absorber 10 in the sequence (i.e., the right rear shock absorber) has been evaluated, the microprocessor 374 executes step 574 in which the LED panel 396 is illuminated to provide an indication of whether a firm or soft compression and rebound stroke is desired for each shock absorber Step 574 is used generally for development purposes. The execution of step 574 directs the microprocessor 374 to execute step 408 of the MAIN routine described above.

Figure 15:
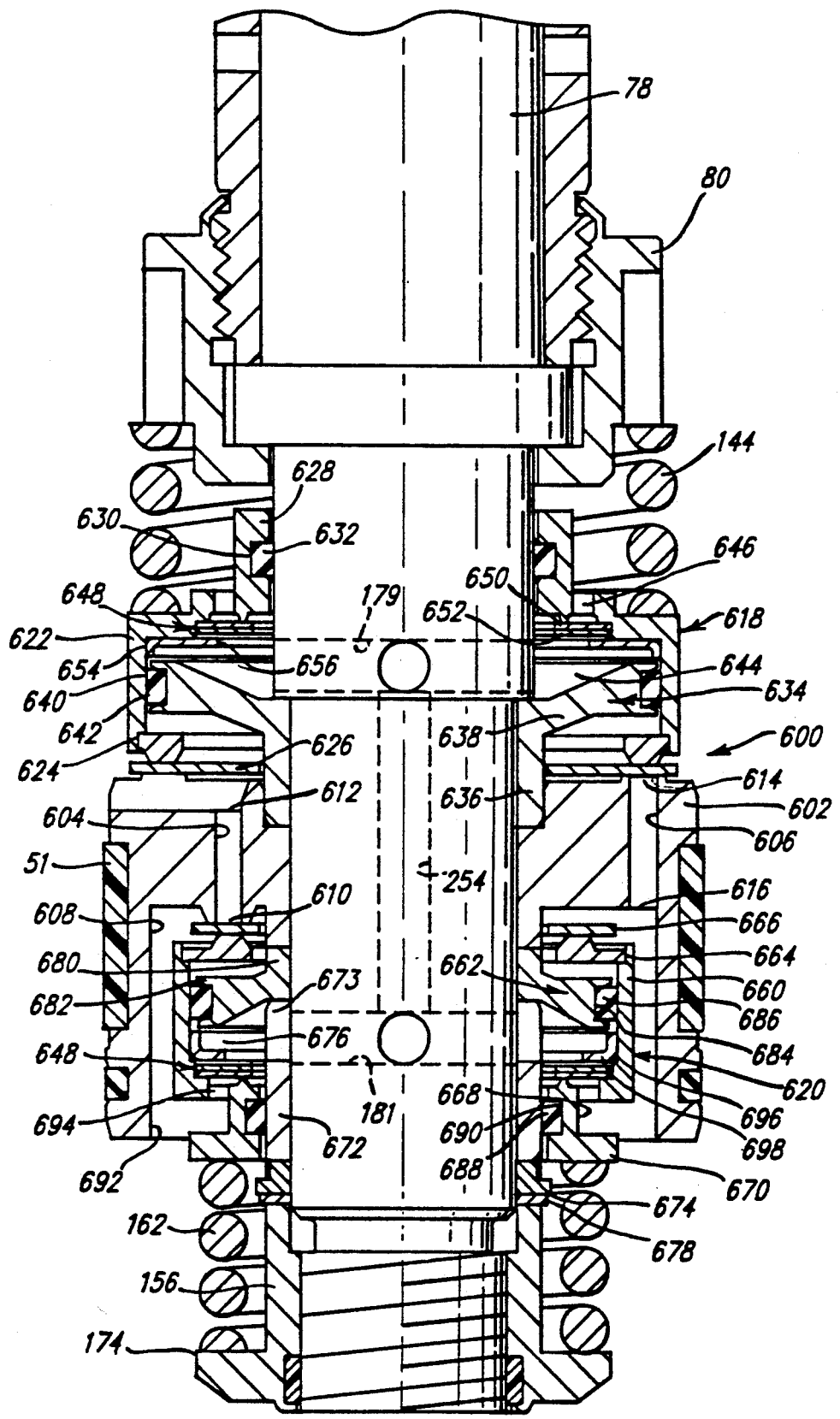
FIG. 15 is a view of a piston assembly and its associated unloader assemblies according to a second embodiment of the present invention.

Referring now to FIG. 15, a piston assembly 600 adapted for application within shock absorber 10 according to a second embodiment of the present invention is illustrated. In general, the second structural embodiment illustrates application of distinct unloader assemblies with a unitary piston valve body 602 to define a simplified piston assembly 600. Likewise, it will be appreciated that the structure, operation, and control of the solenoid operated flow controlling plunger valving which is axially disposed within the piston post 78 is substantially identical to that previously disclosed in reference to the first embodiment. Furthermore, the structure and control systems associated with the pressure sensor 308 and the accelerometer 364 are applicable to the second structural embodiment. As such, like numbers will be used to identify like structural components.

Piston assembly 600 is used for controlling the flow of damping fluid between the upper and lower portions of working chamber 50. The piston assembly 600 includes valve body 602 having a first and second plurality of vertical flow passages 604 and 606. The first vertical flow passages 604 are defined as "rebound" flow passages and the second vertical flow passages 606 are referred to as "compression" flow passages. Associated with flow passages 604 and 606 is a recessed inner annular portion 608 of valve body 602 which is adapted for fluidly communicating with flow passages 604 and 606 under various controlled damping conditions to be hereinafter described. Rebound flow passages 604 include a valve controlled lower outlet end portion 610 and an upper inlet portion 612. Similarly, each compression flow passage 606 includes a valve controlled upper outlet end portion 614 and a lower inlet end portion 616.

To selectively regulate the flow of damping fluid between the upper and lower portions of working chambers 50, an upper "compression" unloader assembly 618 and a lower "rebound" unloader assembly 620 are provided. Compression unloader assembly 618 is disposed above piston valve body 602 so as to be positioned adjacent to the upper outlet end portion 614 of compression flow passages 606. Compression unloader assembly 618 includes a generally hollow first unloader housing 622, a first unloader ring 624 and a first spring disk 626. Compression unloader assembly 618 is adapted to move axially relative to piston post 78 for controlling the flow of fluid from the lower portion to the upper portion of working chamber 50 through compression flow passages 606. In particular, first unloader housing 622 includes an upper axially extending section 628 coaxially surrounding a portion of piston post 78 above piston post flow passage 179. Upper section 628 is provided with a groove 630 within which first annular seal member 632 is confined.

First unloader housing 622 is a generally downwardly opening cup-shaped member adapted to enclose a first seal holder member 634 therein. First seal holder 634 has an axial section 636 secured coaxially to the outer peripheral surface of piston post 78. Axial section 636 abuts a radially outwardly extending flange portion of piston post 78 so as to be positioned immediately below piston post flow passages 179. First seal holder 634 also has a radially extending frusto-conical section 638 which terminates in a groove 640 adapted to confine a second annular seal member 642 therein. Seal member 642 provides a high pressure seal between first seal holder 634 and an inner vertical wall of first unloader housing 622. The area between an upper surface of the radially extending section 638 of first seal holder 634 and first unloader housing 622 defines a first pressure chamber 644 within compression unloader assembly 618. First pressure chamber 644 is in fluid communication with the radially extending piston post flow passages 179. Annular seal members 632 and 642 assist in maintaining a high pressure seal within first chamber 644 during axial movement of compression unloader assembly 618. Furthermore, the components are designed to produce a maximized pressure area within first chamber 644.

Compression unloader assembly 618 further includes a plurality of vertically extending inlet orifices 646 for providing fluid communication between the upper portion of working chamber 50 and first pressure chamber 644. Means for permitting unidirectional flow from the upper portion of working chamber 50 to first chamber 644 is provided between inlet orifices 646 and seal holder 634. Preferably, such means include check valve assembly 648 which is illustrated as a combination of first and second annular bleed disk members 650 and 652. The bleed disks are designed to permit flow into the first chamber 64 while inhibiting flow out of the first chamber 644. A travel stop member 654 limits the axial movement of bleed disks 650 and 652 and defines a central flow orifice 656 which communicates with first pressure chamber 644.

Secured to the lowermost open end of first unloader housing 622 is first unloader ring 624 which acts directly on an upper surface of first spring disk 626. A lower surface of first spring disk 626 normally engages the top surface of valve body 602 for restricting the flow of fluid through outlet end portion 614 of compression flow passages 606 into the upper portion of working chamber 50.

The helical valve spring 144 is disposed between a radially extending surface of the piston post rod nut 80 and the upper surface of first unloader housing 622. Valve spring 144 acts on the compression unloader assembly 618 for biasing the lower surface of first spring disk 626 against valve controlled upper outlet end portion 614 of vertical flow passage 606.

The piston assembly 600 of the present invention also includes a lower "rebound" unloader assembly 620. Rebound unloader assembly 620 is generally confined within the annular recessed portion 608 of piston valve body 602. Rebound unloader assembly 620 includes a second unloader housing 660 adapted for generally surrounding a second seal holder 662, a second unloader ring 664 and a second spring disk 666. A lower portion of second unloader housing 660 includes a axially extending portion 668 which terminates in a radial flange 670. Radial flange 670 is adapted to act as a spring seat for locating helical compression spring 162 between it and the spring seat 174 on post nut 156.

Cylindrical alignment sleeve 672, coaxially surrounding a portion of piston post 78 and having flow passages 673 communicating with piston post flow passage 181, is provided for accurately aligning second unloader seal holder 662 relative to the lower portion of valve body 602 and piston post flow passage 181 such that a second pressure chamber 676 within rebound unloader assembly 620 fluidly communicates with radial flow passage 181. Sleeve alignment ring 674 and torque washer 678 are provided intermediate post nut 156 and alignment sleeve 672 when post nut 156 is threadably secured to the lower threaded portion of piston post 78.

The area between rebound unloader housing 660 and the lower surface of second seal holder 662 define the second pressure chamber 676. The second seal holder 662 has an axially extending portion 680 coaxially secured to the outer peripheral surface of piston post 78 immediately above flow passage 181 and in abutting engagement with valve body 602. The second seal holder 662 also includes a radially extending portion 682. Third annular seal member 684 is confined within groove 686 of second seal holder 662 to provide a high pressure seal between the second seal holder 662 and an inner vertical wall surface of second unloader housing 660. Likewise, fourth annular seal member 688, confined in groove 690 on the axial portion 668 of the second unloader housing 660, provides a high pressure seal between second unloader housing 660 and alignment sleeve 672. The inner vertical wall of recessed portion 608 within valve body 602 and an outer peripheral surface of rebound unloader assembly 620 define an annular flow passage 692 which is in fluid communication with inlet end portion 616 of flow passages 606 and which is adapted to fluidly communicate with rebound flow passages 604 upon downward axial displaced movement of rebound unloader assembly 620.

Rebound unloader assembly 620 further includes a plurality of inlet orifices 694 extending through a lower portion of second unloader housing 660 and which permits fluid communication between the lower portion of working chamber 50 and the second pressure chamber 676. A second lower check valve assembly 648 is provided within rebound unloader assembly 620 to permit unidirectional flow into second chamber 676 from the lower portion of working chamber 50 as will be hereinafter described in greater detail. Travel stop 696 limits the axial movement of the bleed disks associated with check valve assembly 648 and defines a central orifice 698 which is in fluid communication with second chamber 676.

As described herebefore in reference to the first structural embodiment, electrical controllable flow means are provided within piston post 78 for permitting and restricting fluid communication between radial piston post flow passages 179 and 181. Consequently, the present invention is adapted to permit or restrict the communication of fluid between the first and second pressure chambers 644 and 676. Compression spring 162 acts on second unloader assembly housing 660 for biasing second unloader ring 664 against second spring disk 666 for restricting the flow of fluid through lower valve controlled outlet end portion 610 of rebound flow passages 604 into flow passage 692.

As those skilled in the art will recognize, the upper plunger member 246, the lower plunger member 248 and the coil 286 (shown in FIGS. 4A and 6A) form a solenoid which is housed within piston post 78 and which define the electrical controllable flow means. The application of current to coil 286 will cause upper plunger member 246 to be upwardly displaced for allowing recessed region 254 of the lower plunger member 248 to be proximate to piston post flow passages 179 and 181. Actuation of the solenoid controls the flow and fluid pressure transmission between first pressure chamber 644 and second pressure chamber 676. As will be hereinafter described, increased fluid pressure in chamber 644 and 676 aids in opening valve controlled outlets 614 and 610 when the solenoid is energized so as to produce a "soft" or low damping characteristic. Alternatively, when the solenoid is unenergized, flow is restricted between the first and second chambers so as to generate a "firm" or high damping characteristic.

Figure 16A:
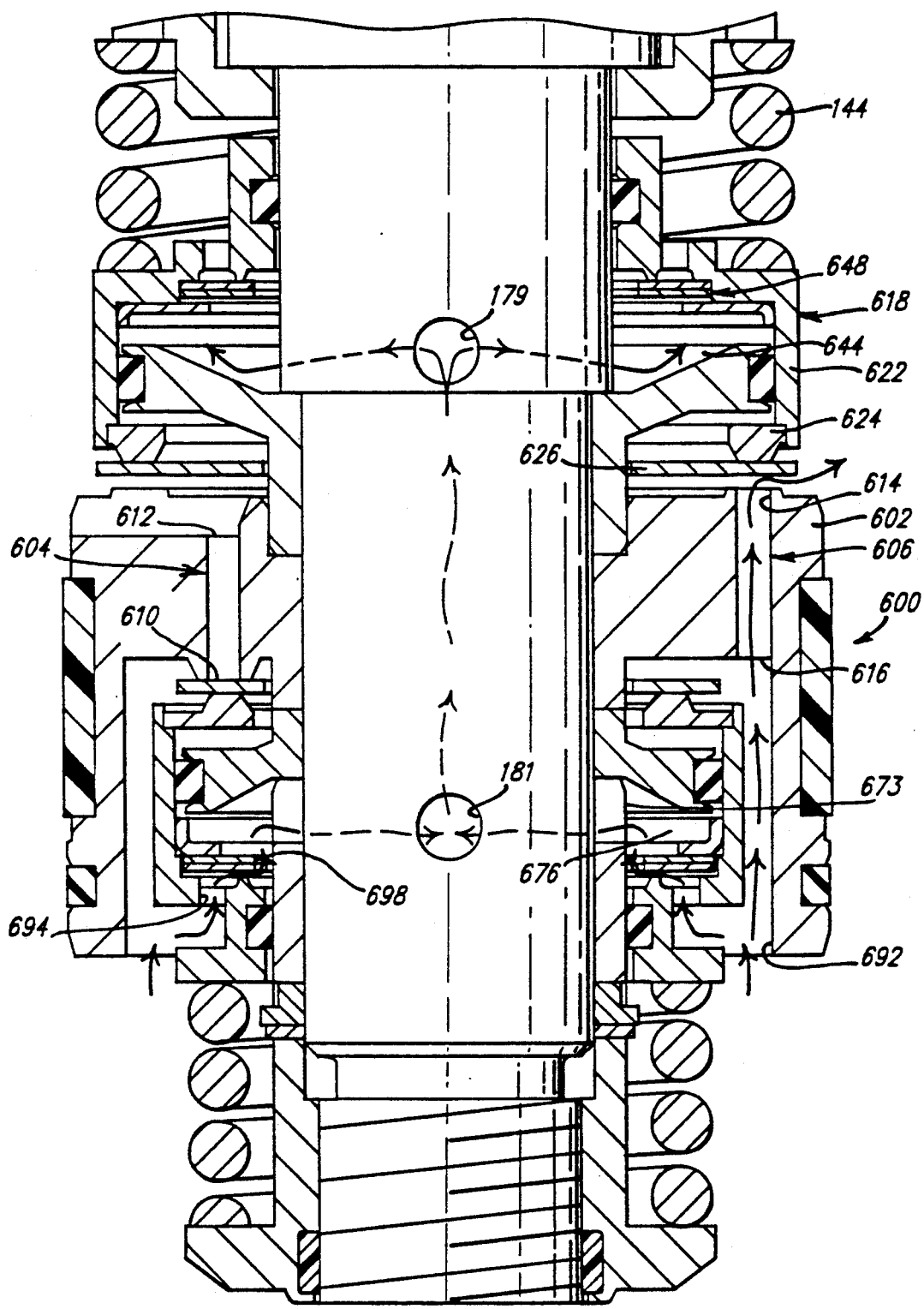

Referring to FIG. 16A and 16B, the fluid flow paths during a compression stroke of shock absorber 10 are illustrated. The flow paths are indicated by arrows and are representative of the solenoid being energized and de-energized, respectively. As shown in FIG. 16A, upon application of current to the solenoid coil 286, a fluid flow path is provided during the compression stroke through the following passages: flow passage 692 of valve body 602; inlet orifice 694; travel stop orifice 698; second chamber 676; alignment sleeve orifice 673; piston post flow passage 181; plunger flow path 254 (see FIG. 4A); piston post flow passage 179; and into first chamber 644. When this occurs, fluid pressure within the first chamber 644 increases since upper check valve assembly 648 inhibits flow through compression unloader assembly 618 to the upper portion of the working chamber 50. Concurrently, high pressure fluid is acting on the lower surface of first spring disk 626 within flow passage 606 at valve controlled outlet 614. Therefore, compression unloader assembly 618 is axially upwardly displaced by the increased pressure within the first chamber 644 against the biasing of helical spring 144 so as to uncover upper outlet end portion 614 whereby damping fluid flows freely into the upper portion of working chamber 50. In this manner, a "soft" or low damping characteristic is produced.

When the solenoid is de-energized, the lower plunger 248 is biased to be displaced downward in such a manner that the recessed region 254 is not proximate to the piston post flow passages 179 and 181, whereby damping fluid is unable to flow between the lower and upper portions of the working chamber 50. As shown in FIG. 16B, closing the flow path between piston post flow passages 179 and 181 prevents pressurization of first pressure chamber 644 such that pressurized fluid is only able to work against spring disk 626 at valve outlet end portion 614. Therefore, a relatively high pressure differential must exist before valve controlled upper outlet end portion 614 can be opened by axially displacing compression unloader assembly 618. When only a relatively low pressure differential exists, compression unloader assembly 61 is biased by helical spring 144 to keep valve outlet end portion 614 in a closed flow restricting condition. In this manner, a high or "firm" damping characteristic is produced.

Figure 17A:
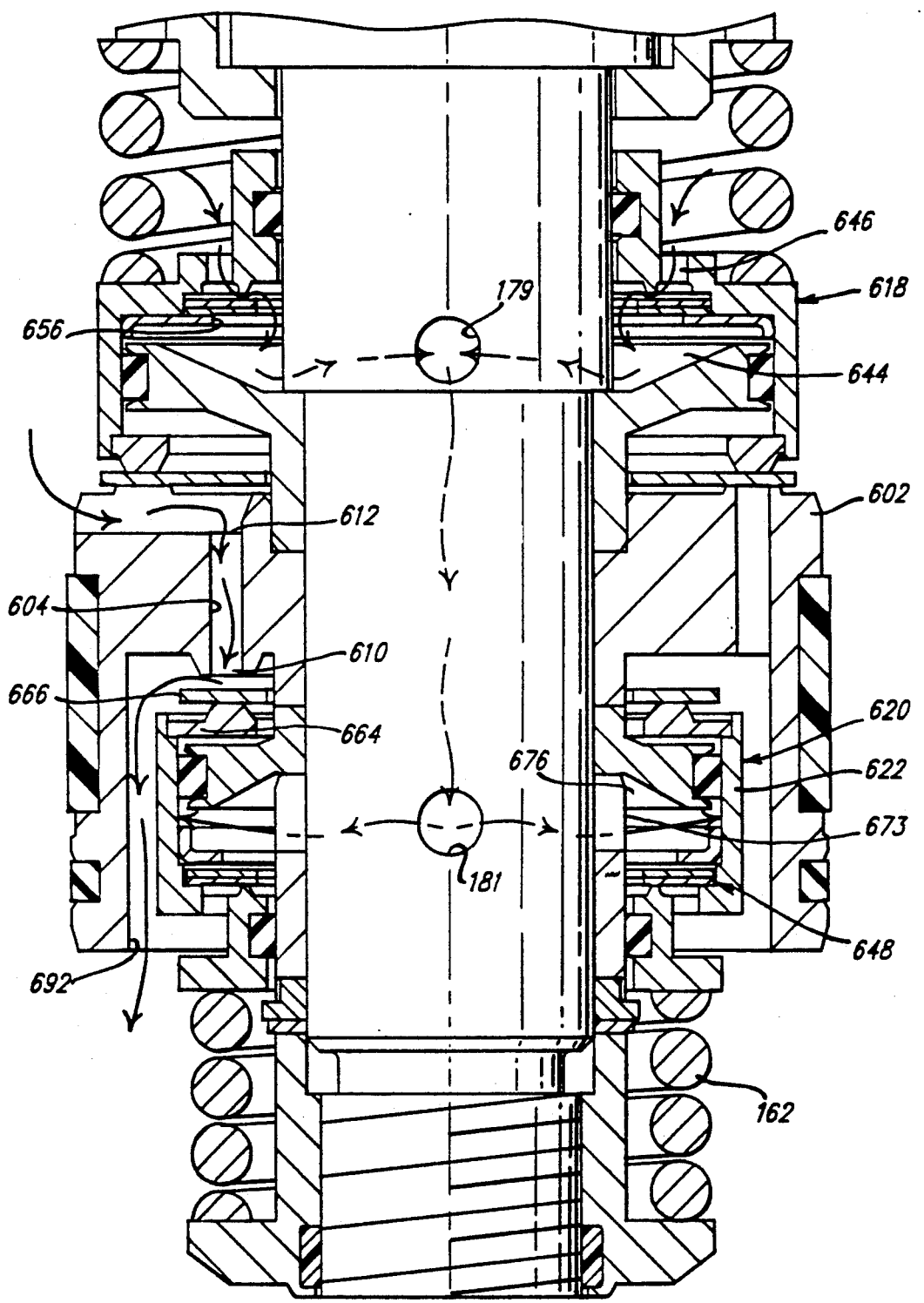
FIGS. 17A and 17B are views illustrating the fluid flow paths associated with the shock absorber of FIG. 15 during a rebound stroke.
Figure 17B:
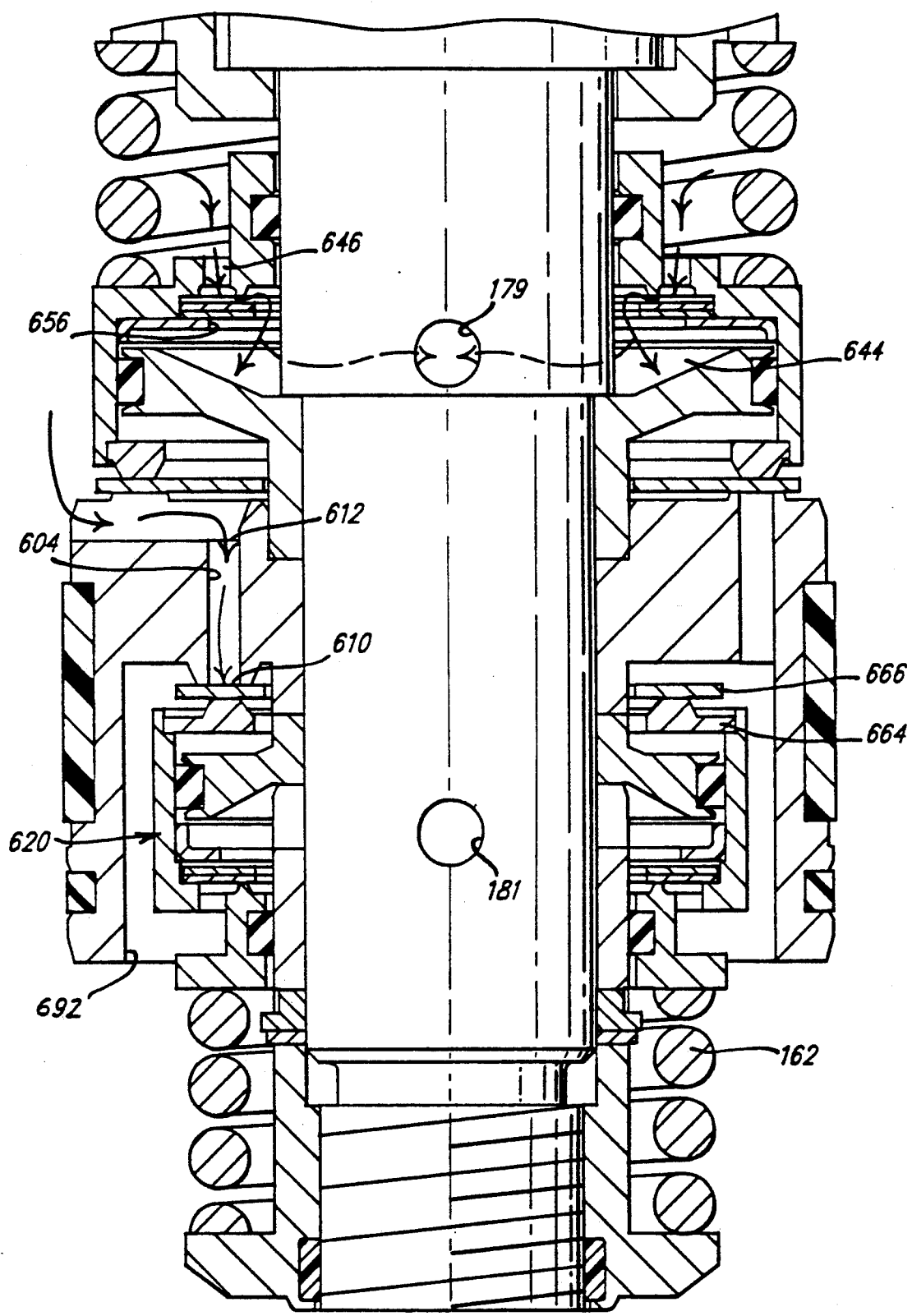

Referring to FIGS. 17A and 17B, the flow paths associated with a rebound stroke of shock absorber 10 are illustrated. In particular, during rebound, a "soft" damping characteristic is achieved by concurrently pressurizing second pressure chamber 676 and the area of valve controlled lower outlet end portion 610 above second spring disk 666. In particular, damping fluid flows through the following flow path: inlet orifices 646; travel stop central orifice 656; first pressure chamber 644; piston post flow passage 179; plunger flow passage 254; piston post flow passage 181; alignment sleeve orifice 673; and into second pressure chamber 676. Increased fluid pressure within second chamber 676 in combination with the fluid pressure concurrently acting on second valve disk 666 from within rebound vertical flow passage 604 act to axially displace rebound unloader assembly 620 downwardly against the biasing force of compression spring 162 so as to unseat spring disk 666 from lower outlet end portion 610, whereby damping fluid flows freely from flow passage 604 into flow passage 698 and thereafter into the lower portion of working chamber 50.

Referring to FIG. 17B, the "firm" damping characteristic in rebound (downward flow) is provided when the flow controlling solenoid is de-energized such that lower plunger member 248 is biased to be displaced downward in such a manner that the region 254 is not proximate to the piston flow passages 179 and 181 wherein fluid flow between the first and second chambers 644 and 676 is inhibited. In this manner, pressurized fluid is capable of only working against second spring disk 666 within rebound vertical flow passage 604. A sufficiently large fluid pressure must be present before rebound unloader assembly 620 will be unseated from restricting fluid flow through flow passages 604.

As is readily apparent, FIGS. 15 through 17 illustrate a piston assembly 600 having a unitary valve body 602. As such, piston valve body 602 is relatively simple and economical to fabricate. Similarly, since the unloader assemblies 618 and 620 are relatively self-combined, independent of piston valve body 602, assembly of piston assembly 600 is relatively simple. Furthermore, pressure chambers 644 and 676 have a maximized effective pressure area which assists in effectively controlling the induced axial displacement of the unloader assemblies relative to piston valve body 602.

Figure 18B:
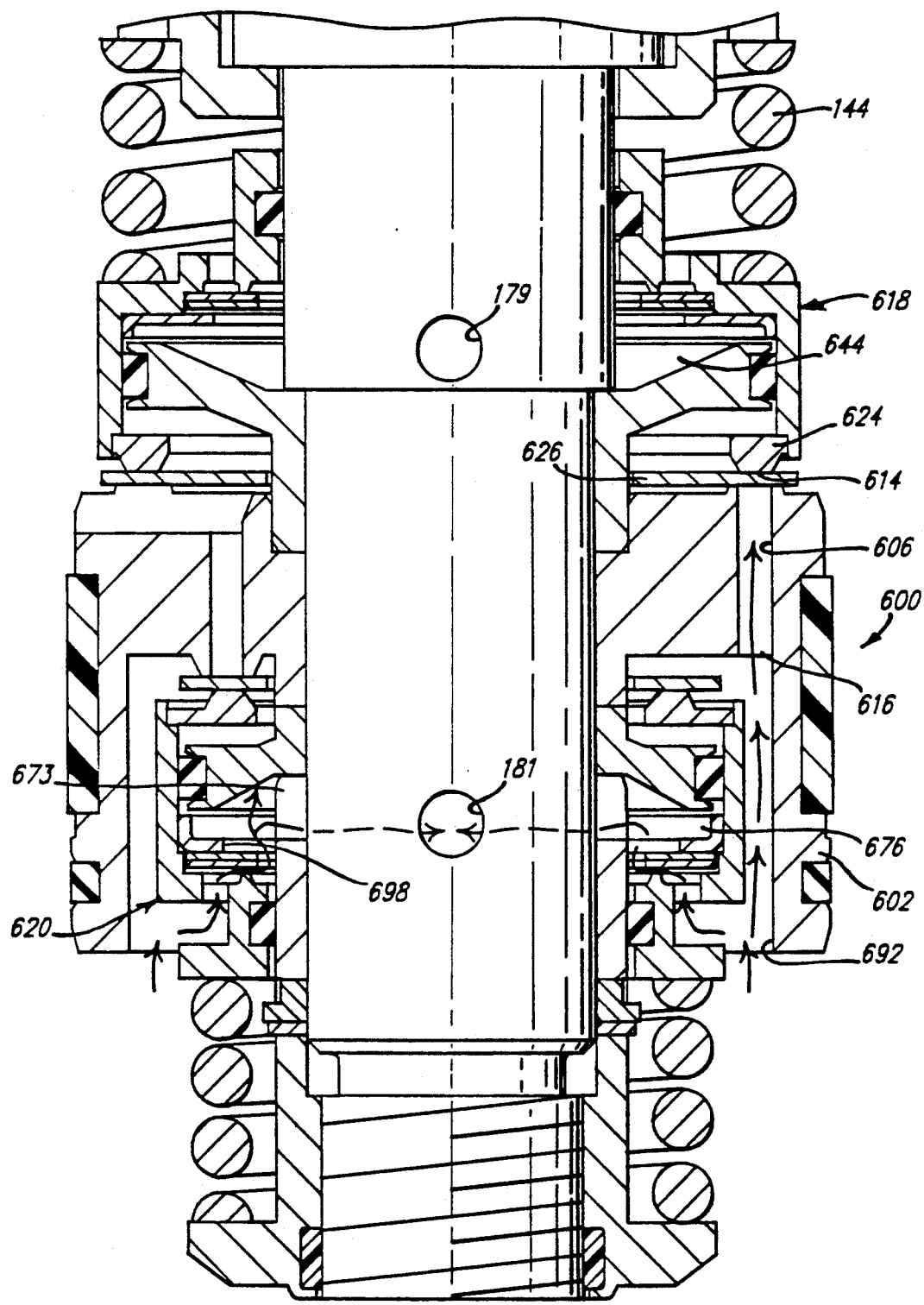
FIG. 18 is a view of a piston assembly and its corresponding unloader assemblies according to a third embodiment of the present invention.

Referring to FIG. 18, a third structural embodiment of a piston assembly 700 according to the present invention is illustrated. In general, piston assembly 700 is substantially identical in structure and function to the piston assembly 600 disclosed in FIGS. 15 through 17. Furthermore, the structure, operation and control of the solenoid operated flow control means, axially disposed within the piston post 78, is substantially identical to that previously disclosed in reference to the first and second embodiments.

Piston assembly 700 is used for controlling the flow of damping fluid between the upper and lower portions of working chamber 50. The piston assembly 700 includes a valve body 702 having a first plurality of vertical "rebound" flow passages 704 and a second plurality of vertical "compression" flow passages 706. An annular recessed portion 708 of valve body 702 defines a fluid flow path 709 adapted to communicate with vertical flow passages 704 and 706. Rebound flow passages 704 include a valve controlled lower outlet end portion 710 and an upper inlet end portion 712. Similarly, compression flow passages 706 include a valve controlled upper outlet end portion 714 and a lower inlet end portion 716.

Piston assembly 700 further includes an upper "compression" unloader assembly 718 and a lower "rebound" unloader assembly 720. Compression unloader assembly 718 is disposed above valve body 702 and adjacent to the upper outlet end portion 714 of the compression flow passages 706. Compression unloader assembly 718 includes first unloader housing 722, a first unloader ring 724 and a first spring disk 726. Compression unloader assembly 718 is adapted to move axially relative to piston post 78 for permitting or restricting fluid flow through flow passage 706 during a compression stroke. In particular, first unloader housing 722 includes an upwardly extending axial section 728 coaxially surrounding a portion of piston post 78 above piston post flow passage 179. For sufficiently guiding compression unloader assembly 718 upon axial movement thereof relative to piston post 78, a guide sleeve bearing 730, is coaxially disposed intermediate first unloader housing 722 and piston post 78. First unloader housing 722 is a generally cup-shaped member adapted to enclose a first seal holder member 732 therein. First seal holder 732 defines an axially extending section 734 which is secured coaxially to piston post 78, immediately below piston post flow passage 179. First seal holder 732 also includes a radially outwardly extending section 736 which terminates in a groove 738 adapted to confine a first annular seal member 740 therein in sealing engagement with an inner vertical wall section of first unloader housing 722. In this manner, the area between the upper generally conical surface 742 of first seal holder 732 and first unloader housing 722 defines a first pressure chamber 744 within compression unloader assembly 718 which is in fluid communication with the radially extending piston post flow passages 179. First annular seal member 740 and guide sleeve 730 assist in maintaining the high pressure seal within first pressure chamber 744 during axial movement of compression unloader assembly 718.

Compression unloader assembly 718 further includes a plurality of vertically extending inlet orifices 746 for permitting fluid communication between the upper portion of working chamber 50 and first pressure chamber 744. As previously disclosed in reference to the second structural embodiment, means are provided for permitting unidirectional flow from the upper portion of working chamber 50 to first pressure chamber 744. Again, such means include check valve assembly 648 defined as a combination of first and second annular bleed disk members 650 and 652 respectively. An annular travel stop ring 748 limits the downward axial movement of bleed disks 650 and 652 during flow into first chamber 744. Secured to the lowermost open end of unloader housing 722 is first unloader ring 724 which acts directly on an upper surface of first spring disk 726. A lower surface of first spring disk 726 engages an upper radially extending surface of valve body 702 for controlling the flow of fluid from upper outlet end portion 714 of flow passages 706 into the upper portion of working chamber 50.

Helical compression spring 750 is disposed between the lowermost radial surface 752 of the piston post rod nut 80 and the upper radially extending surface 753 of first unloader housing 722. Compression spring 750 is disposed adjacent axially extending section 728 of unloader housing 722 and is located radially inward of inlet orifices 746. Valve spring 750 acts upon compression unloader assembly 718 for biasing the lower surface of first spring disk 726 against the valve controlled upper outlet end portion 714 of vertical flow passages 706.

As is readily apparent from reference to FIG. 18, first pressure chamber 744 is aligned to fluidly communicate with piston post flow passage 179. Compression unloader assembly 718 further includes a secondary compression spring 754 acting between a lower surface of radially extending portion 736 of first seal holder 732 and the upper surface of first spring disk 726. The biasing force of secondary compression spring 754 is selected to promote a more rapid closure or "seating" of first valve disk 726 against the upper outlet end portion 714 of flow passages 706 following the change from compression to rebound stroke. In particular, helical spring 750 must overcome the relatively high fluid pressure within first chamber 744 before it can effectively bias compression unloader assembly 718 and, consequently, first spring disk 726 for restricting flow through flow passages 706. As such, secondary spring 754 acts directly on first spring disk 726 independently of compression spring 750 to bias first spring disk 726 toward outlet end portion 714.

Rebound unloader assembly 720 is generally confined within the annular recessed portion 708 of piston valve body 702. The area between the outer vertical wall surface of rebound unloader assembly 720 and recessed portion 708 defines the flow path 709 adapted to selectively communicate with flow passages 704 and 706 as previously described. Rebound unloader assembly 720 includes a second unloader housing 756 adapted for generally enclosing a second seal holder 758, the second unloader ring 760 and the second spring disk 762. Second unloader housing 756 includes an axially downwardly extending portion 764 and a radially outwardly extending annular portion 766 adapted to generally enclose second seal holder 758 therein. The axially extending portion 764 of second unloader housing 756 is coaxially disposed relative to piston post 78 and is located immediately below piston post flow passage 181. A second cylindrical guide sleeve 768 is coaxially located intermediate axial portion 764 of second unloader housing 756 and piston post 78. Guide sleeve 768 is provided to promote low friction axial movement of second unloader housing 756 relative thereto. A radially extending lower surface 770 of second unloader housing 756 acts as a spring seat for locating second helical spring 772 thereon.

Second seal holder 758 includes an axially upwardly extending portion 774 having an internal threaded surface adapted for threadably engaging a threaded surface provided on piston post 78 immediately above piston post flow passage 181. In this manner, second seal holder 758 acts as both a sealing component and as the retaining nut to secure the various components of piston assembly 700 in precise alignment relative to piston post flow passages 179 and 181. Second seal holder 758 also includes a radially outwardly extending portion 776 which terminates in a groove 778 in which a second annular seal element 780 is disposed in sealing engagement with an upwardly extending inner vertical wall section of second unloader housing 756. Annular seal member 780 provides a high-pressure seal between second seal holder 758 and second unloader housing 756 during axial movement thereof. More particularly, the area between the lower surface of radially extending portion 776 of second seal holder 758 and the second unloader housing 756 defines the second pressure chamber 782.

Rebound unloader assembly 720 further includes a plurality of inlet orifices 784 extending through a lower portion of second unloader housing 756 for providing fluid communication between a lower portion of working chamber 50 and the second pressure chamber 782. Second pressure chamber 782 fluidly communicates with piston post flow passage 181. A second lower check valve assembly 648 is provided within rebound unloader assembly 720 to permit unidirectional flow into second chamber 782 through inlet orifices 784. Likewise, a second lower travel stop ring 748 is provided to limit the axial movement of check valve assembly 648 during flow into second chamber 782. In addition, a lower secondary compression spring 786 is provided to act between a lower surface of second spring disk 762 and an upper surface of radially extending portion 776 of second seal holder 758. Lower secondary spring 786 acts directly on second spring disk 762 for biasing it into engagement with lower outlet end portion 610 of flow passages 604 upon the change from rebound to compression stroke. Again, secondary spring 786 is utilized to more rapidly "seat" second spring disk 762 against the valve body 702 and, in particular, lower outlet end portion 710. Likewise, compression spring 772 biases the rebound unloader assembly 720 such that second unloader ring 760 is biased against second spring disk 762 for restricting the flow of fluid through valve controlled lower outlet end portion 710 of rebound flow passages 704.

As previously disclosed in reference to the first two embodiments, the application of current to coil 286 will cause upper plunger member 246 to be upwardly displaced for allowing recessed portion 254 of the lower plunger member 248 to be proximate to piston post flow passages 179 and 181. In general, the flow paths between the upper and lower portions of working chamber 50 within piston assembly 700 are substantially identical to that described in reference to piston assembly 600 shown in FIGS. 15 through 17. As such, energization of the solenoid controls the pressure transmission between first pressure chamber 744 and second pressure chamber 782. Pressurization of chambers 744 and 782 aids in opening valve controlled outlets 714 and 710, during compression and rebound strokes, respectively, when the solenoid is energized so as to produce a "soft" or low damping characteristic. Alteratively, de-energization of the solenoid generates a flow restriction between the pressure chambers 744 and 782 such that a "firm" or high damping characteristic is produced.

During a compression stroke, "soft" damping is generated by providing the following fluid flow path: flow passage 709; compression inlet orifice 784; second chamber 782; piston post flow passage 181; plunger flow passage 254; piston post flow passage 179; and into first pressure chamber 744. Since upper check valve assembly 748 inhibits flow from first chamber 744 into the upper portion of working chamber 50, fluid pressure within the first pressure chamber 744 is increased. Concurrently, high pressure fluid acts on the lower surface of first spring disk 726 within flow passage 706 at upper outlet end portion 714. As such, the high pressure within first chamber 744 axially moves compression unloader assembly 718 upwardly against the biasing force of helical spring 750 so as to uncover upper outlet end portion 714 whereby damping fluid flows freely into the upper portion of working chamber 50. As mentioned, the secondary biasing spring 754 is provided to increase the speed in which spring disk 726 becomes re-seated against valve outlet end portion 714 for providing improved control over the damping characteristic generated.

When the solenoid is de-energized, the lower plunger 248 is displaced such that a flow restriction is created between the first and second pressure chambers 744 and 782. As such, the closing of the flow path between piston post flow passages 179 and 181 prevents pressurization of first pressure chamber 744 such that pressurized fluid is only able to work against spring disk 726 at valve outlet end portion 714. Therefore, a relatively high pressure differential must exist before valve outlet end portion 714 can be opened by axially displacing compression unloader assembly 718. When only a relatively low pressure differential exists, compression unloader assembly 718 is biased by helical spring 750 and secondary spring 754 to maintain outlet end portion 614 in a flow restricting condition.

During a rebound stroke of the shock absorber, a "soft" damping characteristic is achieved by concurrently pressurizing second chamber 782 and the area of the outlet end portion 710 above second spring disk 762. In particular, damping fluid flows through the following flow path: inlet orifice 746; first pressure chamber 744; piston post flow passage 179; plunger passage 254; piston post flow passage 181; and into second pressure chamber 782. Increased pressure within second pressure chamber 782, in addition to the fluid pressure acting on second valve disk 762 from within rebound vertical flow passage 704, acts to axially displace rebound unloader assembly 720 downwardly so as to unseat second spring disk 762 from lower outlet end portion 710. Therefore, damping fluid is permitted to flow freely to the lower portion of working chamber 50.

During the rebound stroke, a "firm" damping characteristic is generated by producing a flow restriction between the first and second pressure chambers 744 and 782. When flow between piston post flow passages 179 and 181 is interrupted, pressurized fluid is capable of only acting on second spring disk 762 within rebound vertical flow passage 704. Therefore, a sufficiently large fluid pressure must be present before rebound unloader assembly 720 will be unseated for permitting flow therethrough. Again, the lower secondary compression spring 786, associated with the rebound unloader assembly 720 is provided for increasing the speed of biased recovery so as to "seat" second spring disk 762 against the lower outlet end portion 710.

Referring further to FIG. 18, a position sensor assembly 800 is provided which is operatively associated with the piston assembly 700 herebefore described. It will be appreciated that any suitable position or displacement transducer can be readily substituted for the structure to be described. Position sensor assembly 800 includes a coil carrier 802 which is a generally cup-shaped cylindrical member secured to a lowermost portion of valve body 702. Preferably, coil carrier 802 is made of a relatively rigid non-magnetic material. Surrounding the exterior perimeter of coil carrier 802 is an electro-magnetic coil winding 804. Electrical leads from coil winding 804 are disposed in a protective conduit or electrical connector 806 and are fed up through the piston post 78 for electrical interconnection with the electrical components housed within the piston rod 44. A fastening device 808 secures coil carrier 802 to the lowermost portion of piston post 78. Fastener 808 is preferably a snap-ring device. Coil carrier 802 defines a plurality of vertically extending flow passages 810 for permitting fluid to flow as previously described between the upper and lower portions of the working chamber 50. Carrier 802 has a radially extending inner surface 812 which acts as a lower spring seat upon which compression spring 772 is seated for biasing rebound unloader assembly 720 against piston valve body 702.

According to the preferred operative function of position sensor assembly 800, carrier 802 and, consequently, coil windings 804 move with piston assembly 700 within pressure cylinder 48. As such, an element (not shown) preferably attached to the outer surface of pressure cylinder 48 is provided to generate measurable impedance changes in the electro-magnetic field generated by passing a known current through coil 804. In particular, it is contemplated that a copper foil element having a variable width or thickness is wrapped around the pressure cylinder 48 along the working length thereof. The dimensions of the variable width or thickness are preselected to produce a known measurable change in the impedance which directly correlates to the axial position of coil winding 804 within the pressure cylinder 48. As such, the position of the coil winding 804 relative to the copper foil element can be used to decide whether the shock absorber is in compression or rebound. The electrical signal generated by the coil winding 804 is sent to an appropriate signal processing system for input into the microprocessor. By appropriately processing the information from the position sensor assembly 800 and the accelerometer 364, electronic control module 34 can adjust damping characteristics of shock absorber 10 to provide the desired ride and road handling characteristics. As such, the pressure sensors 308 utilized in the first and second embodiments herebefore described may be readily substituted for by utilization of the internal position sensor assembly 800.

Figure 19:
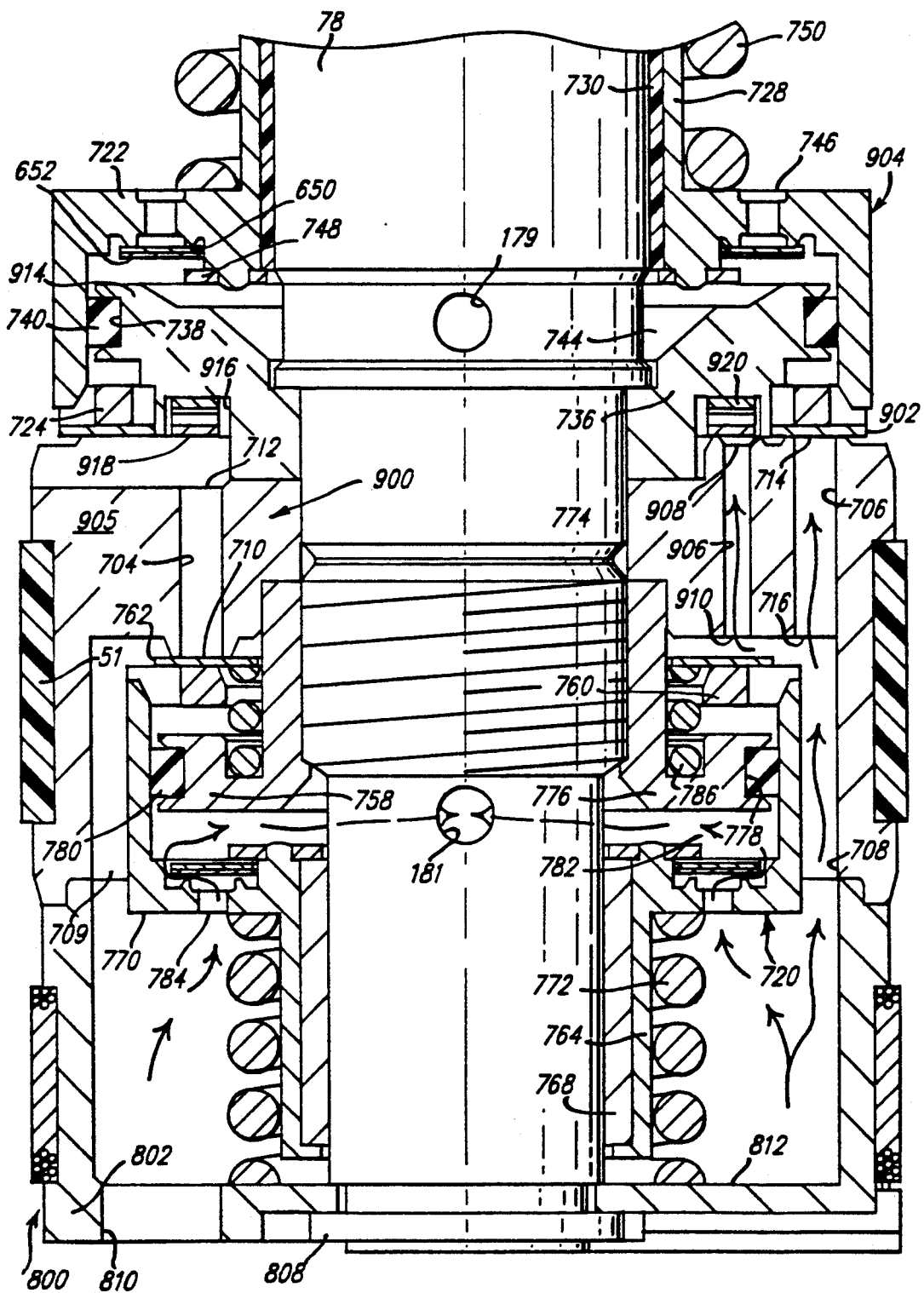
FIG. 19 is a view of an alternative piston assembly having means for bleeding a predetermined volume of fluid during a firm compression stroke.

Referring now to FIG. 19, a fourth structural embodiment of a piston assembly 900 according to the teachings of the present invention is illustrated. Piston assembly 900 is substantially similar to piston assembly 700 shown in FIG. 18 with the exception that the valve body and the compression unloader assembly have been modified to provide means for controllably bleeding a predetermined volume of damping fluid from the lower portion to the upper portion of working chamber 50 during a "firm" compression stroke. Since FIG. 19 is representative of an embodiment which is substantially similar to that described in reference to FIG. 18, like numerals will be used to designate like components. It will also be appreciated that the operation of piston valve 900 with respect to soft damping during a compression stroke and, soft and firm damping during a rebound stroke are substantially identical to that herebefore described. Furthermore, the structure, operation and control of solenoid operated flow control means, axially disposed within the piston post 78, is substantially identical to that previously disclosed in reference to the first, second and third embodiments.

In general, piston valve assembly 900 is designed to reduce the "harshness" of the compression unloader "blow-off" upon switching to firm damping during a compression stroke. In operation, when the solenoid is de-energized, the lower plunger 248 is displaced such that a flow restriction is created between the first and second pressure chambers 744 and 782. As such, the closing of the flow path between piston post passages 179 and 181 prevents pressurization of first pressure chamber 744 such that pressurized fluid is only able to work against spring disk 902 at valve outlet end portion 714. Therefore, a relatively high differential exists which must be overcome before valve outlet end portion 714 can be opened by axially displacing compression unloader assembly 904. Because the fluid pressure within flow passage 706 increases in a linear fashion, the theoretical "blow off" force for compression unloader assembly 904 is substantially instantaneous. Such instantaneous blow-off may produce "harshness" in the operation of the piston valve. Therefore, means are provided for permitting a predetermined amount of fluid to flow from the lower to the upper portion of working chamber 50 prior to "blow-off" of compression unloader assembly 904. In this manner, the "blow-off" parameters can be preselected for minimizing the "harshness" of the valve.

The upper "compression" unloader assembly 904 is disposed above valve body 905 and adjacent to the upper outlet end portion 714 of the compression flow passages 706. Valve body 905 also includes one or more vertical "bleed" flow passages 906 which include a valve controlled upper outlet end portion 908 and a lower inlet end portion 910. Compression unloader assembly 904 is disposed above valve body 905 and adjacent to the upper outlet end portion 908 of bleed flow passage 906. Compression unloader assembly 904 includes first unloader housing 722, a first unloader ring 724 and first spring disk 902.

First seal holder 914 forms a longitudinally extending annular chamber 916 disposed adjacent and immediately above bleed flow passage 906. Disposed within the annular chamber 916 is a bleed disk 918 and means for normally biasing bleed disk 918 against outlet end 908 for closing fluid communication through bleed flow passage 906. Such biasing means are illustrated as a wave washer 920 which exerts a compressive force on bleed disk 918. In this manner, bleed disk 918 and bleed washer 920 form a one-way check valve which will permit fluid to flow through bleed flow passage 906 only during a firm compression stroke of the shock absorber. The compressive force of bleed washer 920 is less than the compressive force of spring 750. During a firm compression stroke, fluid pressure builds up simultaneously within flow passages 906 and 706 in a relatively linear manner until bleed disk 918 is biased away from upper outlet end 908 at a certain pressure level which is less than the fluid pressure level required to "blow-off" unloader assembly 904 from valve body 905. Once bleed disk 918 is axially displaced away from valved outlet end 908, fluid in flow passage 906 is able to communicate with the upper portion of working chamber 50. By varying the number and cross-sectional area of bleed flow passages 906 and the compressive force of bleed washer 920 acting on bleed disk 918 it is possible to controllably regulate the "blow-off" level associated with firm damping during a compression stroke. More specifically, piston valve 900 must be displaced a greater distance within the shock absorber during firm compression prior to compression unloader assembly 904 being axially displaced for opening flow passage 706.

While it will be apparent from the preferred embodiment illustrated herein as well as the objects stated above, it will be appreciated that the present invention is susceptible to modification, variation and change without departing from the scope of the invention. For example, the accelerometers may also be either located within the shock absorbers or mounted externally. Various routines may be used to determine whether the wheels of the automobile are in resonance, and various methods may be used for energizing the solenoid in response to the input signals as well as the desired like characteristics.

What is claimed is:

1. An apparatus for damping the movement of the body of an automobile comprising:

a hydraulic damper having a pressure cylinder, said pressure cylinder forming a working chamber having first and second portions operable to store damping fluid;

a piston assembly disposed between said first and second portions of said working chamber, said piston assembly including a piston valve body having a first and second flow passage in fluid communication with said first and second portions of said working chamber, said piston assembly having a first unloader acting on a first spring disk for controlling the flow of damping fluid through said first flow passage during compression, said first unloader movable between a first position for biasing said first spring disk so as to restrict flow through said first flow passage and a second position displaced from said first spring disk for permitting increased flow through said first flow passage, said piston assembly further including a second unloader acting on a second spring disk for controlling the flow of damping fluid through said second flow passage during rebound, said second unloader movable between a first position for biasing said second spring disk so as to restrict flow through said second flow passage and a second position displaced from said second spring disk for permitting increased flow through said second flow passage;

first sensor means for determining whether said shock absorber is in compression or rebound, said first sensor means operable to generate a first electrical signal in response thereto;

second sensor means for determining movement of the body of said automobile, said second sensor means operable to generate a second electrical signal in response thereto;

means for generating an electrical control signal in response to said first and second electrical signals, said means for generating an electrical control signal including an electronic control module having microprocessor means operable to receive said first and second electrical signals, said microprocessor means being operable to compare movement of the body of said automobile to a first threshold range, said microprocessor means being further operable to generate firm damping during compression of said hydraulic damper when movement of the body of said automobile exceeds said first threshold range, said microprocessor means operable to generate firm damping during rebound of said hydraulic damper when movement of the body of the automobile is below said first threshold range; and electrical controllable flow means for regulating the flow of damping fluid between said first and second portions of said working chamber in response to said electrical control signal, said electrical controllable flow means including a plunger operable to generate firm damping during compression and rebound of said hydraulic damper while maintaining the position of said plunger with respect to said electrical controllable flow means.

2. The apparatus set forth in claim 1, wherein said first sensor means comprises a position sensor for generating said first electrical signal corresponding to the axial position of said piston assembly relative to said pressure cylinder.

3. The apparatus as set forth in claim 1, wherein said first sensor means comprises a pressure sensor having a first surface communicating with the damping fluid stored in said first portion of said working chamber, said pressure sensor further having a second surface communicating with the damping fluid stored in said second portion of said working chamber.

4. The apparatus as set forth in claim 3, wherein said pressure sensor is operable to receive damping fluid from said second portion of said working chamber through said electrical controllable flow means.

5. The apparatus as set forth in claim 4, wherein said pressure sensor is disposed within said pressure cylinder.

6. The apparatus as set forth in claim 3, wherein said second sensor means comprises an accelerometer.

7. The apparatus as set forth in claim 6, wherein said accelerometer is disposed within said pressure cylinder.

8. The apparatus set forth in claim 7, wherein said electrical controllable flow means comprises a solenoid, said solenoid operable to regulate the flow of damping fluid between said first and second portions of said working chamber.

9. The apparatus as set forth in claim 8, wherein said microprocessor means is operable to cause said hydraulic damper to generate firm damping during compression and rebound when the discrete fourier transform of said first electrical signal exceeds a predetermined value.

10. The apparatus as set forth in claim 9, wherein said microprocessor means is operable to cause said hydraulic damper to generate firm damping during compression and rebound when the amplitude of the output of said first sensor means exceeds a first threshold value.

11. The apparatus as set forth in claim 9, wherein said microprocessor means prevents firm damping during both compression and rebound of said hydraulic damper when said first electrical signal is within a second threshold range.

12. The apparatus as set forth in claim 9, wherein said microprocessor means is operable to sequentially change the damping characteristics of four shock absorbers.

13. The apparatus as set forth in claim 9, wherein said microprocessor means is operable to deliver a pulse width modulated signal to said electrical controllable flow means.

14. The apparatus as set forth in claim 1, wherein said first flow passage provides fluid communication between said second portion of said working chamber and said first spring disk, and wherein said second flow passage provides fluid communication between said first portion of said working chamber and said second spring disk.

15. The apparatus as set forth in claim 1, wherein at least one of said first and second unloaders and its respective spring disk are located external to said piston valve body.

16. The apparatus as set forth in claim 1, wherein said first unloader includes bleed valve means for permitting a predetermined amount of damping fluid to flow from said second portion to said first portion of said working chamber prior to said first unloader moving to said second position displaced from said first spring disk.

17. The apparatus as set forth in claim 16, wherein said bleed valve means is operable to only permit fluid flow during firm damping in compression.

18. The apparatus as set forth in claim 17, wherein said bleed valve means includes a third flow passage formed in said valve body in fluid communication with said first and second portions of said working chamber, and a third spring disk for controlling flow of damping fluid through said third flow passage, whereby during compression, damping fluid concurrently acts within said first and third flow passages such that said third spring disk is movable to a displaced position for permitting flow through said third flow passage prior to said first unloader moving to said second position.

19. A method for regulating the flow of damping fluid between first and second portions of the working chamber of a direct acting hydraulic shock absorber, said shock absorber being disposed between the sprung and unsprung portions of a vehicle and having a piston assembly axially disposed within a pressure cylinder, said method comprising the steps of:

sensing whether said shock absorber is in compression or rebound;

sensing the vertical velocity of the sprung portion of said vehicle;

delivering damping fluid to electrical controllable flow means for regulating the flow of damping fluid between said first and second portions of said working chamber, said electrical controllable flow means comprising a plunger operable to be disposed in first and second positions; and regulating the flow of damping fluid between said first and second portions of said working chamber by said electrical controllable flow means in response to the first and second sensed signals, said step of regulating the flow of damping fluid includes the step of generating firm damping during compression and rebound of said shock absorber when said plunger is disposed in said first position, said step of regulating the flow of damping fluid further includes the steps of comparing the vertical velocity of said sprung portion to a first threshold range, generating firm damping during compression of said shock absorber when the vertical velocity of said sprung portion exceeds said first threshold range, and generating firm damping during rebound of said shock absorber when the vertical velocity of said sprung portion is below said first threshold range.

20. The method of claim 19, wherein said piston assembly is disposed between said first and second portions of said working chamber, said piston assembly including a piston valve body having a first and second flow passage in fluid communication with said first and second portions of said working chamber, said piston assembly having a first unloader normally biasing a first spring disk for restricting the flow of damping fluid through said first flow passage to generate firm damping during compression of said shock absorber, and said piston assembly having a second unloader normally biasing a second spring disk for restricting the flow of damping fluid through said second flow passage to generate firm damping during rebound of said shock absorber;

a first flow path between said first portion of said working chamber and said second unloader for generating soft damping during compression when said plunger is in said second position; and a second flow path between said second portion of said working chamber and said first unloader for generating soft damping during rebound when said plunger is in said second position.

21. The method of claim 20, wherein said step of regulating the flow of damping fluid further comprises the step of disposing said plunger in said second position for counteracting the normal biasing force acting on said first spring disk by displacing said first unloader assembly away from said first spring disk in response to the pressure of the damping fluid acting on said first unloader from within said second flow path, and wherein said step of regulating the flow of damping fluid further comprises the step of disposing said plunger in said second position for counteracting the normal biasing force acting on said second spring disk by displacing said second unloader assembly away from said second spring disk in response to the pressure of damping fluid acting on said second unloader from within said second flow path.

22. The method of claim 20 wherein said step of sensing whether said shock absorber is in compression or rebound includes the step of sensing the position of said piston assembly relative to said pressure cylinder and the step of recording the output of a position sensor secured to said piston assembly.

23. The method of claim 22, wherein said step of sensing whether said shock absorber is in compression or rebound includes the step of sensing the pressure differential between said first and second portions of said working chamber and the step of recording the output of a pressure sensor in fluid communication with said first and second portions of said working chamber.

24. The method of claim 23, wherein said pressure sensor is operable to receive damping fluid from said second portion of said working chamber through said electrical controllable flow means.

25. The method of claim 20, wherein said step of sensing the vertical velocity of the sprung portion of said vehicle comprises the step of recording the output from an accelerometer.

26. The method of claim 23, wherein said step of regulating the flow of damping fluid comprises the step of causing said shock absorber to generate firm damping during compression and rebound of said shock absorber when the discrete fourier transform of said differential pressure between said first and second portions of said working chamber exceeds a threshold value, and wherein said step of regulating the flow of damping fluid further comprises the step of causing said shock absorber to generate firm damping during compression and rebound of said shock absorber when the amplitude of the output of said pressure sensor exceeds a threshold value.

27. The method of claim 26, wherein said step of regulating the flow of damping fluid further comprises the step of preventing firm damping during both compression and rebound of said shock absorber when an electrical signal generated in response to said pressure differential between said first and second portions of said working chamber is within a second threshold range.

28. The method of claim 19, wherein said step of regulating the flow of damping fluid comprises the step of delivering a pulse width modulated signal to said electrical controllable flow means.

29. The method of claim 20 further comprising the step of metering a predetermined amount of damping fluid from said second portion to said first portion of said working chamber through a third flow passage in said valve body so as to increase the displacement of said piston valve assembly prior to said first unloader generating firm damping during compression.

30. An apparatus for damping the movement of the body of an automobile relative to a wheel of said automobile, said damping apparatus having a pressure cylinder with a reciprocating piston assembly disposed therein operable to divide the working chamber formed by said pressure cylinder into first and second portions, said damper apparatus comprising:

a valve body having first and second flow passages for providing fluid communication between said first and second portions of said working chamber;

first valve means for controlling the flow of damping fluid through said first flow passage from said second portion to said first portion of said working chamber during compression, said first valve means having a first spring disk for regulating the flow of fluid through said first flow passage, and a first unloader adapted to normally bias said first spring disk for restricting flow through said first flow passage, said first unloader operable to overcome the normal biasing force applied to said first spring disk in response to the pressure of damping fluid acting on said first unloader so as to permit increased flow through said first flow passage;

second valve means for controlling the flow of damping fluid through said second flow passage from said first portion to said second portion of said working chamber during rebound, said second valve means having a second spring disk for regulating the flow of fluid through said second flow passage, and a second unloader adapted to normally bias said second spring disk for restricting flow through said second flow passage, said second unloader operable to overcome the normal biasing force applied to said second spring disk in response to the pressure of damping fluid acting on said second unloader for permitting increased flow through said second flow passage;

electrical controllable flow means operable to control the actuation of said first and second valve means, said electrical controllable flow means comprising a solenoid having a plunger operable to be displaced in first and second positions, said plunger operable to control the flow of damping fluid between said first unloader and said second unloader;

a first flow path between said first portion of said working chamber and said second unloader through said electrical flowable control means;

a second flow path between said second portion of said working chamber and said first unloader through said electrical controllable flow means; and means for controllable activating said electrical controllable flow means for generating firm damping during compression and rebound by displacing said plunger to said first position.

31. The apparatus according to claim 30 wherein said first flow passage of said valve body defines an upper outlet end portion for delivering fluid to said first portion of said working chamber, and said second flow passage defines a lower outlet end portion for delivering fluid to said second portion of said working chamber.

32. The apparatus as set forth in claim 31 wherein a lower surface of said first spring disk is positioned adjacent said upper outlet end portion of said first flow passage, said first unloader engaging an upper surface of said first spring disk, and wherein said apparatus further comprises first biasing means acting on said first unloader for normally biasing said first spring disk toward said upper outlet end portion of said first flow passage for restricting the flow of fluid therethrough.

33. The apparatus as set forth in claim 32 wherein an upper surface of said second spring disk is positioned adjacent said lower outlet end portion of said second flow passage, said second unloader engaging a lower surface of said second spring disk, and wherein said apparatus further comprises second biasing means acting on said second unloader for normally biasing said second spring disk toward said lower outlet end portion of said second flow passage for restricting the flow of fluid therethrough.

34. The apparatus as set forth in claim 32 wherein said plunger is operable to control the flow of damping fluid through said first and second flow paths.

35. The apparatus as set forth in claim 34 wherein said plunger is operable to permit the flow of damping fluid through said first and second flow paths when said plunger is disposed in said second position, and said plunger is operable to restrict the flow of damping fluid through said first and second flow paths when said plunger is in said first position.

36. The apparatus as set forth in claim 35 wherein said first unloader forms a first pressure chamber in fluid communication with said second flow path such that when said plunger is displaced to said second position said first pressure chamber is pressurized, whereby the fluid pressure acting within said first pressure chamber overcomes the normal biasing force exerted by said first biasing means such that said first unloader is displaced away from said upper surface of said first spring disk whereby increased flow is permitted through said upper outlet end portion of said first flow passage for generating soft damping during compression, and wherein said second unloader forms a second pressure chamber in fluid communication with said first flow path such that when said plunger is displaced to said second position said second pressure chamber is pressurized, whereby said pressure acting within said second pressure chamber overcomes the normal biasing force exerted by said second biasing means such that said second unloader is displaced from said lower surface of said second spring disk whereby increased flow is permitted through said lower outlet end portion of said second flow passage for generating soft damping during rebound.

37. The apparatus as set forth in claim 33 further comprising third biasing means provided between said upper surface of said first spring disk and said first unloader for biasing said first spring disk toward said upper outlet end portion of said first flow passage when said plunger is displaced to said first position.

38. The apparatus as set forth in claim 33 further comprising fourth biasing means provided between said lower surface of said second disk spring and said second unloader for biasing said second disk spring toward said lower outlet end portion of said second flow passage when said plunger is displaced to said first position.

39. The apparatus as set forth in claim 33, wherein said first unloader includes bleed valve means for permitting a predetermined amount of damping fluid to flow from said second portion to said first portion of said working chamber prior to said first unloader moving to said second position displaced from said first spring disk.

40. The apparatus as set forth in claim 39, wherein said bleed valve means is operable to only permit fluid flow during firm damping in compression.

41. The apparatus as set forth in claim 40, wherein said bleed valve means includes a third flow passage formed in said valve body in fluid communication with said first and second portions of said working chamber, and a third spring disk for controlling flow of damping fluid through said third flow passage, whereby during compression, damping fluid concurrently acts within said first and third flow passages during compression such that said third spring disk is movable to a displaced position for permitting flow through said third flow passage prior to said first unloader moving to said second position.

42. The apparatus as set forth in claim 30 further comprising a position sensor for sensing the axial position of said piston relative to said pressure cylinder.

43. The apparatus as set forth in claim 30 further comprising a pressure sensor having a first surface communicating with the damping fluid stored in said first portion of said working chamber, said pressure sensor further having a second surface communicating with the damping fluid stored in said second portion of said working chamber.

44. The apparatus as set forth in claim 43 wherein said pressure sensor is operable to receive damping fluid through said electrical controllable flow means, and wherein said pressure sensor is disposed within said pressure cylinder.

45. The apparatus as set forth in claim 44 further comprising an accelerometer operable to sense the movement of the body of said automobile.

46. The apparatus as set forth in claim 45 wherein said accelerometer is disposed within said pressure cylinder.

47. The apparatus as set forth in claim 46 wherein said means for controllably actuating said electrical control signal comprises and electronic control module having a microprocessor.

48. The apparatus as set forth in claim 46 wherein said microprocessor is operable to compare the movement of the body of said automobile to a first threshold range, said microprocessor being further operable to generate firm damping during compression of said shock absorber when the movement of the body of said automobile exceeds said first threshold range, said microprocessor operable to generate firm damping during rebound of said shock absorber when the movement of the body of the automobile is below said first threshold range.

49. An apparatus for damping the movement of the body of an automobile relative to a wheel of said automobile comprising a shock absorber, said shock absorber having a pressure cylinder with a reciprocating piston disposed therein operable to divide the working chamber formed by said pressure cylinder into first and second portions, said shock absorber comprising:
   a piston valve body having first and second flow passages for providing fluid communication between said first and second portions of said working chamber;
   a first spring disk for controlling the flow of fluid through said first flow passage from said second portion to said first portion of said working chamber;

a first unloader movable between a first position normally biasing said first spring disk for restricting flow through said first flow passage and a second position, said first unloader adapted to move to said second position in response to the pressure of damping fluid acting on said first unloader so as to permit increased flow through said first flow passage;

first biasing means for applying the normal biasing force on said first unloader so as to bias said first unloader to said first position;

a second spring disk for controlling the flow of fluid through said second flow passage from said first portion to said second portion of said working chamber;

a second unloader movable between a first position normally biasing said second spring disk for restricting flow through said second flow passage and a second position, said second unloader adapted to move to said second position in response to the pressure of damping fluid acting on said second unloader so as to permit increased flow through said second flow passage;

second biasing means for applying the normal biasing force on said second unloader so as to bias second unloader to said first position;

electrical controllable flow means operable to control the movement of said first and second unloaders, said electrical controllable flow means comprising a solenoid having a plunger operable to be displaced in first and second positions, said plunger operable to control the position of said first and second unloaders by controlling the flow of damping fluid between said first unloader and said second unloader;

a first flow path between said first portion of said working chamber and said second unloader through said electrically controllable flow means a second flow path between said second portion of said working chamber and said first unloader through said electrically controllable flow means; and means for controllably activating said electrical controllable flow means for generating firm damping during compression and rebound by displacing said plunger to said first position whereby said first and second unloaders are biased to their respective first positions, said electrically controllable flow means generating soft damping during compression and rebound by displacing said plunger to said second position, whereby said plunger is operable to permit the flow of fluid through said first flow path for biasing said second unloader to said second position and said plunger is operable to permit the flow of fluid through said second flow path for biasing said first unloader to said second position.

50. The apparatus as set forth in claim 49 wherein said first flow passage of said valve body defines an upper outlet end portion for delivering fluid to said first portion of said working chamber, and said second flow passage defines a lower outlet end portion for delivering fluid to said second portion of said working chamber.

51. The apparatus as set forth in claim 50 wherein a lower surface of said first spring disk is positioned adjacent said upper outlet end portion of said first flow passage, said first unloader engaging an upper surface of said first spring disk, and wherein said first unloader acts on said first spring disk for biasing said first spring disk toward said upper outlet end portion of said first flow passage for restricting the flow of fluid therethrough.

52. The apparatus as set forth in claim 51 further comprising bleed valve means for metering damping fluid to said first portion of said working chamber for delaying said first unloader from moving to said first position during compression, said bleed valve means including a bleed disk positioned adjacent an upper outlet end portion of a third flow passage extending through said valve body and third biasing means acting on said bleed disk to normally bias said bleed disk for restricting flow through said third flow passage, whereby damping fluid concurrently acts within said first and third flow passages during compression such that said third spring disk is movable to a displaced position for permitting flow through said third flow passage prior to said first unloader moving to said second position.

53. The apparatus as set forth in claim 51 wherein an upper surface of said second spring disk is positioned adjacent said lower outlet end portion of said second flow passage, said second unloader engaging a lower surface of said second spring disk, and wherein said apparatus further comprises second biasing means for biasing said second unloader to said first position whereby said second unloader acts on said second spring disk for biasing said second spring disk toward said lower outlet end portion of said second flow passage for restricting the flow of fluid therethrough.

54. The apparatus as set forth in claim 53 wherein said first unloader forms a first pressure chamber in fluid communication with said second flow path such that when said plunger is displaced to said second position said first pressure chamber is pressurized whereby the fluid said pressure acting within said first pressure chamber overcomes the biasing force exerted by said first biasing means for displacing said first unloader to said second position, whereby increased flow is permitted through said upper outlet end portion of said first flow passage for generating soft damping during compression.

55. The apparatus as set forth in claim 54 wherein said second unloader forms a second pressure chamber in fluid communication with said first flow path such that when said plunger is displaced to said second position said second pressure chamber is pressurized whereby said pressure acting within said second pressure chamber overcomes the biasing force exerted by said second biasing means for displacing said second unloader to said second position, whereby increased flow is permitted through said lower outlet end portion of said second flow passage for generating soft damping during rebound.

56. The apparatus as set forth in claim 55 further comprising third biasing means provided between said upper surface of said first spring disk and said first unloader for biasing said first spring disk toward said upper outlet end portion of said first flow passage.

57. The apparatus as set forth in claim 56 further comprising fourth biasing means provided between said lower surface of said second disk spring and said second unloader for biasing said second disk spring toward said lower outlet end portion of said second flow passage.

58. A piston assembly for use in a hydraulic damper adapted for damping the movement of the body of an automobile relative to a wheel of said automobile, said piston assembly disposed for reciprocating motion within a pressure cylinder and operable to divide the working chamber formed by said pressure cylinder into first and second portions. said piston assembly comprising:

- a piston valve body having a first and second plurality of flow passages for providing fluid communication between said first and second portions of said working chamber;
- a first spring disk located adjacent an upper portion of said valve body and adapted to control the flow of fluid through said first flow passage from said second portion into said first portion of said working chamber;
- first biasing means for biasing said first spring disk toward said upper portion of said valve body;
- a first unloader located above said first spring disk and operable to overcome the biasing force applied by said first biasing means to said first spring disk in response to the pressure of damping fluid within a first pressure chamber formed within said first unloader;
- a second spring disk located adjacent a lower portion of said piston valve body for controlling the flow of fluid through said second flow passage from said first portion into said second portion of said working chamber;
- second biasing means for biasing said second spring disk toward said lower portion of said valve body;
- a second unloader located below said second spring disk and operable to overcome the biasing force applied by said second biasing means on said second spring disk in response to the pressure of damping fluid acting within a second pressure chamber formed within said second unloader;
- a first flow path between said first portion of said working chamber and said second pressure chamber within said second unloader; and
- a second flow path between said second portion of said working chamber and said first pressure chamber within said first unloader.

59. The piston assembly as set forth in claim 58 further comprising flow control means operable to selectively permit or restrict the flow of damping fluid between said first and second pressure chambers, said flow control means selectively controlling the flow of fluid between said first and second flow paths.

60. The piston assembly as set forth in claim 59 wherein said flow control means comprises a solenoid having a plunger operable to be displaced in first and second positions, said plunger operable to control the fluid pressure acting within said first and second pressure chambers by controlling the flow of damping fluid between said first flow path and said second flow path, and wherein said apparatus further comprises means for controllably activating said flow control means for generating firm damping during compression and rebound by displacing said plunger to said first position for restricting fluid flow through said second flow path and said first flow path respectively, said electrically controllable flow means generating soft damping during compression and rebound by displacing said plunger to said second position whereby said plunger is operable to permit the flow of fluid through said second and first flow paths respectively.

61. The piston assembly as set forth in claim 60 wherein said first flow passage of said valve body defines an upper outlet end portion for delivering fluid to said first portion of said working chamber, and said second flow passage defines a lower outlet end portion for delivering fluid to said second portion of said working chamber.

62. The piston assembly as set forth in claim 61 wherein a lower surface of said first spring disk is positioned adjacent said upper outlet end portion of said first flow passage, said first unloader engaging an upper surface of said first spring disk, and wherein said apparatus further comprises first biasing means acting on said first unloader for normally biasing said first spring disk toward said upper outlet end portion of said first flow passage for restricting the flow of fluid therethrough.

63. The apparatus as set forth in claim 62 further comprising bleed valve means for metering damping fluid to said first portion of said working chamber for delaying said first unloader moving to said first position during compression, said bleed valve means including a bleed disk positioned adjacent an upper outlet end portion of a third flow passage extending through said valve body and third biasing means acting on said bleed disk to normally bias said bleed disk for restricting flow through said third flow passage, whereby damping fluid concurrently acts within said first and third flow passages during compression such that said third spring disk is movable to a displaced position for permitting flow through said third flow passage prior to said first unloader moving to said second position.

64. The piston assembly as set forth in claim 62 wherein an upper surface of said second spring disk is positioned adjacent said lower outlet end portion of said second flow passage, said second unloader engaging a lower surface of said second spring disk, and wherein said apparatus further comprises second biasing means acting on said second unloader for normally biasing said second spring disk toward said lower outlet end portion of said second flow passage for restricting the flow of fluid therethrough.

65. The piston assembly as set forth in claim 62 wherein said first unloader forms said first pressure chamber in fluid communication with said second flow path such that when said plunger is displaced to said second position said first pressure chamber is pressurized, whereby the fluid pressure acting within said first pressure chamber overcomes the biasing force exerted by said first biasing means such that said first unloader is displaced in a direction away from said upper surface of said firs spring disk whereby increased flow is permitted through said upper outlet end portion of said first flow passage for generating soft damping during compression.

66. The piston assembly as set forth in claim 65 wherein said second unloader forms said second pressure chamber in fluid communication with said first flow path such that when said plunger is displaced to said second position said second pressure chamber is pressurized, whereby said pressure acting within said second pressure chamber overcomes the biasing force exerted by said second biasing means such that said second unloader is displaced in a direction away from said lower surface of said second spring disk whereby increased flow is permitted through said lower outlet end portion of said second flow passage for generating soft damping during rebound.

67. The piston assembly as set forth in claim 66 wherein said plunger is operable to permit the flow of damping fluid through said first and second flow paths when said plunger is disposed in said second position, and said plunger is operable to restrict the flow of damping fluid through said first and second flow paths when said plunger is in said first position.

68. The piston assembly as set forth in claim 60 further comprising third biasing means provided between an upper surface of said first spring disk and said first unloader for biasing said first spring disk toward said upper outlet end portion of said first flow passage when said plunger is displaced to said firs position.

69. The piston assembly as set forth in claim 68 further comprising fourth biasing means provided between a lower surface of said second disk spring and said second unloader for biasing said second disk spring toward said lower outlet end portion of said second flow passage when said plunger is displaced to said first position.

70. The piston assembly as set forth in claim 60, wherein at least one of said first and second unloaders and its respective spring disk are located external to said piston valve body.

71. The apparatus as set forth in claim 60, wherein said first unloader includes bleed valve means for metering a predetermined amount of damping fluid from said second portion to said first portion of said working chamber prior to said first unloader moving to said second position displaced from said first spring disk.

72. The apparatus as set forth in claim 71, wherein said bleed valve means is operable to only permit fluid flow during firm damping in compression.

73. The apparatus as set forth in claim 72, wherein said bleed valve means includes a third flow passage formed in said valve body in fluid communication with said first and second portions of said working chamber, and a third spring disk for controlling flow of damping fluid through said third flow passage, whereby damping fluid concurrently acts within said first and third flow passages during compression such that said third spring disk is movable to a displaced position for permitting flow through said third flow passage prior to said first unloader moving to said second position.

74. A piston valve assembly for use in a hydraulic damping apparatus for controllably damping the movement of the body of an automobile relative to a vehicle, said piston assembly disposed within the pressure cylinder and operable to divide the working chamber formed by said pressure cylinder into first and second portions, said piston assembly comprising:
- a valve body member having a first and second plurality of flow passages for providing fluid communication between said first and second portions of said working chamber:
- a first spring disk for controlling the flow of fluid through said first flow passage from said second portion into said first portion of said working chamber;
- a first unloader assembly located above said first spring disk and adapted for normally biasing said first spring disk into engagement with an upper outlet end portion of said first flow passage for restricting flow therethrough so as to generate firm damping during compression;
- first chamber means formed within said first unloader for applying a hydraulic force on said first unloader in response to the pressure of damping fluid acting within said first chamber means, said hydraulic force counteracting the normal biasing of said first unloader so as to displace said first unloader from said first disk spring to permit increased flow through said outlet end portion of said first flow passage for generating soft damping during compression;
- a second spring disk for controlling the flow of fluid through said second flow passage, said second spring disk engaging a lower outlet end portion of said second flow passage for controlling the flow of fluid from said first portion to said second portion of said working chamber;
- a second unloader acting on a lower surface of said second spring disk opposite said outlet end portion and normally biasing said second spring disk to engagement therewith for restricting fluid flow through said second flow passage for generating firm damping during rebound;
- second chamber means formed within said second unloader for applying a hydraulic force on said unloader in response to the pressure of damping fluid acting within said second chamber means, said hydraulic force counteracting the normal biasing of said second unloader so as to displace said second unloader from said second disk spring to permit increased flow through said second flow passage for generating soft damping during rebound;
- a first flow passage between said first portion of said working chamber and said second chamber means;
- a second flow passage between said second portion of said working chamber and said first chamber means; and
- flow control means operable to control the flow of damping fluid through said first and second flow paths for controlling the communication of fluid between said first and second chamber means.

75. The piston valve assembly as set forth in claim 74 wherein said flow control means comprises a solenoid having a plunger operable to be displaced in first and second positions, said plunger operable to control the fluid pressure acting within said first and second chamber means by controlling the flow of damping fluid between said first and second flow paths, and wherein said apparatus further comprises means for controllably activating said flow control means for generating firm damping during compression and rebound by displacing said plunger to said first position, said electrically controllable flow means generating soft damping during compression and rebound by displacing said plunger to said second position.

76. The piston valve assembly as set forth in claim 75 wherein said first flow passage of said valve body defines an upper outlet end portion for delivering fluid to said first portion of said working chamber, and said second flow passage defines a lower outlet end portion for delivering fluid to said second portion of said working chamber.

77. The piston valve assembly as set forth in claim 76 wherein a lower surface of said first spring disk is positioned adjacent said upper outlet end portion of said first flow passage, said first unloader engaging an upper surface of said first spring disk, and wherein said apparatus further comprises first biasing means acting on said first unloader for normally biasing said first spring disk toward said upper outlet end portion of said first flow passage.

78. The piston valve assembly as set forth in claim 77 wherein an upper surface of said second spring disk is positioned adjacent said lower outlet end portion of said second flow passage, said second unloader engaging a lower surface of said second spring disk, and wherein said apparatus further comprises second biasing means acting on said second unloader for normally biasing said second spring disk in a direction toward said lower outlet end portion of said second flow passage.

79. The piston valve assembly as set forth in claim 78 wherein said first chamber means is in fluid communication with said second flow path such that when said plunger is displaced to said second position said first chamber means is pressurized whereby the fluid pressure acting within said first chamber means overcomes the biasing force exerted by said first biasing means such that said first unloader is displaced in a direction away from said upper surface of said first spring disk whereby increased flow is permitted through said upper outlet end portion of said first flow passage for generating soft damping during compression, and wherein said second chamber means is in fluid communication with said first flow path such that when said plunger is displaced to said second position said second chamber means is pressurized, whereby said pressure acting within said second chamber means overcomes the biasing force exerted by said second biasing means such that said second unloader is displaced in a direction away from said lower surface of said second spring disk whereby increased flow is permitted through said lower outlet end portion of said second flow passage for generating soft damping during rebound.

80. The apparatus as set forth in claim 74, wherein said first unloader includes bleed valve means for metering a predetermined amount of damping fluid from said second portion to said first portion of said working chamber prior to said first unloader moving to said second position displaced from said first spring disk.

81. The apparatus as set forth in claim 80, wherein said bleed valve means includes a third flow passage formed in said valve body in fluid communication with said first and second portions of said working chamber, and a third spring disk for controlling flow of damping fluid through said third flow passage, whereby damping fluid concurrently acts within said first and third flow passages during compression such that said third spring disk is movable to a displaced position for permitting flow through said third flow passage prior to said first unloader moving to said second position.

82. The piston valve assembly as set forth in claim 79 wherein said plunger is operable to permit the flow of damping fluid through said first and second flow paths when said plunger is disposed in said second position, and said plunger is operable to restrict the flow of damping fluid through said first and second flow paths when said plunger is in said first position.

83. The piston valve assembly as set forth in claim 82 further comprising third biasing means provided between said upper surface of said first spring disk and said first unloader of biasing said first spring disk toward said upper outlet end portion of said first flow passage, and fourth biasing means provided between said lower surface of said second disk spring and said second unloader for biasing said second disk spring toward said lower outlet end portion of said second flow passage.

84. A piston assembly for use in a hydraulic damping apparatus for damping the movement of the body of an automobile relative to a wheel of said automobile, said piston assembly disposed within a pressure cylinder comprising:

a valve body dividing a working chamber formed by said pressure cylinder into first and second portions, said valve body having a first and second plurality of flow passages for providing fluid communication between said first and second portions of said working chamber;

first unloader means for controlling the flow of fluid from said second portion into said first portion of said working chamber through said first flow passage, said first unloader means movable between a first normally biased position for restricting flow through said first flow passage to a second position for permitting increased flow through said first flow passage in response to the pressure of damping fluid acting on said first unloader means from said second portion of said working chamber;

second unloader means for controlling the flow of fluid from said first portion into said second portion of said working chamber through said second flow passage, said second unloader means movable between a first normally biased position for restricting flow through said second flow passage to a second position for permitting increased flow through said second flow passage in response to the pressure of damping fluid acting on said second unloader means from said first portion of said working chamber;

a first flow path between said first portion of said working chamber and said second unloader means; and a second flow path between said second portion of said working chamber and said first unloader means.

85. The piston assembly as set forth in claim 84 further comprising bleed valve means for controlling the flow of fluid from said second portion into said first portion of said working chamber through a third flow passage, said bleed valve means movable between a first position restricting flow through said third flow passage to a second position permitting flow through said third flow passage in response to the pressure of damping fluid acting on said bleed valve means from said second portion of said working chamber during compression of the damping apparatus.

86. The piston assembly as set forth in claim 84 further comprising flow control means operable to control the flow of damping fluid through said first flow path and said second flow path, said flow control means including a plunger movable between a first position wherein flow of damping fluid is permitted through said first and second flow passages and a second position for preventing the flow of damping fluid through said first and second flow paths 87. The piston assembly as set forth in claim 86 wherein said first flow passage of said valve body defines an upper outlet end portion for delivering fluid to said first portion of said working chamber, and said second flow passage defines a lower outlet end portion for delivering fluid to said second portion of said working chamber.

88. The piston assembly as set forth in claim 87 wherein a lower surface of said first spring disk is positioned adjacent said upper outlet end portion of said first flow passage, said first unloader engaging an upper surface of said first spring disk, and wherein said apparatus further comprises first biasing means acting on said first unloader for normally biasing said first spring disk toward said upper outlet end portion of said first flow passage for restricting the flow of fluid therethrough.

89. The piston assembly as set forth in claim 88 wherein an upper surface of said second spring disk is positioned adjacent said lower outlet end portion of said second flow passage, said second unloader engaging a lower surface of said second spring disk, and wherein said apparatus further comprises second biasing means acting on said second unloader for normally biasing said second spring disk toward said lower outlet end portion of said second flow passage for restricting the flow of fluid therethrough.

90. The piston assembly as set forth in claim 89 wherein said first unloader forms said first pressure chamber in fluid communication with said second flow path such that when said plunger is displaced to said second position said first pressure chamber is pressurized, whereby the fluid pressure acting within said first pressure chamber overcomes the biasing force exerted by said first biasing means such that said first unloader is displaced in a direction away from said upper surface of said first spring disk whereby increased flow is permitted through said upper outlet end portion of said first flow passage for generating soft damping during compression, and wherein said second unloader forms said second pressure chamber in fluid communication with said first flow path such that when said plunger is displaced to said second position said second pressure chamber is pressurized, whereby said pressure acting within said second pressure chamber overcomes the biasing force exerted by said second biasing means such that said second unloader is displaced in a direction away from said lower surface of said second spring disk whereby increased flow is permitted through said lower outlet end portion of said second flow passage for generating soft damping during rebound.

91. The piston assembly as set forth in claim 90 further comprising third biasing means provided between an upper surface of said first spring disk and said first unloader for biasing said first spring disk toward said upper outlet end portion of said first flow passage when said plunger is displaced to said first position and fourth biasing means provided between a lower surface of said second disk spring and said second unloader for biasing said second disk spring toward said lower outlet end portion of said second flow passage when said plunger is displaced to said first position.

92. The piston assembly as set forth in claim 91, wherein at least one of said first and second unloaders and its respective spring disk are located external to said piston valve body.

* * * * *

UNITED STATES PATENT AND TRADEMARK OFFICE
CERTIFICATE OF CORRECTION

PATENT NO. : 5,123,671 (Page 1 of 4)
DATED : June 23, 1992
INVENTOR(S) : Jan Driessen et al.

It is certified that error appears in the above-indentified patent and that said Letters Patent is hereby corrected as shown below:

ON THE TITLE PAGE (Page 2), under "References Cited", "Foreign Patent Documents",
"60-9797 1/1985 Japan" should be --60 9707 1/1985 Japan--.

Column 3, line 43, "2," should be --2A--.

Column 4, line 1, "CALC VEL" should be --CALC_VEL--.

Column 7, line 1, "annual" should be --annular--.

Column 7, line 30, "!00" should be --100--.

Column 9, line 61, after "176", insert --.--.

Column 9, line 66, "passage" should be --passages--.

Column 10, line 33, "a" should be --an--.

Column 11, line 31, after "disposed", "o" should be --on--.

Column 13, line 17, "prevent" should be --prevents--.

Column 17, line 40, "issued" should be --is used--.

Column 17, line 49, "sued" should be --used--.

Column 17, line 60, "382" should be --392--.

UNITED STATES PATENT AND TRADEMARK OFFICE
CERTIFICATE OF CORRECTION

PATENT NO. : 5,123,671 (Page 2 of 4)
DATED : June 23, 1992
INVENTOR(S) : Jan Driessen et al.

It is certified that error appears in the above-indentified patent and that said Letters Patent is hereby corrected as shown below:

Column 18, line 12, "holing" should be --holding--. Column 18, line 30, "4090" should be --400--.

Column 18, line 34, "8-" should be --8-14--.

Column 18, lines 45 - 46, "WHEELCONTROLTHRESHOLD)" should be --WWHEEL_CONTROL_THRESHOLD)--.

Column 19, line 8, "SOLMASK" should be --SOL_MASK--.

Column 19, line 26, after "microprocessor 374", insert --executes step 412. At step 412, the microprocessor 374--.

Column 19, line 34, "manular" should be --manual--.

Column 19, line 49, "CALCVEL" should be --CALC_VEL--.

Column 19, line 63, after "microprocessor 374", insert --executes step 425 in which the microprocessor 374--.

Column 20, line 1, "the" (2nd occurrence) should be --there--.

Column 20, line 19, "store" should be --stored--.

Column 20, line 25, "08" should be --308--.

UNITED STATES PATENT AND TRADEMARK OFFICE
CERTIFICATE OF CORRECTION

PATENT NO. : 5,123,671 (Page 3 of 4)
DATED : June 23, 1992
INVENTOR(S) : Jan Driessen et al.

It is certified that error appears in the above-indentified patent and that said Letters Patent is hereby corrected as shown below:

Column 23, lines 9 - 10, "CALC VEL" should be --CALC_VEL--.

Column 23, line 26, "CA_VEL" should be --CALC_VEL--.

Column 24, line 3, "AVE P'" should be --AVE_P'--.

Column 24, line 47, "adding" should be --anding--.

Column 24, line 63, "adding" should be --anding--.

Column 25, line 42, "a" should be --as to--.

Column 26, line 19, "PRESS DEADBAND" should be --PRESS_DEADBAND--.

Column 27, line 17, after "absorber", insert --.--.

Column 28, line 43, "64" should be --644--.

Column 30, line 63, "61" should be --618--.

Column 44, line 43, claim 47, "and" should be --an--.

Column 44, line 45, claim 48, "46" should be --47--.

Column 45, line 40, claim 49, after "means", insert --;--.

UNITED STATES PATENT AND TRADEMARK OFFICE
CERTIFICATE OF CORRECTION

PATENT NO.  :   5,123,671
DATED       :   June 23, 1992
INVENTOR(S) :   Jan Driessen et al.

It is certified that error appears in the above-indentified patent and that said Letters Patent is hereby corrected as shown below:

Column 48, line 50, claim 65, "firs" should be --first--. Column 49, line 11, claim 68, "firs" should be --first--.

Column 51, line 57, claim 83, "of" should be --for--.

Signed and Sealed this

Thirtieth Day of August, 1994

*Attest:*

BRUCE LEHMAN

*Attesting Officer*   *Commissioner of Patents and Trademarks*